(12) United States Patent
Hu et al.

(10) Patent No.: US 11,374,255 B2
(45) Date of Patent: Jun. 28, 2022

(54) ION-CONDUCTING STRUCTURES, DEVICES INCLUDING ION-CONDUCTING STRUCTURES, AND METHODS FOR USE AND FABRICATION THEREOF

(71) Applicant: University of Maryland, College Park, College Park, MD (US)

(72) Inventors: Liangbing Hu, Rockville, MD (US); Tian Li, West Lafayette, IN (US); Chunpeng Yang, Adelphi, MD (US); Xin Zhang, Greenbelt, MD (US); Robert M. Briber, Bethesda, MD (US); Meiling Wu, Adelphi, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 17/271,859

(22) PCT Filed: Aug. 21, 2020

(86) PCT No.: PCT/US2020/047460
§ 371 (c)(1),
(2) Date: Feb. 26, 2021

(87) PCT Pub. No.: WO2021/035162
PCT Pub. Date: Feb. 25, 2021

(65) Prior Publication Data
US 2021/0202978 A1    Jul. 1, 2021

Related U.S. Application Data

(60) Provisional application No. 62/890,404, filed on Aug. 22, 2019.

(51) Int. Cl.
*H01M 10/056* (2010.01)
*H01M 10/0525* (2010.01)
(Continued)

(52) U.S. Cl.
CPC ......... *H01M 10/056* (2013.01); *C08J 5/2256* (2013.01); *H01M 8/1072* (2013.01);
(Continued)

(58) Field of Classification Search
CPC ........... H01M 10/0525; H01M 10/056; H01M 10/0562; H01M 2008/1095;
(Continued)

(56) References Cited

PUBLICATIONS

Dong et al., "Cation-Induced Hydrogels of Cellulose Nanofibrils with Tunable Moduli," *Biomacromolecules*, 2013, 14(9): pp. 3338-3345. (8 pages).

(Continued)

*Primary Examiner* — Carlos Barcena
(74) *Attorney, Agent, or Firm* — Rowantree Law Group, PLLC; Frederick F. Rosenberger

(57) ABSTRACT

An ion-conducting structure comprises a metal-fibril complex formed by one or more elementary nanofibrils. Each elementary nanofibril can be composed of a plurality of cellulose molecular chains with functional groups. Each elementary nanofibril can also have a plurality of metal ions. Each metal ion can act as a coordination center between the functional groups of adjacent cellulose molecular chains so as to form a respective ion transport channel between the cellulose molecular chains. The metal-fibril complex can comprise a plurality of second ions. Each second ion can be disposed within one of the ion transport channels so as to be intercalated between the corresponding cellulose molecular chains. In some embodiments, the metal-fibril complex is formed as a solid-state structure.

22 Claims, 18 Drawing Sheets

(51) Int. Cl.
  *H01M 8/1072* (2016.01)
  *C08J 5/22* (2006.01)
  *H01M 8/10* (2016.01)
(52) U.S. Cl.
  CPC .............. *H01M 10/0525* (2013.01); *H01M 2008/1095* (2013.01); *H01M 2300/0082* (2013.01)
(58) Field of Classification Search
  CPC . H01M 2300/0065; H01M 2300/0082; H01M 4/386; H01M 4/505; H01M 4/525; H01M 4/587; H01M 8/1072
  See application file for complete search history.

(56) References Cited

PUBLICATIONS

Endo et al., "Anion Bridging-Induced Structural Transformation of Cellulose Dissolved in Ionic Liquid," *J. Phys. Chem. Lett.*, 2016, 7(24): pp. 5156-5161. (6 pages).

International Search Report and Written Opinion, dated Nov. 24, 2020, in International Application No. PCT/US20/47460. (17 pages).

Jiao et al., "Accessibility and Morphology of Cellulose Fibres Treated with Sodium Hydroxide," *BioResources*, 2014, 9(4): pp. 6504-6513. (10 pages).

Kim et al., "Functionalized Nanocellulose-Integrated Heterolayered Nanomats toward Smart Battery Separators," *Nano Lett.*, 2016, 16(9): pp. 5533-5541. (9 pages).

Li et al., "A nanofluidic ion regulation membrane with aligned cellulose nanofibers," *Science Advances*, Feb. 2019, 5(2): eaau4238 (6 pages).

Li et al., "Cellulose ionic conductors with high differential thermal voltage for low-grade heat harvesting," *Nature Materials*, Mar. 2019, 18: pp. 608-613 (38 pages).

Lizundia et al., "Cellulose and its derivatives for lithium ion battery separators: A review on the processing methods and properties," *Carbohydrate Polymer Technologies and Applications*, 2020, 1: 100001 (20 pages).

Ogawa et al., "Formation and stability of cellulose-copper-NaOH crystalline complex," *Cellulose*, 2014, 21: pp. 999-1006. (8 pages).

Shao et al., "High-Strength, Tough, and Self-Healing Nanocomposite Physical Hydrogels Based on the Synergistic Effects of Dynamic Hydrogen Bond and Dual Coordination Bonds," *ACS Appl. Mater. Interfaces*, 2017, 9(34): 28305-18. (15 pages).

Zhao et al., "Solid-State Electrolytes for Lithium-Ion Batteries: Fundamentals, Challenges and Perspectives," *Electrochemical Energy Reviews*, Aug. 2019, 2: pp. 574-605. (32 pages).

Dahlstrom et al., "Ion conductivity through TEMPO-mediated oxidated and periodate oxidated cellulose membranes," *Carbohydrate Polymers*, 2020 (online Jan. 3, 2020), 233: 115829. (8 pages).

Lv et al., "Pure cellulose lithium-ion battery separator with tunable pore size and improved working stability by cellulose nanofibrils," *Carbohydrate Polymers*, 2021 (online Aug. 24, 2020), 251: 116975. (8 pages).

Zhao et al., "Cellulose-Based Flexible Functional Materials for Emerging Intelligent Electronics," *Advanced Materials*, 2021 (online Apr. 20, 2020), 33: 2000619. (18 pages).

ION-CONDUCTING STRUCTURES, DEVICES INCLUDING ION-CONDUCTING STRUCTURES, AND METHODS FOR USE AND FABRICATION THEREOF

CROSS REFERENCE TO RELATED APPLICATION

The present application claims the benefit of U.S. Provisional Application No. 62/890,404, filed Aug. 22, 2019, which is hereby incorporated by reference herein in its entirety.

FIELD

The present disclosure relates generally to ion-conducting structures, and more particularly, to ion-conducting structures formed of elementary nanofibrils having a plurality of polymer molecular chains, methods for use and fabrication of such ion-conducting structures, and devices including such ion-conducting structures.

SUMMARY

Embodiments of the disclosed subject matter provide ion-conducting structures formed by one or more elementary nanofibrils whose polymer molecular chains have been chemically modified, as well as devices including such ion-conducting structures, and methods for fabrication and use thereof. For example, the elementary nanofibril(s) can be a naturally-occurring polysaccharide, such as cellulose, chitin, or chitosan. In some embodiments, the chemical modification of the elementary nanofibril(s) involves breaking hydrogen bonds between the polymer molecular chains to allow metal ions to form respective coordination bonds between exposed functional groups of adjacent polymer molecular chains. The coordination metal bonds thus space the polymer chains apart to form ion transport channels through the elementary nanofibril(s). The combination of elementary nanofibril(s) and metal ions forms a metal-fibril complex. In some embodiments, second ions can be intercalated between the polymer molecular chains. In some embodiments, the metal-fibril complex with intercalated second ions can be dried to form a solid-state ion-conducting structure. In some embodiments, the chemical modification of the elementary nanofibril(s) can include modifying charge density or charge type of functional groups of the polymer molecular chains. The resulting ion-conducting structures can be used as a component in electrical energy storage devices, electrical power generations systems (e.g., electricity generating devices), ion regulation or separation devices, ion conduction components, and/or biological applications.

In a representative embodiment, an ion-conducting structure comprises a metal-fibril complex formed by one or more elementary nanofibrils. Each elementary nanofibril is composed of a plurality of cellulose molecular chains with functional groups. Each elementary nanofibril can have a plurality of metal ions. Each metal ion can act as a coordination center between the functional groups of adjacent cellulose molecular chains so as to form a respective ion transport channel between the cellulose molecular chains. The metal-fibril complex can also comprise a plurality of second ions. Each second ion can be disposed within one of the ion transport channels so as to be intercalated between the corresponding cellulose molecular chains. The metal-fibril complex can be a solid-state structure.

In another representative embodiment, a battery comprises a first electrode, a second electrode, and a separator membrane. The separator membrane can be between the first and second electrodes. The separator membrane can comprise a solid-state metal-fibril complex. One of the first and second electrodes can operate as a cathode, and the other of the first and second electrodes can operate as an anode. The solid-state metal-fibril complex can be formed by a plurality of first nanofibrils. Each first nanofibril can be composed of a plurality of cellulose molecular chains with first functional groups. Each first nanofibril can have a plurality of first metal ions. Each first metal ion can act as a first coordination center between the first functional groups of adjacent cellulose molecular chains so as to form a respective first ion transport channel through the separator membrane. The solid-state metal-fibril complex can comprise a plurality of second ions. Each second ion can be disposed within one of the first ion transport channels so as to be intercalated between the corresponding cellulose molecular chains.

In another representative embodiment, a battery comprises a first electrode, a second electrode, and a separator between the first and second electrodes. One of the first and second electrodes can operate as a cathode, and the other of the first and second electrodes can operate as an anode. The separator can comprise a solid-state electrolyte. The first electrode, the second electrode, or both the first and second electrodes comprises a solid-state metal-fibril complex. The solid-state metal-fibril complex can be formed by a plurality of nanofibrils. Each nanofibril can be composed of a plurality of cellulose molecular chains with functional groups. Each nanofibril can have a plurality of metal ions. Each metal ion can act as a coordination center between the functional groups of adjacent cellulose molecular chains so as to form a respective ion transport channel between the cellulose molecular chains. The solid-state metal-fibril complex can comprise a plurality of second ions. Each second ion can be disposed one of the ion transport channels so as to be intercalated between the corresponding cellulose molecular chains.

In another representative embodiment, a method can comprise (a) forming a metal-fibril complex by immersing a plurality of elementary nanofibrils within an alkaline solution having a concentration of at least 5% (w/v) and a plurality of metal ions dissolved therein. Each elementary nanofibril can be composed of a plurality of cellulose molecular chains with functional groups. The immersing of (a) can be such that hydrogen bonds between adjacent functional groups of the cellulose molecular chains are broken so as to expose the functional groups and such that the dissolved metal ions from the alkaline solution form coordination bonds with the exposed functional groups. The method can further comprise (b), after (a), intercalating second ions between adjacent cellulose molecular chains of the metal-fibril complex by immersing the metal-fibril complex in a first solution having a plurality of the second ions dissolved therein. The method can also comprise (c), after (a), replacing free water in the metal-fibril complex by immersing the metal-fibril complex in an organic solvent. The method can further comprise (d), after (c), drying the metal-fibril complex such that a total content of water within the metal-fibril complex is less than or equal to 10 wt %, thereby forming the metal-fibril complex with intercalated second ions as a solid-state ion conducting structure. In some embodiments, the first solution can be the organic solvent, and the intercalating of (b) and the replacing free water of (c) can be performed simultaneously. In other embodiments, the first solution can be separate from the organic solvent, and the intercalating of (b) can be performed before or after the replacing free water of (c).

In another representative embodiment, an ion-conducting structure comprises a metal-fibril complex. The metal-fibril complex can be formed by one or more elementary nanofibrils. Each elementary nanofibril can be composed of a plurality of polymer molecular chains with functional groups. Each elementary nanofibril can have a plurality of metal ions. Each metal ion can act as a coordination center between the functional groups of adjacent molecular chains so as to form a respective ion transport channel between the molecular chains.

In another representative embodiment, a battery comprises a first and second electrodes, and a solid electrolyte membrane between the first and second electrodes. One of the first and second electrodes can operate as a cathode, and the other of the first and second electrodes can operate as an anode. The first electrode, the second electrode, the solid electrolyte membrane, or any combination thereof can comprise an ion-conducting structure, which comprises a metal-fibril complex. The metal-fibril complex can be formed by one or more elementary nanofibrils. Each elementary nanofibril can be composed of a plurality of polymer molecular chains with functional groups. Each elementary nanofibril can have a plurality of metal ions. Each metal ion can act as a coordination center between the functional groups of adjacent molecular chains so as to form a respective ion transport channel between the molecular chains.

In another representative embodiment, a fuel cell comprises first and second electrodes, and a proton exchange membrane between the first and second electrodes. One of the first and second electrodes can operate as a cathode, and the other of the first and second electrodes can operate as an anode. The first electrode, the second electrode, the proton exchange membrane, or any combination thereof can comprise an ion-conducting structure, which comprises a metal-fibril complex. The metal-fibril complex can be formed by one or more elementary nanofibrils. Each elementary nanofibril can be composed of a plurality of polymer molecular chains with functional groups. Each elementary nanofibril can have a plurality of metal ions. Each metal ion can act as a coordination center between the functional groups of adjacent molecular chains so as to form a respective ion transport channel between the molecular chains.

In another representative embodiment, a method can comprise forming a metal-fibril complex by immersing a plurality of elementary nanofibrils within an alkaline solution and a plurality of metal ions dissolved therein. Each elementary nanofibril can be composed of a plurality of polymer molecular chains with functional groups. The immersing can be such that hydrogen bonds between adjacent functional groups of the polymer molecular chains are broken so as to expose the functional groups and such that the dissolved metal ions from the alkaline solution form coordination bonds with the exposed functional groups.

In another representative embodiment, a method can comprise conducting ions using one or more elementary nanofibrils. Each elementary nanofibril can be composed of a plurality of polymer molecular chains with functional groups that have been chemically-modified. In some embodiments, the chemical-modification can include forming a coordination bond between a metal ion and functional groups of adjacent polymer molecular chains of the nanofibril. In some embodiments, the chemical-modification can include converting hydroxyl groups of the polymer molecular chains to carboxyl groups, for example, using a (2,2,6, 6-tetramethylpiperidin-1-yl)oxyl (TEMPO) treatment. In some embodiments, the chemical-modification can include etherification of the functional groups, for example, using a 3-chloro-2-hydroxypropyl trimethyl ammonium chloride (CHPTAC) treatment.

This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

General Considerations

Figure 1:
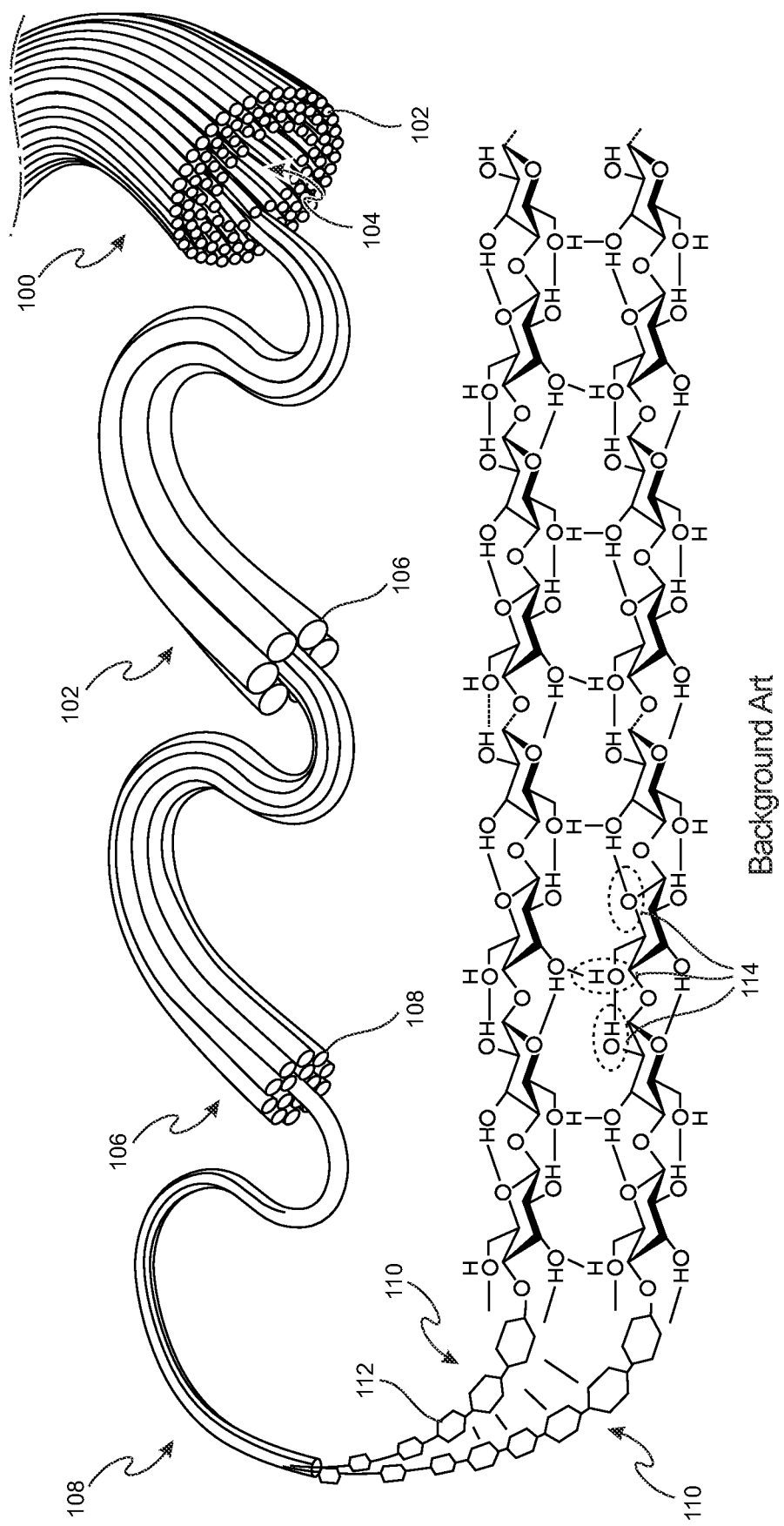
FIG. 1 is a simplified schematic diagram illustrating the hierarchical aligned structure of cellulose fibers in natural wood.

For purposes of this description, certain aspects, advantages, and novel features of the embodiments of this disclosure are described herein. The disclosed methods, structures, and devices should not be construed as being limiting in any way. Instead, the present disclosure is directed toward all novel and nonobvious features and aspects of the various disclosed embodiments, alone and in various combinations and sub-combinations with one another. The methods, structures, and devices are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inside," "outside,", "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

Overview of Terms

The following explanations of specific terms and abbreviations are provided to facilitate the description of various aspects of the disclosed subject matter and to guide those of ordinary skill in the art in the practice of the disclosed subject matter.

Elementary nanofibril: A basic nanoscale, elongated structure comprised of a plurality of polymer molecular chains (e.g., 10-36 chains) stacked in parallel or antiparallel directions. For example, nanofibrils can have an original (e.g., unmodified) diameter of 5 nm or less.

Microfibril (also referred to as nanofibril aggregate): A microscale, elongated structure comprised of a plurality of elementary nanofibrils arranged in parallel. For example, microfibrils can have an original (e.g., unmodified) diameter on the order of 1 μm-10 μm.

Fiber (also referred to as macrofibril): An elongated structure comprised of a plurality of microfibrils arranged in parallel. For example, fibers can have an original (e.g., unmodified) diameter on the order of 100 μm-1 mm.

Functional group: A group of atoms or molecules of the polymer molecular chain that can be exposed or modified to provide the disclosed ion transport properties between polymer molecular chains. In some embodiments, the functional groups exposed are $NH_2$ molecules, OH molecules, and/or O atoms.

Metal fibril complex: A structure formed by one or more elementary nanofibrils, with metal ions coordinate-bonded between functional groups of adjacent polymer molecular chains within the nanofibrils.

Coordinate bond: A covalent dipolar bond between a metal donor ion and surrounding ligands (e.g., the functional groups of polymer molecular channels), with the metal ion acting as a coordination center.

Solid-state: A substantially-solid structure with substantially no motive or flowable liquid (also referred free liquid) therein. In embodiments, total liquid within the structure is less than 10%, and preferably the amount of bound liquid therein is less than 8%.

Free liquid (e.g., free water): Liquid within a structure that is not in chemical combination with the structure, such that the liquid is capable of moving within or through the structure.

Bound liquid (e.g., bound water): Liquid within a structure that is in chemical combination with the structure, such that liquid cannot move within or through the structure.

INTRODUCTION

Natural wood has a unique three-dimensional porous structure with multiple channels, including vessels and tracheid lumina (e.g., tubular channels of 20-80 μm in cross-sectional dimension) extending in a direction of wood growth. Walls of cells in the natural wood are primarily composed of cellulose (40 wt %~50 wt %), hemicellulose (20 wt %~30 wt %), and lignin (20 wt %~35 wt %), with the three components intertwining with each other to form a strong and rigid wall structure. Cellulose fibers in the secondary cell wall (S2 layer) of the natural wood are substantially aligned along the wood growth direction. The naturally-occurring cellulose exhibits a hierarchical structure, which can be exploited in embodiments to provide unique or improved ion transport properties. For example, as shown in FIG. 1, the natural wood cell 100 has a plurality of cellulose fibers 102 surrounding and extending substantially parallel to lumen 104. The cellulose fibers 102 can be separated into constituent high-aspect-ratio microfibrils 106 in the form of aggregated three-dimensional networks (e.g., as bundles) that provide relatively high surface area. The cellulose microfibrils 106 can be further subdivided into elementary nanofibrils 108, which are composed of 12-36 linear polymer molecular chains 110. Each polymer molecular chain 110 is formed of thousands of repeating glucose units connected by strong covalent bonds that are arranged in a highly-ordered crystalline structure. The polymer molecular chains 110 are held together in a densely-packed arrangement forming the elementary nanofibril 108 by intramolecular hydrogen bonding 112 between functional groups 114 of adjacent molecular chains 110.

In embodiments of the disclosed subject matter, polymer molecular chains of the elementary nanofibril can be chemically-modified to alter or improve ion transport properties thereof. In some embodiments, charge density and/or type (e.g., negative or positive) of the functional groups can be modified by appropriate chemical treatment. Cellulose naturally exhibits a negative surface charge due to dissociation of its hydroxyl functional groups. For example, in some embodiments, a (2,2,6,6-Tetramethylpiperidyl-1-Oxyl) oxidation (TEMPO) treatment can be employed to convert the hydroxyl functional groups to carboxyl groups. Since the carboxyl groups dissociate more readily in solution (e.g., water), a higher surface charge density and zeta potential can be achieved as compared to native cellulose. In other embodiments, for example, 3-chloro-2-hydroxypropyltrimethylammonium chloride (CHPTAC) can be employed as an etherifying agent to modulate the surface charge of the cellulose (e.g., to present a positive charge in solution).

In some embodiments, the chemical modification can include forming the elementary nanofibril into a metal-fibril complex. Hydrogen bonds between functional groups of the cellulose molecular chains can be broken by immersing the elementary nanofibril in an alkaline solution, thereby increasing spacing between adjacent cellulose molecular chains and exposing the functional groups. Metal ions dissolved in the alkaline solution can diffuse into the enlarged space between the adjacent cellulose molecular chains and can form coordination bonds between the exposed functional groups, thereby forming a metal-fibril complex (e.g., metal-cellulose). Such metal can include, for example, copper (Cu), zinc (Zn), aluminum (Al), calcium (Ca), iron (Fe), or any combination thereof. In some embodiments, respective ion transport channels are formed by the enlarged spaces between cellulose molecular chains in the nanofibril, and the spaced arrangement of the cellulose molecular chains is maintained by the metal coordinate bonds.

In some embodiments, the chemical modification can include intercalating second ions within the metal-fibril complex to form an ion-conducting structure. For example, second ions from solution can diffuse into the ion transport channels of the metal-fibril complex. Such second ions can include, for example, lithium (Li+), sodium (Na+), potassium (K+), magnesium (Mg+), proton (H+), or any combination thereof. Alternatively or additionally, in some embodiments, the second ions can include a proton donor molecule, such as ammonium ($NH_4$+).

In some embodiments, the metal-fibril complex can be further processed into a solid-state structure with second ions retained therein. For example, in some embodiments, the metal-fibril complex with second ions intercalated therein is removed from solution and dried to form the solid-state structure. In some embodiments, prior to drying, a solvent exchange can be performed to replace water in the metal-fibril complex with an organic solvent (e.g., a polar aprotic solvent), and organic solvent is evaporated during the drying. For example, the organic solvents can include, but are not limited to, dimethylformamide (DMF), dimethyl sulfoxide (DMSO), ethylene glycol diglycidyl ether (EGDGE), propylene carbonate (PC), and acetone. In some embodiments, selection of the organic solvent for the solvent exchange/drying process can adapt the crystal structure of the cellulose in the final metal-fibril complex for a particular application. For example, when the solvent is DMSO and/or EGDGE, the cellulose in the metal-fibril complex can retain their crystalline morphology. Alternatively, when the solvent is DMF, PC, and/or acetone, the cellulose in the metal-fibril complex can have an amorphous morphology.

Alternatively, in some embodiments, the metal-fibril complex can be dried without second ions intercalated therein to form a preliminary structure, and the second ions can be introduced to the preliminary structure at a later time. In some embodiments, the metal-fibril complex with second ions intercalated therein can be formed as an initial solid-structure even though its subsequent usage in a particular application may otherwise increase the content of free liquid therein, for example, when the metal-fibril complex is used as a proton exchange membrane of a fuel cell.

In some embodiments, the cellulose elementary nanofibrils can be sourced from natural wood (e.g., trees), as discussed above. The natural wood can be any type of hard wood or softwood, such as, but not limited to, basswood, oak, poplar, ash, alder, aspen, balsa wood, beech, birch, cherry, butternut, chestnut, cocobolo, elm, hickory, maple, oak, padauk, plum, walnut, willow, yellow poplar, bald cypress, cedar, cypress, douglas fir, fir, hemlock, larch, pine, redwood, spruce, tamarack, juniper and yew. Alternatively or additionally, in some embodiments, the cellulose elementary nanofibrils can be sourced from other fibrous plant sources (e.g., bamboo, grass, cotton, ramie fiber, etc.), bacteria sources, and/or any other fibrous cellulose source.

In some embodiments, the processing of the elementary cellulose nanofibrils from an initial source can employ a "top-down" approach to take advantage of an existing microstructure arrangement of the source material. For example, the elementary cellulose nanofibrils within a piece of natural wood can be subjected to one or more of the chemical modifications described herein. The piece of natural wood can be cut in any direction with respect to its growth direction. Since the cellulose fibers are naturally aligned with the growth direction, the direction of the cut will dictate the orientation of the elementary nanofibrils in the final structure, which orientation can imbue the resulting structure with unique ion transport and/or mechanical properties. For example, in some embodiments, the piece of natural wood can be vertical cut (e.g., parallel to tree growth direction) such that resulting cellulose fibers are oriented substantially parallel to a major face (e.g., largest surface area) of the cut wood piece. In some embodiments, the piece of natural wood can be horizontal or rotation cut (e.g., perpendicular to tree growth direction), such that resulting fibers are oriented substantially perpendicular to the major face of the cut structure. In some embodiments, the piece of natural wood can be cut at any orientation between the horizontal and vertical cuts.

In some embodiments, the piece of natural wood can be subject to delignification prior to the desired chemical modification of the elementary cellulose nanofibrils. As used herein "delignified" or "delignification" refers to removing substantially all of the lignin from the natural wood, and "removing substantially all of the lignin" means that at least 90% of the lignin that naturally exits in the wood has been removed. For example, the weight percentage (wt %) of lignin may be reduced from over 20 wt % (e.g., 23.4 wt %) in natural wood to less than 5 wt % in the delignified wood, and preferably less than 1 wt % (e.g., ≤0.6 wt %). Concurrent with the lignin removal, some, most or substantially all of the hemicellulose may also be removed. In some embodiments, all of the lignin and hemicellulose can be removed, thereby providing a cellulose-only structure. Exemplary processes for performing such delignification are described in, for example, International Publication No. WO 2018/191181, published Oct. 18, 2018, International Publication No. WO 2018/187238, published Oct. 11, 2018, and International Publication No. WO 2019/055789, published Mar. 21, 2019, which are publications are incorporated by reference herein.

In some embodiments, the piece of wood (whether natural or delignified) can be subject to densification prior to or after the desired chemical modification of the elementary cellulose nanofibrils. As used herein, "densification" refers to the process of pressing the wood in a direction crossing a direction of extension of the lumina (or a wood growth direction) of the wood, such that the lumina mostly or fully collapse (e.g., such that the thickness of the wood is reduced by at least 75%, for example, ~90%). Exemplary processes for performing such densification are described in, for example, International Publication No. WO 2018/191181 and International Publication No. WO 2019/055789, which were incorporated by reference above.

In some embodiments, the "top-down" approach employs an initial source material having a patterned arrangement of cellulose fibers. For example, the initial source material can be woven fabric or textile (e.g., formed of cotton fibers). Applying the desired chemical modification to the initial source material can thus result in an ion-conducting cellulose-based structure that inherits the patterned arrangement. In other embodiments, the "top-down" approach employs an initial source material having a random arrangement of cellulose fibers. For example, the initial source material can be a piece of paper with random orientation of cellulose fibers. Applying the desired chemical modification to the initial paper can thus result in an ion-conducting cellulose-based structure that inherits the random arrangement.

In some embodiments, the processing of the elementary cellulose nanofibrils from an initial source can employ a "bottom-up" approach to provide a final microstructure independent of the microstructure of the source material. For example, a piece of natural wood (or other starting cellulose material) can be fibrillated prior to or after the desired chemical modification. As used herein, "fibrillation" refers to the process of releasing the cellulose microfibrils and/or the elementary nanofibrils from the aggregate hierarchical structure (e.g., the parent structure of natural wood). Fibrillation can be performed by any method known in the art, such as chemical means (e.g., chemical fibrillation, such as a TEMPO treatment), mechanical means (e.g., mechanical fibrillation, such as disk grinding), and/or enzymatic means (e.g., an enzymatic fibrillation process employing canonical cellulase enzymes, such as endoglucanases, in combination with amorphogenesis-inducing proteins, such as lytic polysaccharide monooxygenases (LPMO), swollenin and hemicelluloses).

As compared to cellulose fibers (e.g., having a diameter of 100 µm to 1 mm), the cellulose nanofibrils exposed by the fibrillation process have much larger aspect ratios (e.g., length-to-diameter of 200:1 to 1000:1) due to the much smaller diameter of the nanofibrils (e.g., diameter ≤5 nm). Due to this large aspect ratio, in some embodiments, the nanofibrils can be used as an ion-conducting additive in solid electrodes with a low ion-conductive percolation threshold (e.g., a low minimum proportion of cellulose for ion conduction in the electrode). Moreover, in some embodiments, the cellulose nanofibrils exposed by the fibrillation process can be used to form relatively thin membranes (e.g., 50 µm to 200 µm) that are also sufficiently dense (e.g., no or minimal micro-scale pores). In some embodiments, these thin, dense membranes formed of the cellulose nanofibrils can be used as a solid-state electrolyte, for example, in a solid-state energy-storage system. In contrast, membranes formed of cellulose fibers (e.g., conventional filter paper) are relatively thick (e.g., >300 µm) and may contain large pores.

In some embodiments, the separated microfibrils and/or nanofibrils after fibrillation can be reassembled into a new structure. For example, a slurry containing the separated microfibrils and/or nanofibrils can be vacuum-filtered and pressed to form a paper with random orientation of microfibrils and/or nanofibrils. Alternatively or additionally, in some embodiments, the microfibrils and/or nanofibrils after fibrillation and chemical modification can be added to or incorporated with another material to form a final composite structure. For example, the fibrillated microfibrils and/or nanofibrils that have been chemically modified can combined with another material to form a conductive electrode. In some embodiments, the "top-down" approach reconfigures the initial structure of a natural wood starting material, for example, as a wire or cable. For example, a piece of natural wood can be directly converted into microfibers with diameters between 1 µm and 30 mm by partial delignification (e.g., less than all lignin removed) followed by twisting.

Although the above discussion and the following description of embodiments focuses on cellulose for the elementary nanofibrils, embodiments of the disclosed subject matter are not limited thereto. Indeed, other naturally-occurring polysaccharides can also be used in place of or in addition to cellulose, according to one or more contemplated embodiments. For example, microfibrils can be formed of cellulose, chitin, chitosan, or any combination thereof. Chitin is a structural polysaccharide made from chains of modified glucose and is found in the exoskeletons of insects, the cell walls of fungi, and certain hard structures in invertebrates and fish. Chitosan is a linear polysaccharide made of glucosamine and N-acetyl glucosamine units. Chitosan can be formed by treating the chitin shells of shrimp and other crustaceans with an alkaline substance (e.g., NaOH).

Alternatively or additional, in some embodiments, the elementary nanofibrils can be formed of any polymer molecular chains (for example, polymer molecular chains having polar functional groups (e.g., hydroxyl, carboxyl)). Such polymers molecular can include, but are not limited to, other polysaccharides (e.g., starch, pectin), poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), and polylactic acid (PLA).

In some embodiments, the ion-conducting structure can be a composite formed by a combination of the chemically-modified elementary nanofibrils and one or more additional materials. Such additional materials can be infiltrated within the structure (e.g., in spaces between microfibrils, nanofibrils, and/or polymer molecular chains), bonded to the structure (e.g., to or between functional groups of the polymer molecular chains), or added to the structure (e.g., on or contacting the microfibrils and/or nanofibrils). For example, one or more polymers can be mixed with the chemically-modified elementary nanofibrils. Such polymers can include, but are not limited to, polysaccharide (e.g., cellulose, chitin, chitosan, starch, pectin), PVC, PVA, PAA, PEO, PAN, PEMA, PMMA, PET, PE, PEN, PA, PVDC, and PLA. Alternatively or additionally, in some embodiments, the additional materials can be a hydrogel or hydrogel precursor, and the ion-conducting structure can be a hydrogel composite.

In some embodiments, for example, materials for infiltration within the ion-conducting structure can include, but are not limited to, polymers, boron nitride (BN), carbon nanotubes (CNT), graphene, molybdenum disulfide ($MoS_2$), and/or metals. Infiltration of a polymer can be performed using any method, such as, but not limited to, vacuuming, solvent exchange, and heating. After infiltration, a percentage of polymer within the ion-conducting structure can range from 1 wt % to 95 wt %. For example, polymers used for impregnation can include, but are not limited to, polysaccharide (e.g., chitin, chitosan, chitin starch, pectin), protein (e.g., osteogenic growth peptide, soy protein isolate, wheat protein, fibroin, spidroin, collagen, whey protein), plant oil (e.g., tung oil, *catalpa* oil, linseed oil, stearic acid, palmitic acid, oleic acid). Alternatively or additionally, polymer used for impregnation can include, for example, synthetic macromolecules, such as, but not limited to, PET, PP, PE, polystyrene (PS), PVC, PEN, PA, PVDC, and polylactic acid PLA. Exemplary processes for performing such infiltration and materials therefor are further described in, for example, U.S. Pat. No. 10,411,222, issued Sep. 10, 2019, which is incorporated by reference herein.

In some embodiments, the resulting structure including the chemically-modified elementary nanofibrils can be employed in one or more components of a device or system, such as, but not limited to, electrical energy storage devices (e.g., battery, supercapacitor, etc.), electrical power generation systems (e.g., fuel cell, thermoelectric power generation device, osmotic power generation device), ion regulation or separation devices (e.g., cationic separation membrane, transistor), ion conduction components (e.g., nanofluidic ion conductor, ion-conducting additive, solid-state electrolyte), and biological applications (e.g., ion regulation). In some embodiments, the structure including the chemically-modified elementary nanofibrils is formed as a thin planar structure, for example, a membrane or sheet having a thickness of 10 µm to 1000 µm, preferably 100 µm or less. Alternatively or additionally, in some embodiments, the structure including the chemically-modified elementary nanofibrils reflects all or some of the three-dimensional microstructure of the underlying source material, e.g., the aligned microstructure of the original natural wood or the woven fiber pattern of the original textile.

Solid-State Metal-Fibril Complexes

Figure 2A:
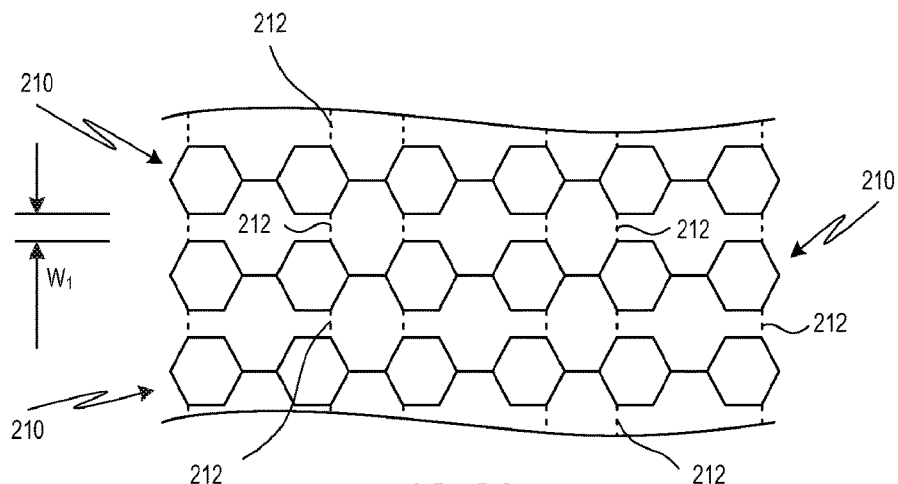
FIG. 2A is a simplified schematic diagram illustrating adjacent polymer molecular chains in an exemplary elementary nanofibril in an original unmodified state, according to one or more embodiments of the disclosed subject matter.
Figure 2B:
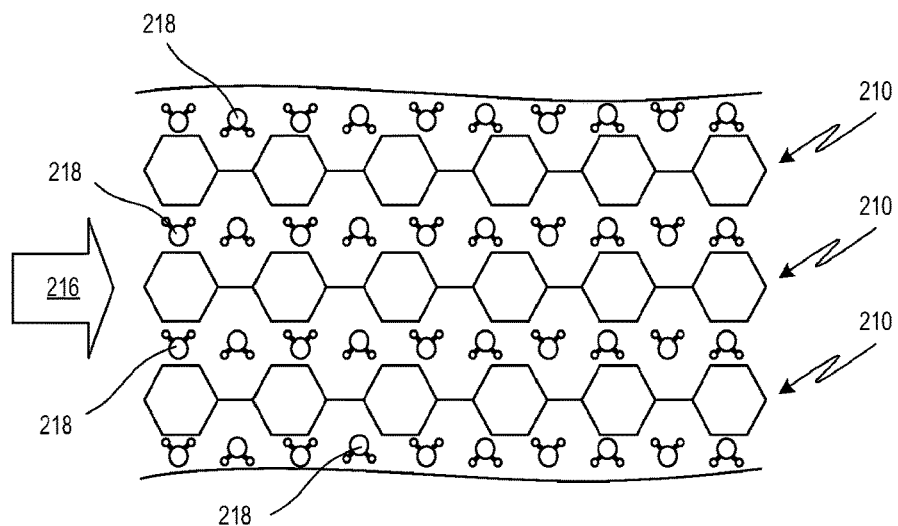
FIG. 2B is a simplified schematic diagram illustrating the nanofibril of FIG. 2A after immersion in an alkaline solution, thereby opening the space between the polymer molecular chains, according to one or more embodiments of the disclosed subject matter.

As discussed above, in some embodiments, the polymer molecular chains of one or more elementary nanofibrils can be chemically modified and dried to form a solid-state metal-fibril complex. For example, FIG. 2A illustrates adjacent polymer molecular chains 210 of an exemplary elementary nanofibril(s) in its original, unmodified state (e.g., native state). The polymer molecular chains 210 are held together in a densely-packed arrangement by hydrogen bonding 212 between functional groups of adjacent molecular chains 210. For example, the hydrogen bonds 212 can maintain a spacing, $W_1$, between the polymer molecular chains 210 of ≤1 nm (e.g., ≤about 0.6 nm for cellulose molecular chains). By immersing 216 the elementary nanofibril(s) in an alkaline solution (e.g., NaOH, KOH, LiOH), the hydrogen bonds 212 between functional groups can be broken, thereby allow the space between adjacent polymer molecular chains 210 to increase, as shown in FIG. 2B. For example, the terminal OH— groups of molecular chains within cellulose nanofibril(s) are exposed when immersed in the alkaline solution, due to the low dissociation energy of the hydroxyl groups in the high-concentration (e.g., at least 5%) alkaline environment.

Figure 2C:
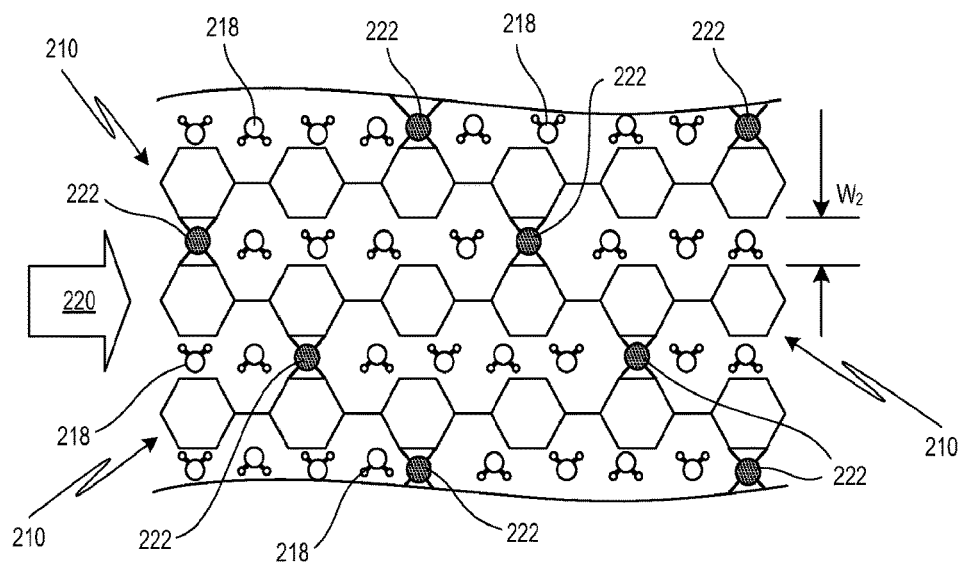
FIG. 2C is a simplified schematic diagram illustrating the nanofibril of FIG. 2B after bonding of dissolved metal ions from the alkaline solution to the functional groups of adjacent molecular chains, thereby forming a metal-fibril complex, according to one or more embodiments of the disclosed subject matter.

With the increased spacing between molecular chains 210, the elementary nanofibril(s) can be subjected to a metal ion treatment 220, where metal ions 222 dissolved in solution can diffuse between the polymer molecular chains 210 and bond thereto. In particular, the dissolved metal ions 222 can form a coordination bond with the exposed functional groups of adjacent polymer molecular chains 210, as shown in FIG. 2C. In some embodiments, the dissolved metal ions are provided in the high-concentration alkaline solution used to open up the polymer molecular chains 210 in FIG. 2B, such that the immersing 216 and the metal ion treatment 220 occur simultaneously. Alternatively, in some embodiments, the metal ion treatment 220 is subsequent to the alkaline-solution immersing 216, for example, by dissolving a metal in the alkaline solution after the elementary nanofibril(s) have been immersed therein, or by immersing the elementary nanofibril(s) in a different solution containing the dissolved metal ions.

For example, the metal ions 222 can maintain a spacing, $W_2$, between the polymer molecular chains 210 that is greater than the native spacing, $W_1$. The metal 222 can be any metal capable of forming a coordination bond with the functional groups of the polymer molecular chains 210, for example, Cu, Zn, Al, Ca, and/or Fe. For example, when the polymer molecular chains 210 are formed of cellulose and the metal ions include Cu, the Cu ions coordinate with the cellulose molecular chains by forming $Cu(OH)_6^{4-}$ at O2, O3 sites of cellulose anhydrous glucose units (AGUs). The Cu ion can be coordinated with both O2 and O3 oxygens from two neighboring chains, such that the overall Cu-cellulose complex forms a 3-dimensional cross-linked metal-organic-framework (MOF). The MOF can have pores along the chain 210 direction that act as one-dimensional ion transport channel. For example, the diameter of the ion channel can be estimated as the distance between the loosely-bonded oxygen atoms as 0.92 nm. In addition, the Cu-cellulose complex can have ~0.5 nm wide openings between neighboring ion transport channels, through which ions and water molecules can hop between channel. In directions perpendicular to direction of extension of the polymer molecular chains 210, the 0.5 nm wide openings require that ions shed solvation shell water molecules in order to cross between channels, thereby leading to ion transport with high mobility.

Figure 2D:
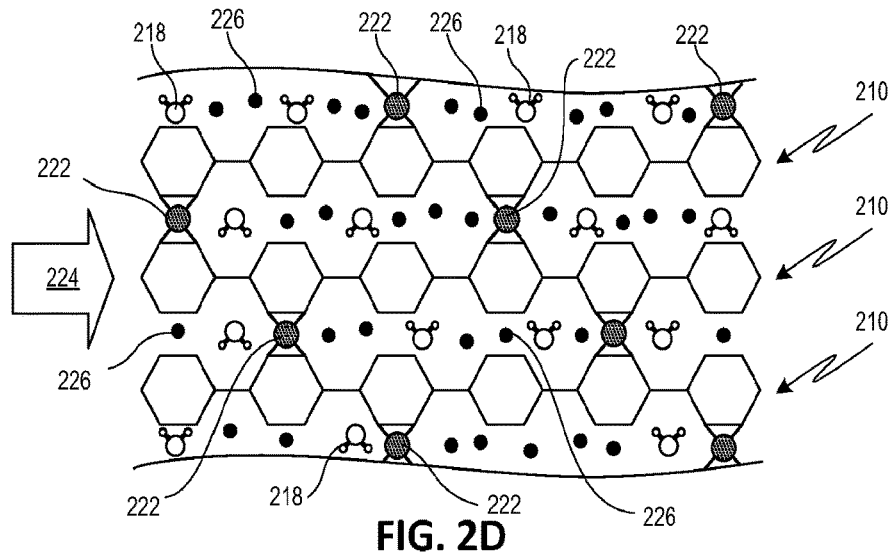
FIG. 2D is a simplified schematic diagram illustrating the metal-fibril complex of FIG. 2C after intercalation of second ions between the functional groups of adjacent molecular chains, according to one or more embodiments of the disclosed subject matter.

A metal-fibril complex is thus formed by coordination bonding of the metal ions 222 with functional groups of the adjacent polymer molecular chains 210 of the elementary nano-fibril. The metal-fibril complex can then be subjected to a second ion treatment 224, where second ions 226 are intercalated between the polymer molecular chains, as shown in FIG. 2D. For example, the second ions can be Li+, Na+, K+, Mg+, and/or proton (H+). Alternatively or additionally, the second ions can include a molecule that donates a proton, such as ammonium ion (e.g., $NH_4+$). In some embodiments, the second ions 226 are provided in the high-concentration alkaline solution (e.g., NaOH, KOH, LiOH, etc.) used to open up the polymer molecular chains 210 in FIG. 2B, such that the immersing 216 (and potentially metal ion treatment 220) occurs simultaneous with the second ion treatment 224.

Alternatively, in some embodiments, the second ion treatment 224 is subsequent to the metal ion treatment 220, for example, by dissolving the second ions in the alkaline solution after the dissolving the metal therein, or by immersing the metal-fibril complex in a different solution containing the second ions 226. Thus, in some embodiments, the second ion treatment can include a solution containing an electrolyte for the desired second ions 226. For example, the solution for second ion treatment 224 can include propylene carbonate (PC), ethylene carbonate (EC), dimethyl carbonate (DMC), ethylmethyl carbonate (EMC), and/or diethyl carbonate (DEC). When the desired second ion comprises Li, the Li-ion electrolyte can be, for example, $LiClO_4$, $LiPF_6$, $LiBF_4$, lithium bis(trifluoromethanesulfonyl)imide (LiTFSI), lithium bis(fluorosulfonyl)imide (LiFSI), or other similar salts. When the desired second ion comprises protons, the added electrolyte can be, for example, ammonia, ammonium nitrate, ammonium chloride, ammonium sulfate, polyacrylic acid, or citric acid. Beyond those specific examples listed herein, other electrolytes known in the art for the desired second ions 226 could also be used.

Figure 2E:
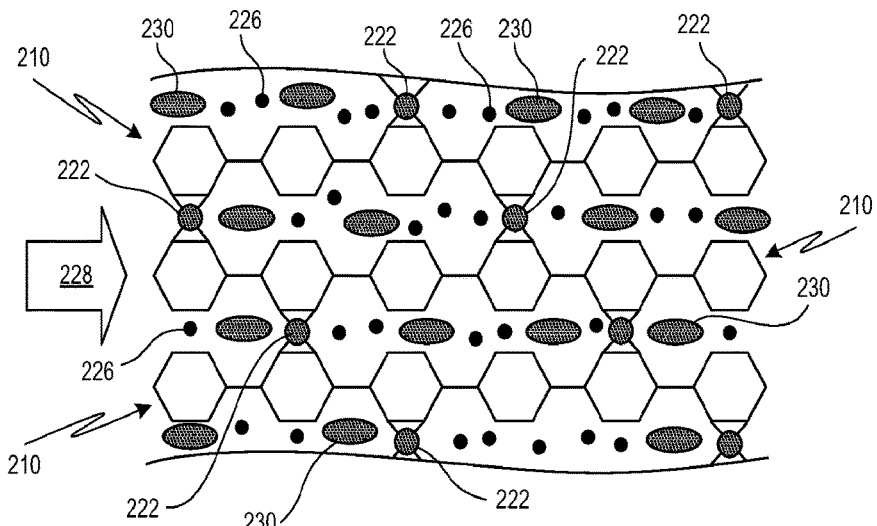
FIG. 2E is a simplified schematic diagram illustrating the metal-fibril complex of FIG. 2D after solvent exchange, according to one or more embodiments of the disclosed subject matter.
Figure 2F:
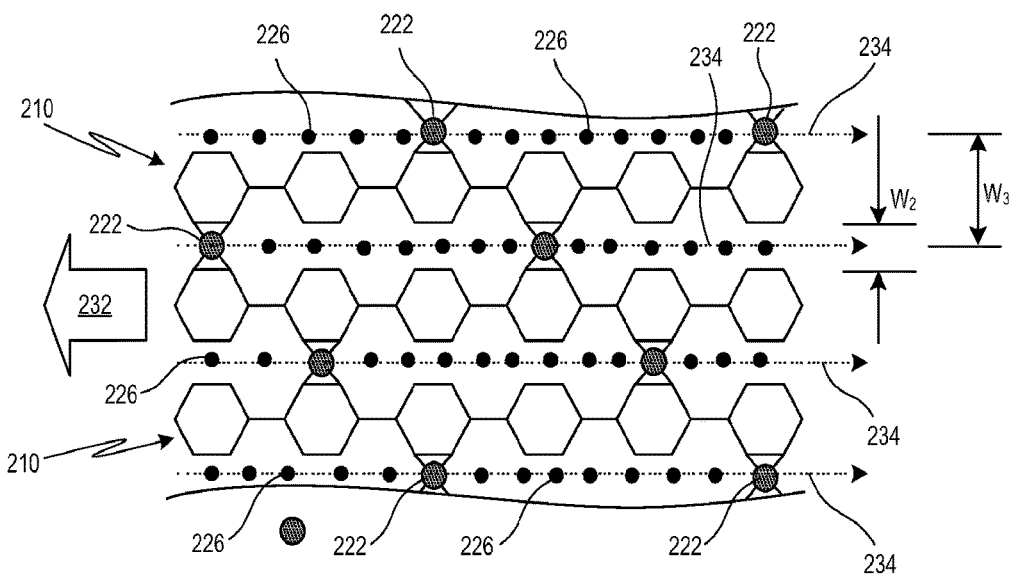
FIG. 2F is a simplified schematic diagram illustrating the metal-fibril complex of FIG. 2E after drying, thereby forming a solid-state structure, according to one or more embodiments of the disclosed subject matter.

The metal-fibril complex with intercalated second ions can then be subjected to solvent exchange treatment 228, where free water molecules 218 within the elementary nanofibril(s) are replaced by organic solvent molecules 230, as shown in FIG. 2E. In some embodiments, the organic solvent of treatment 228 can be a polar aprotic solvent. For example, the organic solvent can include DMF, DMSO, PC, acetone, and/or EGDGE. The solvent exchange treatment 228 can include immersing the metal-fibril complex in the organic solvent or washing the metal-fibril complex with the organic solvent. In some embodiments, the immersing or washing may be repeated multiple times (e.g., at least three times) to ensure all free water 218 in the metal-fibril complex is removed. In some embodiments, the second ions 226 are provided in the organic solvent, such that the second ion treatment 224 occurs simultaneous with the solvent exchange treatment 228. Alternatively, in some embodiments, the solvent exchange treatment 228 is before or after the second ion treatment 224.

Having been subjected to solvent exchange treatment 228, the metal-fibril complex can then be subjected to a drying treatment 232, where the organic solvent molecules 230 are evaporated while preserving the nanostructure arrangement of the polymer molecular chains 210 and metal ions 222 to form ion transport channels 234 (e.g., having a width W2 of ~1 nm and a spacing W3 of ≤~2 nm) and second ions 226 intercalated between the polymer molecular chains 210. In particular, after the drying treatment 232, the metal-fibril complex is formed as a solid-state structure with minimal to no free liquid therein (although there may otherwise be liquid molecules bound to the polymer molecular chains or other materials within the metal-fibril complex). For example, the solvent exchange 228 and drying 232 treatments can be such that the total liquid (e.g., water) within the metal-fibril complex is less than 10 wt %, and preferably that the amount of bound liquid (e.g., water) within the metal-fibril complex is less than 8 wt %. For example, the drying treatment 232 can include vacuum drying, freeze drying, and/or critical point drying.

With native elementary nanofibrils, the electrostatic field adjacent to the charged walls of the nanofibrils act to redistribute ions while the mobility stays constant. The electrical double layer that regulates ion movement is thus intrinsically limited to low electrolyte concentration and cannot exceed the value for the bulk electrolyte under higher concentrations. However, with the metal-fibril complex, sub-nanometer channels 234 can be formed and tuned at the molecular scale, such that confinement of solvated ions 226 can be reduced to less than 1 nm. New transport phenomenon occurs within these sub-nm channels, where mobile ions are regulated by the charged walls and the confined spacing. In some embodiments, the ionic conductivity along the cellulose molecular chains in the solid-state metal-fibril complex can be at least $10^{-4}$ S/cm (e.g., on the order of $10^{-3}$ S/cm). For example, a fabricated example of a solid-state Cu-cellulose complex with Li ions had an ionic conductivity of 5 mS/cm at room temperature, while a fabricated example of a solid-state Cu-cellulose complex with Na ions had an ionic conductivity of 0.1 mS/cm. Such values are significantly higher than that offered by conventional solid polymer electrolytes, which have ionic conductivities in the range of $10^{-5}$ to $10^{-8}$ S/cm at room temperature.

Fabrication of Solid-State Metal-Fibril Complexes

Figure 3A:
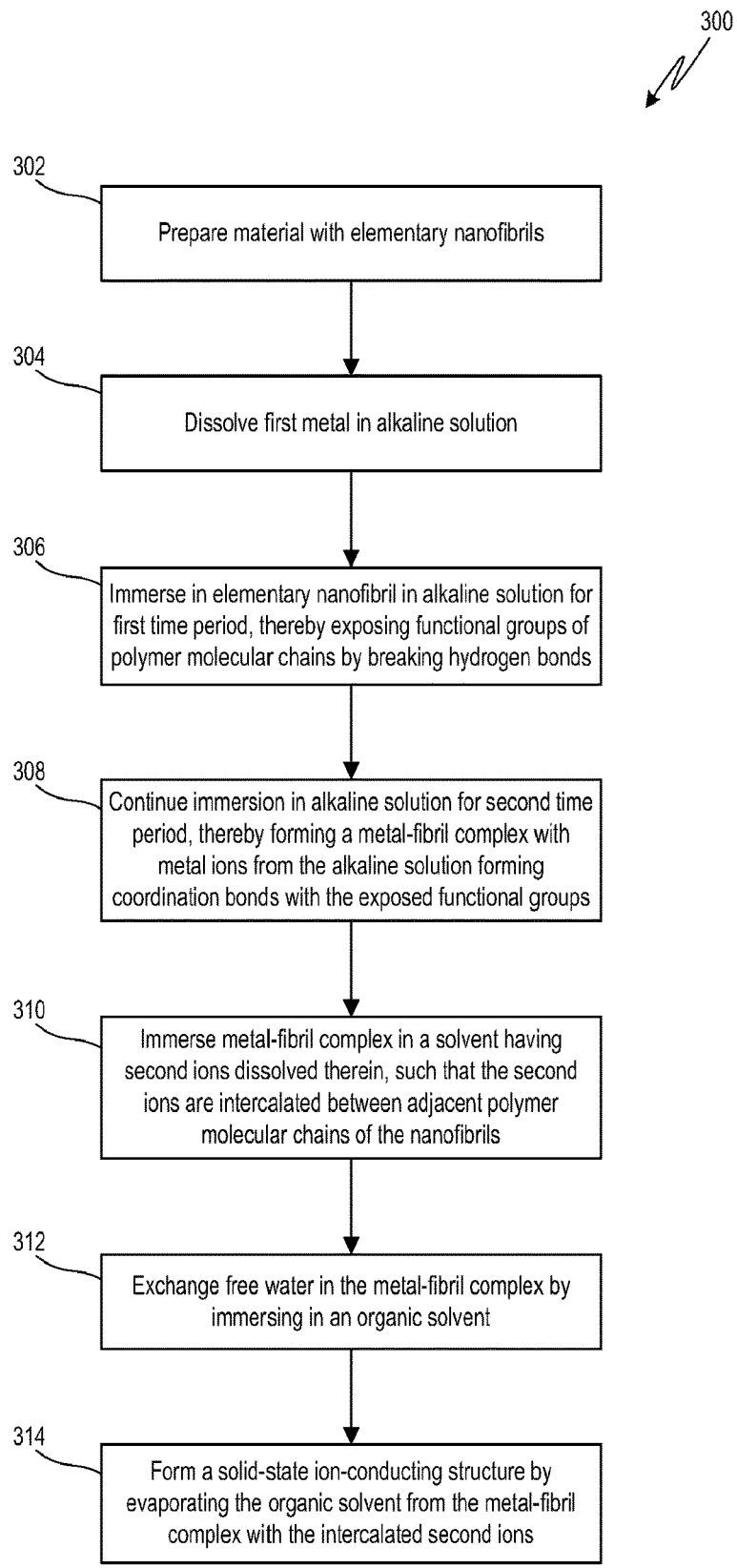
FIGS. 3A-3B are simplified process flow diagrams for exemplary methods for fabricating a solid-state ion-conducting structure, according to one or more embodiments of the disclosed subject matter.

FIG. 3A shows an exemplary method 300 for fabricating a solid-state metal-fibril complex from one or more elementary nanofibrils. The method 300 can begin a process block 302, where a starting material for the elementary nanofibril(s) is prepared. As discussed above, in some embodiments, the elementary nanofibril(s) can be formed of a naturally-occurring polysaccharide, for example, cellulose, chitin, chitosan, or any combination thereof. The preparing 302 can thus include obtaining a structure including the naturally-occurring elementary nanofibril(s) (e.g., piece of wood or other fibrous plant, exoskeleton of an insect, cell wall of fungi, shell of a shrimp, bacterial-produced cellulose fibers, etc.). In some embodiments, the preparing 302 can include modifying the structure in preparation for chemical modification. For example, in some embodiments, the structure is a piece of wood or other fibrous plant, and the preparing 302 includes at least one of delignification, densification, fibrillation, and shaping (e.g., by twisting to form a cable). Alternatively or additionally, in some embodiments, the starting material may be in fiber form, each fiber including a plurality of the elementary nanofibril(s), and the preparing 302 can include forming the starting material into a desired structure (e.g., paper, membrane, or a three-dimensional structure). For example, in some embodiments, a slurry containing the fibers can be formed into a paper using vacuum filtration and pressing.

The method 300 can proceed to process block 304, where a first metal is dissolved in an alkaline solution. For example, the alkaline solution can include sodium hydroxide (NaOH), potassium hydroxide (KOH), lithium hydroxide (LiOH), or combinations thereof. The first metal can be any metal capable of forming a coordination bond with the functional groups of the polymer molecular chains, for example, Cu, Zn, Al, Ca, and/or Fe.

The method 300 can proceed to process block 306, where the elementary nanofibril(s) are immersed in an alkaline solution for a first time period. For example, the alkaline solution can include sodium hydroxide (NaOH), potassium hydroxide (KOH), lithium hydroxide (LiOH), or combinations thereof. As described above, the immersion within the alkaline solution breaks the hydrogen bonds between functional groups (e.g., depotonation), thereby allowing the polymer molecular chains of the elementary nanofibril(s) to open up. The first time period may be relatively quickly, e.g., on the order of hours.

The method 300 can proceed to process block 308, where the immersion in the alkaline solution is continued for a second time period, thereby forming a metal-fibril complex. As described above, the further immersion within the alkaline solution allows the metal ions previously dissolved in the alkaline solution (or otherwise added to the solution during the first and/or second time periods) to diffuse into the opened space between the polymer molecular chains and to form a coordination bond to the exposed functional groups of adjacent molecular chains. The second time period may be relatively slow, for example, on the order of days (e.g., 1-2 weeks). In some embodiments, the alkaline solution may be heated to help reduce the second time period.

Below a concentration threshold for the alkaline solution, the molecular structure of elementary fibrils may not be changed. For example, for alkaline solution concentrations below 5% (w/v), a phase change to the desired metal-fibril complex may not occur. In such situations, the metal ion will primarily coordinate among the cellulose nanofibrils rather than within the cellulose nanofibrils (e.g., between the polymer molecular chains). Accordingly, in embodiments, the alkaline solution employed at process blocks 306-308 has a concentration between 5% (w/v) and the corresponding saturation concentration for the solution, for example, ≥20% (w/v).

The method 300 can proceed to process block 310, where the metal-fibril complex is immersed in a solvent having second ions therein. As described above, the metal coordination bonds form channels between the adjacent polymer molecular chains of the elementary nanofibril(s), thereby allowing the second ions to intercalate within the elementary nanofibril(s) (e.g., within the channels between the polymer molecular chains) by diffusion. For example, the second ions can be Li+, Na+, K+, Mg+, and/or proton (H+). Alternatively or additionally, the second ions can include a molecule that donates a proton, such as ammonium ion (e.g., $NH_4+$).

In some embodiments, the second ions are provided in the alkaline solution of process blocks 306-308, in which case process block 310 may be considered an extension of 308. Alternatively, in some embodiments, the immersion of process block 310 is in a solvent different from the alkaline solution. For example, the solvent of process block 310 can include PC, EC, DMC, EMC, and/or DEC. To provide the desired second ions, an appropriate electrolyte or proton donor can be dissolved in the solvent. For example, a Li-ion electrolyte can include $LiClO_4$, $LiPF_6$, $LiBF_4$, LiTFSI, and/or LiFSI. For example, a proton-donor can include ammonia, ammonium nitrate, ammonium chloride, ammonium sulfate, polyacrylic acid, and/or citric acid. Beyond those specific examples listed herein, other electrolytes and proton donors known in the art for the desired second ions could also be used.

The method 300 can proceed to process block 312, where the metal-fibril complex is immersed in an organic solvent. In some embodiments, the second ions of are provided in the organic solvent, in which case process block 312 may be considered an extension of process block 310. Alternatively, in some embodiments, the immersion of process block 312 is in a solvent different from the solvent of process block 310. In either case, the immersion of 312 can be effective to replace free water molecules within the metal-fibril complex with molecules of the organic solvent. In some embodiments, the organic solvent of treatment can be a polar aprotic solvent. For example, the organic solvent can include DMF, DMSO, PC, acetone, and/or EGDGE. In some embodiments, the organic solvent can be selected to provide a desired crystal structure for the final solid-state metal-fibril complex. For example, use of DMSO and/or EGDGE as the organic solvent at process block 312 can yield substantially crystalline morphology for cellulose-based complexes, while use of DMF, PC, and/or acetone as the organic solvent at process block 312 can yield an amorphous morphology for cellulose-based complexes.

The method 300 can proceed to process block 314, where the metal-fibril complex is dried to form a solid-state ion-conducting structure. In particular, the drying is effective to evaporate the organic solvent molecules from the metal-fibril complex, thereby maintaining the nanostructure of the elementary nanofibril(s), e.g., with the metal coordination bonds forming ion transport channels between the polymer molecular chains and second ions intercalated therein. The drying of process block 314 can be effect to remove all or most of free water from the metal-fibril complex. For example, total water within the metal-fibril complex can be less than 10 wt %, and preferably bound water within the metal-fibril complex is less than 8 wt %. The drying of process block 314 can include vacuum drying, freeze drying, and/or critical point drying.

Although process blocks 302-314 have been separately illustrated and described as occurring once, practical implementation of the disclosed embodiments may employ multiple repetitions of a particular process block before proceeding to the next process block. For example, the second ion immersion 310 may be repeated multiple times to ensure sufficient intercalation of the second ions within the metal-fibril complex. In another example, the organic solvent immersion 312 may be repeated multiple times (or comprise a continuous washing with fresh solvent) to ensure sufficient removal of free water.

Moreover, although FIG. 3A illustrates a particular order for blocks 302-314, embodiments of the disclosed subject matter are not limited thereto. Indeed, in certain embodiments, the blocks may occur in a different order than illustrated or simultaneously with other blocks. For example, the metal dissolution of process block 304 can occur after the immersion during the first time period of process block 306 and/or at a same time as the immersion during the second time period of process block 308.

Figure 3B:
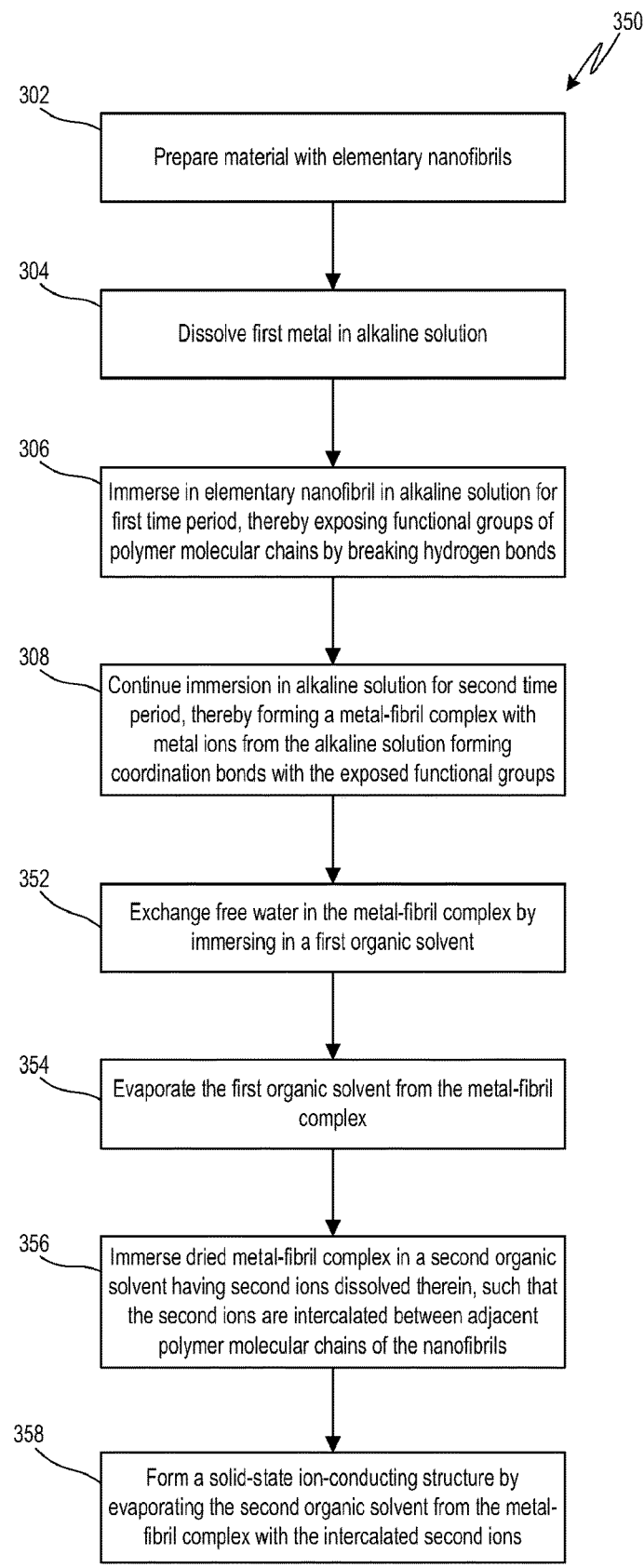

FIG. 3B shows another exemplary method 350 for fabricating a solid-state metal-fibril complex from one or more elementary nanofibrils. Process blocks 302-308 of method 350 may be substantially similar to process blocks 302-308 of method 300 in FIG. 3A. However, after process block 308 and before introduction of any second ions into the metal-fibril complex, method 350 can proceed to process block 352, where the metal-fibril complex is immersed in an organic solvent. Similar to process block 312 of method 300, the immersion of 352 in method 350 can be effective to replace free water molecules within the metal-fibril complex with molecules of the organic solvent.

The method 350 can proceed to process block 354, where the metal-fibril complex is dried to form an intermediate solid-state metal-fibril complex. Similar to process block 314 of method 300, the drying of 354 is effective to evaporate the organic solvent molecules from the metal-fibril complex, thereby maintaining the nanostructure of the elementary nanofibril(s), e.g., with the metal coordination bonds forming ion transport channels between the polymer molecular chains. However, the dried metal-fibril complex lacks intercalated second ions.

To provide the desired second ions, the method 350 can proceed to process block 356, where the metal-fibril complex is immersed in a second organic solvent. Similar to process block 310, the immersion of 356 allows the second ions that are dissolved in the second organic solvent to intercalate within the elementary nanofibril(s) (e.g., within the channels between the polymer molecular chains) by diffusion. For example, the second ions can be Li+, Na+, K+, Mg+, and/or proton (H+). Alternatively or additionally, the second ions can include a molecule that donates a proton, such as ammonium ion (e.g., $NH_4^+$). For example, the second organic solvent can include DMF, DMSO, PC, acetone, and/or EGDGE.

The method 350 can proceed to process block 358, where the metal-fibril complex is dried to form the final solid-state ion-conducting structure. Similar to process block 314 of method 300, the drying of 358 is effective to evaporate the second organic solvent molecules from the metal-fibril complex, thereby maintaining the nanostructure of the elementary nanofibril(s), e.g., with the metal coordination bonds forming ion transport channels between the polymer molecular chains and second ions intercalated therein.

Although process blocks 302-308 and 352-358 have been separately illustrated and described as occurring once, practical implementation of the disclosed embodiments may employ multiple repetitions of a particular process block before proceeding to the next process block. For example, the second ion immersion 356 may be repeated multiple times to ensure sufficient intercalation of the second ions within the metal-fibril complex. In another example, the organic solvent immersion 352 and/or second organic solvent immersion 356 may be repeated multiple times (or comprise a continuous washing with fresh solvent) to ensure sufficient removal of free water.

Moreover, although FIG. 3B illustrates a particular order for blocks 302-308 and 352-358, embodiments of the disclosed subject matter are not limited thereto. Indeed, in certain embodiments, the blocks may occur in a different order than illustrated or simultaneously with other blocks. For example, the metal dissolution of process block 304 can occur after the immersion during the first time period of process block 306 and/or at a same time as the immersion during the second time period of process block 308.

Ion-Conducting Structures Including Solid-State Metal-Fibril Complexes

After either method 300 or method 350, the resulting solid-state metal-fibril complex can be adapted for use as an ion-conducting structure and/or ion-selective structure in a particular application. For example, the solid-state metal-fibril complex can be used as a solid electrolyte, conductive additive or backbone, and/or ion conductive structure (membrane, cable, etc.) in any type of electronic device or system, such as, but not limited to electrical energy storage devices (e.g., battery, supercapacitor, etc.), electrical power generation systems (e.g., fuel cell, thermoelectric power generation device, osmotic power generation device), ion regulation or separation devices (e.g., cationic separation membrane, transistor), ion conduction components (e.g., nanofluidic ion conductor, ion-conducting additive, solid-state electrolyte), and biological applications (e.g., ion regulation). The above list of applications for the solid-state metal-fibril complex is not intended to be exhaustive. Indeed, application of the solid-state metal-fibril complex beyond those specifically listed above are also possible, and one of ordinary skill in the art will readily appreciate that the solid-state metal-fibril complex could be adapted to other applications based on the teachings of the present disclosure.

Figure 4A:
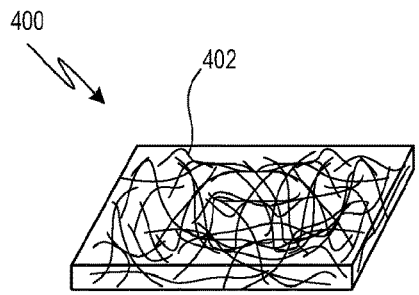
FIGS. 4A-4D are simplified perspective views of exemplary ion-conducting metal-fibril complexes formed as substantially-planar structures, according to one or more embodiments of the disclosed subject matter.

In some embodiments, the solid-state metal-fibril complex can be formed as a substantially planar structure, for example, a membrane or sheet having a thickness of 10 μm to 1000 μm, preferably 100 μm or less. For example, FIG. 4A shows an exemplary construction of a solid-state metal-fibril complex as a sheet 400 with random orientation of nanofibrils 402. Such a structure can result from chemical modification (e.g., performing method 300 or 350) of a paper starting material, for example, commercially-manufactured paper or paper formed by vacuum filtering and pressing of a slurry of the microfibrils and/or nanofibrils. The resulting sheet 400 can exhibits a smaller overall dimension than starting paper, for example, due to the collapse of internal pores (e.g., in the range of several microns to tens of microns) within the paper during the chemical modification. Alternatively, the sheet 400 can be formed by first performing the chemical modification (e.g., performing method 300 or 350) on elementary nanofibrils and then forming the resulting solid-state metal-fibril complex into a paper, for example, by vacuum filtering and pressing. In either case, due at least in part to the metal coordinate bonding, the resulting sheet 400 can be relatively stable under high pH aqueous conditions, unlike conventional paper that is unstable and tends to swell when exposed to such aqueous conditions.

Figure 4B:
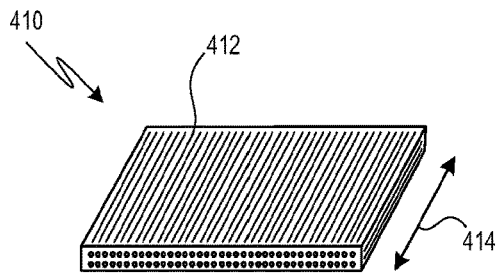
Figure 4C:
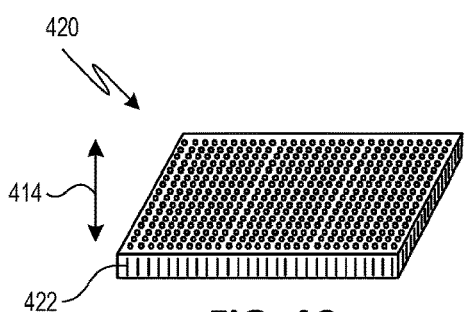

FIGS. 4B-4C show additional exemplary constructions of solid-state metal fibril complexes as membranes with order arrangement of nanofibrils. For example, the membrane 410 in FIG. 4B can result from chemical modification (e.g., performing method 300 or 350) of vertically-cut wood, such that the membrane 410 inherits the aligned hierarchical microstructure of the wood-starting material. Thus, the nanofibrils 412 within membrane 410 can extend along and be aligned substantially parallel to a wood growth direction 414 and/or to major surfaces (e.g., top and bottom surfaces) of the membrane 410. For example, the membrane 420 in FIG. 4C can result from chemical modification (e.g., performing method 300 or 350) of horizontally-cut wood, such that the membrane 420 inherits the aligned hierarchical microstructure of the wood-starting material. Thus, the nanofibrils 422 within membrane 420 can extend along and be aligned substantially parallel to a wood growth direction 414, but can be perpendicular to major surfaces (e.g., top and bottom surfaces) of the membrane 420.

Figure 4D:
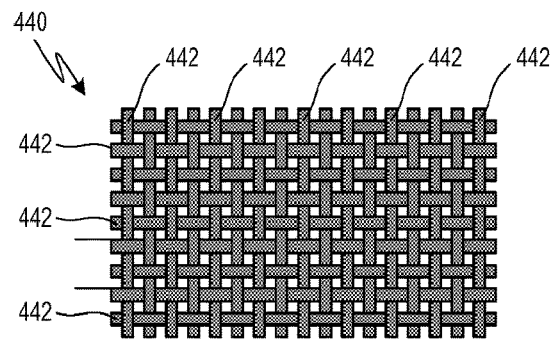

FIG. 4D shows another exemplary configuration of a solid-state metal-fibril complex as a membrane 440 with ordered arrangement of nanofibrils. For example, the membrane 440 can result from chemical modification (e.g., performing method 300 or 350) of a woven starting material, such as a textile of fabric (e.g., cotton). The woven starting material may include individual fibers 442 forming a regular array, each of the fibers 442 being formed of an aggregate of constituent elementary nanofibrils that are aligned with and follow the orientation of their associate fiber 442. Alternatively, the membrane 440 can be formed by first performing the chemical modification (e.g., performing method 300 or 350) on fibers 442 and then forming the weaving the solid-state metal-fibril complex into the patterned arrangement of membrane 440.

Figure 4E:
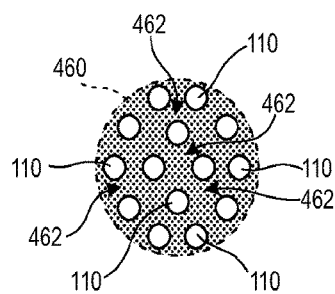
FIGS. 4E-4F are simplified schematic diagrams illustrating cross-sectional views of another ion-conducting metal-fibril complex formed by a single elementary nanofibril, according to one or more embodiments of the disclosed subject matter.
Figure 4F:
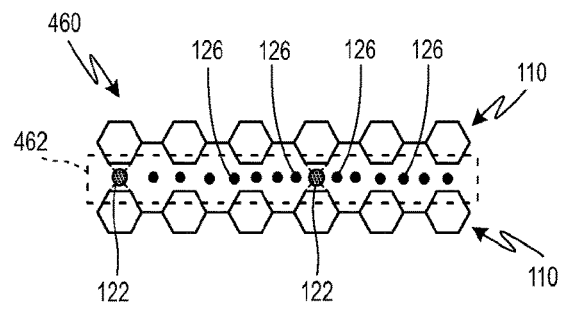

FIGS. 4E-4F shows yet another exemplary configuration of a solid-state metal-fibril complex as a single modified nanofibril 460. For example, the nanofibril 460 can result from chemical modification (e.g., performing method 300 or 350) on a fibrillated starting material. As with the other configurations, the nanofibril 460 includes metal ions 122 forming coordination bonds between functional groups of adjacent polymer molecular chains 110 to form ion transport channels 462 through the nanofibril 460, with second ions 126 intercalated between the polymer molecular chains 110 within the nanofibril 460. In some embodiments, the nanofibril 460 (or an aggregate of nanofibrils 460) can be incorporated into other structures, components, or members to improve the ion conducting properties thereof. For example, the nanofibril 460 can be integrated with another material to form an electrode of an electrical device.

Although particular shapes and fabrication techniques have been illustrated in and discussed with respect to FIGS. 4A-4F, other shapes and fabrication techniques are also possible according to one or more contemplated embodiments. Accordingly, the wood shapes and fabrication techniques are not limited to those specifically illustrated.

Devices Including Ion-Conducting Solid-State Metal-Fibril Complex Structures

In some embodiments, the solid-state metal-fibril complex can allow construction of a corresponding solid-state device, thereby avoiding potential performance issues associated with aqueous versions of such devices. For example, in some embodiments, the solid-state metal-fibril complex can be used as a solid-state electrolyte in a solid-state battery. Alternatively or additionally, the solid-state metal-fibril complex can be used as a conductive additive in one or both electrodes. As compared to conventional liquid-electrolyte batteries, the solid-state battery can be safer, provide an increased energy density, and/or offer greater flexibility with electrode material selection. For example, solid-state batteries can be safer by avoiding leakage (e.g., no liquid to leak), providing low flammability, and/or having improved mechanical strength (e.g., due to the solid nature of the solid-state metal-fibril complex). The higher packing density of the solid-state battery can result in the improved energy density as compared to conventional liquid-electrolyte batteries. The electrochemical stability and fewer side reactions of the solid-state electrolyte can allow for broad compatibility with various anodes and cathodes.

Figure 5A:
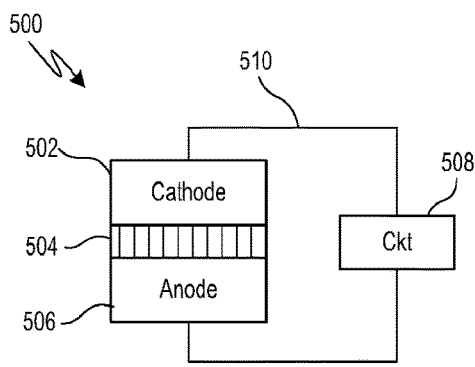
FIGS. 5A-5E are simplified schematic diagrams of exemplary battery systems employing solid-state ion-conducting metal-fibril complexes for one or more components, according to one or more embodiments of the disclosed subject matter.

FIG. 5A shows an exemplary battery system 500 that can employ a solid-state ion-conducting metal-fibril complex. The battery system 500 has a cathode 502 and an anode 506, each of which can be electrically coupled to an electrical circuit 508 (e.g., load, voltage source) by corresponding electrical connections 510. The battery system 500 can be configured as a solid-state system, with cathode 502 and anode 506 on opposite sides of and in contact with a separator membrane 504 that also acts a solid electrolyte. The separator membrane 504 can be or incorporate the solid-state metal-fibril complex, for example, having a construction as shown in any of FIGS. 4A-4D and/or fabricated according to the method of any of FIGS. 3A-3B. For example, the battery system 500 can be constructed as lithium-ion battery, and the solid-state metal-fibril complex of the separator membrane 504 can be a Cu-cellulose complex with Li ions intercalated therein. For example, the Cu-cellulose solid-state ion conductor, either with an aligned cellulose structure (e.g., as in FIG. 4B or 4C) or isotropic cellulose (e.g., as in FIG. 4A), can be processed into a thin dense layer (e.g., on the order of ~100 μm) so as to serve as the solid-state electrolyte in solid-state battery system 500.

Figure 5B:
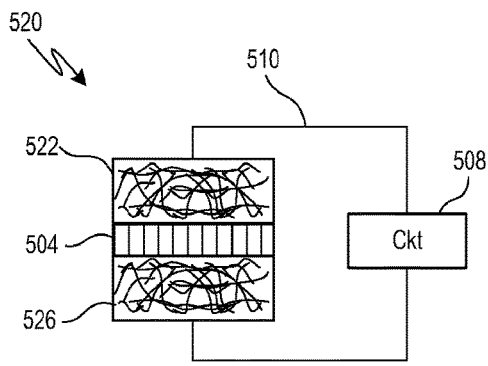

FIG. 5B shows another exemplary battery system 520 that can employ a solid-state ion-conducting metal-fibril complex. The battery system 520 has a cathode 522 and an anode 526, each of which can be electrically coupled to an electrical circuit 508 (e.g., load, voltage source) by corresponding electrical connections 510. The battery system 520 can be configured as a solid-state system, with cathode 522 and anode 526 on opposite sides of and in contact with a separator membrane 504 that also acts a solid electrolyte. As with system 500 of FIG. 5A, the separator membrane 504 can be or incorporate the solid-state metal-fibril complex, for example, having a construction as shown in any of FIGS. 4A-4D and/or fabricated according to the method of any of FIGS. 3A-3B. However, in contrast to system 500 of FIG. 5A, one or both of cathode 522 and anode 526 can also include a solid-state ion-conducting metal-fibril complex. For example, cathode 522 and/or anode 526 can include a random arrangement of elementary nanofibrils, each of which is a solid-state metal-fibril complex having a construction as shown in FIGS. 4E-4F and/or was fabricated according to the method of any of FIGS. 3A-3B. The solid-state metal-fibril complexes may be considered an additive to the electrodes, with the elementary nanofibrils intermixed with the electrode materials (e.g., base material), and may improve the ion-conductivity of the respective electrode by at least an order of magnitude versus the electrode material alone.

Figure 5C:
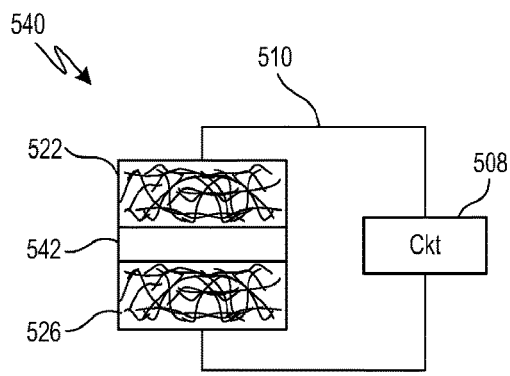

FIG. 5C shows another exemplary battery system 540 that can employ a solid-state ion-conducting metal-fibril complex. Similar to the battery system 520 of FIG. 5B, the battery system 540 has a cathode 522 and an anode 526, each of which can be electrically coupled to an electrical circuit 508 (e.g., load, voltage source) by corresponding electrical connections 510, and one or both of the cathode 522 and/or anode 526 includes a solid-state metal-fibril complex additive. However, instead of separator membrane 504 as in FIGS. 5A-5B, battery system 540 has a solid-state electrolyte 542, which can be a conventional solid-state electrolyte. For example, solid-state electrolyte 542 can be an oxide-based electrolytes (e.g., garnet $Li_7La_3Zr_2O_{12}$, Perovskite $Li_{3.3}La_{0.56}TiO_3$), sulfide-based electrolytes (e.g., $Li_2S$—$P_2S_5$, $Li_{10}GeP_2S_{12}$), or a polymer electrolytes (e.g., PEO, PVC, PMMA). Again, the solid-state metal-fibril complexes as additives to the cathode 522 and/or anode 526 can improve the ion-conductivity thereof, for example, by at least an order of magnitude.

Figure 5D:
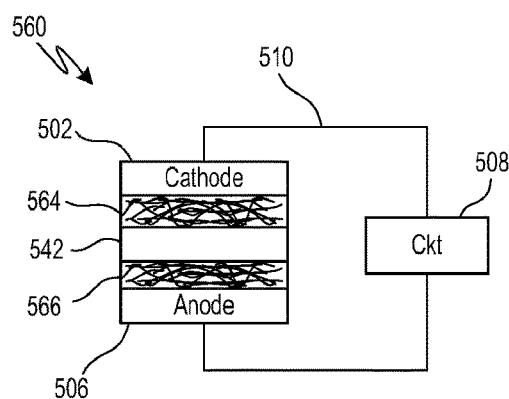

FIG. 5D shows yet another exemplary battery system 560 that can employ a solid-state ion-conducting metal-fibril complex. The battery system 560 has a cathode 502 and an anode 506, each of which can be electrically coupled to an electrical circuit 508 (e.g., load, voltage source) by corresponding electrical connections 510. Between the cathode 502 and the anode 506, a solid-state electrolyte 542 can be arranged. As with the system of FIG. 5C, the solid-state electrolyte 542 can be any type of conventional solid-state electrolyte. Alternatively, solid-state electrolyte 542 could instead be replaced with the separator membrane 504 of FIGS. 5A-5B.

In addition, between the cathode 502 and the solid-state electrolyte 542, a first solid electrolyte layer 564 can be disposed. In FIG. 5D, the electrolyte layer 564 is in contact with both the cathode 502 and the solid-state electrolyte 542. However, in some embodiments, the electrolyte layer 564 may be in contact with one or none of the cathode 502 and the solid-state electrolyte 542, for example, due to one or more intervening ion-conductive layers. Alternatively or additionally, a second solid electrolyte layer 566 can be disposed between the anode 506 and the solid-state electrolyte 542. In FIG. 5D, the electrolyte layer 566 is in contact with both the anode 506 and the solid-state electrolyte 542. However, in some embodiments, the electrolyte layer 566 may be in contact with one or none of the anode 506 and the solid-state electrolyte 542, for example, due to one or more intervening ion-conductive layers. The first electrolyte layer 564 and/or the second electrolyte layer 566 can each include or be formed of solid-state metal-fibril complexes, for example, having a construction as shown in any of FIGS. 4A-4D and/or fabricated according to the method of any of FIGS. 3A-3B. Alternatively or additionally, the first electrolyte layer 564 and/or the second electrolyte layer 566 can each include solid-state metal-fibril complexes as an ion-conductive additives, for example, having a construction as shown in any of FIGS. 4E-4F.

Figure 5E:
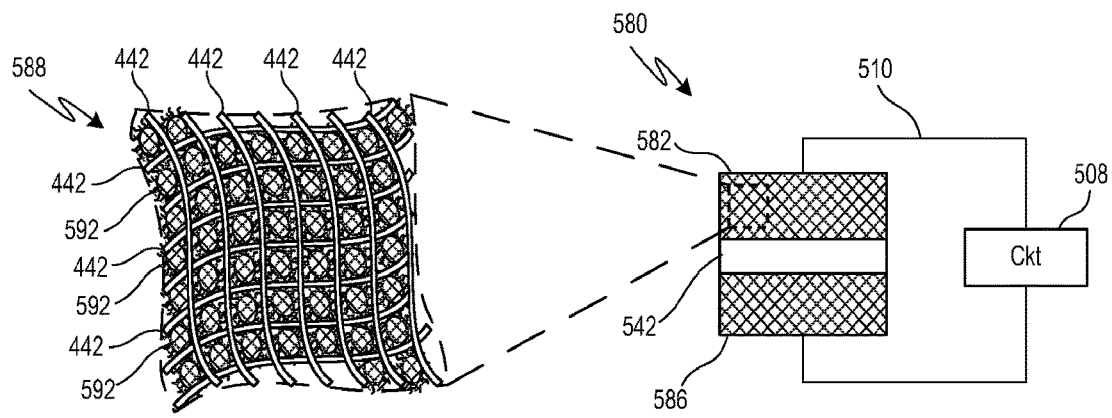

FIG. 5E shows another exemplary battery system 580 that can employ a solid-state ion-conducting metal-fibril complex. Similar to the battery system 540 of FIG. 5C, the battery system 580 has a cathode 582 and an anode 586, each of which can be electrically coupled to an electrical circuit 508 (e.g., load, voltage source) by corresponding electrical connections 510, and the solid-state electrolyte 542 between the cathode 582 and the anode 586 can be any type of conventional solid-state electrolyte or replaced with the separator membrane 504 of FIGS. 5A-5B. However, in contrast to FIG. 5C, one or both of the cathode 582 and/or anode 586 in system 580 includes an ion-conducting network 588 (also referred to as matrix) formed by the solid-state metal-fibril complex. For example, the network 588 may have a plurality of woven fibers 442, similar to the construction of FIG. 4D. The network 588 can serve as a support structure upon which the electrode particles 592 are dispersed on or embedded therein (e.g., in the narrow spaces between woven fibers). Similar to the use of the solid-state metal-fibril complex as an additive to the electrodes, the use of ion-conducting network 588 can improve the ion-conductivity of the resulting electrode versus the electrode particles 592 alone.

In any of the embodiments of FIGS. 5A-5E, the battery system can be constructed as a lithium ion battery. For example, the cathode can be formed of or include lithium cobalt oxide (LCO) ($LiCoO_2$), lithium manganese oxide (LMO) ($LiMn_2O_4$), lithium iron phosphate (LFP) ($LiFePO_4$/C), lithium nickel cobalt manganese oxide (NMC) ($LiNiCoMnO_2$), lithium nickel manganese spinel (LNMO) ($LiNi_{0.5}Mn_{1.5}O_4$), lithium nickel cobalt aluminum oxide (NCA) ($LiNiCoAlO_2$), and/or sulfur-carbon (S/C) composite. For example, the anode can be formed of or include graphite, silicon, and/or carbon. Alternatively, the anode can include a solid piece of metal Li in contact with the separator membrane or the solid-state electrolyte layer.

Figure 6A:
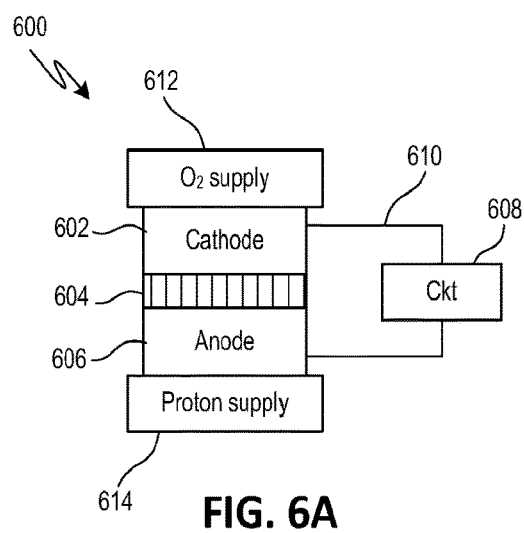
FIG. 6A is a simplified schematic diagram of a fuel cell system employing an ion-conducting metal-fibril complex, according to one or more embodiments of the disclosed subject matter.

FIG. 6A shows an exemplary fuel cell system 600 that can employ an ion-conducting metal-fibril complex. The fuel cell system 600 has a cathode 602 and an anode 606, each of which can be electrically coupled to an electrical circuit 608 (e.g., load) by corresponding electrical connections 610. For example, the cathode 602 and/or anode 606 can be formed of a metal, graphite, carbon composite, or carbon polymer composite. One or both of the cathode 602 and anode 606 can include an appropriate catalyst. The cathode 602 and anode 606 can be on opposite sides of and in contact with proton exchange membrane (PEM) 604. Coupled to the cathode is a first manifold 612 that delivers an oxidizing agent to the cathode 602, for example, air or oxygen, and removes waste products (e.g., water) therefrom. Coupled to the anode is another manifold 614 that delivers the chemical fuel to the anode 606, for example, hydrogen gas or other supply of protons, and removes unused fuel therefrom.

Fuel provided to the anode 606 by manifold 614 undergoes an oxidation reaction that generates protons and electrons. The protons move from the anode 606 to the cathode 602 via PEM 604, while the electrons move from the anode 606 to the cathode 602 via the external circuit (e.g., electrical connections 610 and circuit 608), thereby producing electrical power for use by circuit 608. The protons, electrons, and oxidizing agent react at the cathode 602 to form water, which is removed by manifold 612. At least PEM 604 of fuel cell system 600 can be or incorporate the disclosed metal-fibril complex, for example, having a construction as shown in any of FIGS. 4A-4D and/or fabricated according to the method of any of FIGS. 3A-3B. Alternatively or additionally, one or both of the cathode 602 and anode 606 can include or be formed of solid-state metal-fibril complexes, for example, similar to the construction of electrodes in FIGS. 5B-5E.

The metal-fibril complex of PEM 604 can be initially formed as a solid-state component as described above. However, in operation, PEM 604 may be exposed to relatively high humidity levels that would otherwise raise the amount of motive water therein above the threshold for being considered solid-state. Nevertheless, the initial structure has a solid-state construction and reverts to such construction when removed from the high humidity operational environment.

Figure 6B:
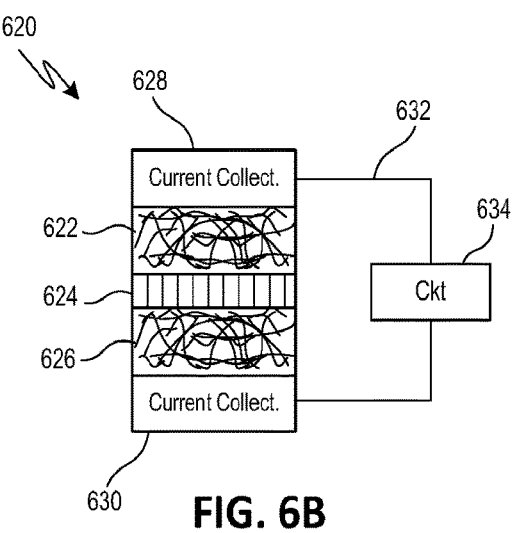
FIG. 6B is a simplified schematic diagram of a supercapacitor system employing a solid-state ion-conducting metal-fibril complex, according to one or more embodiments of the disclosed subject matter.

FIG. 6B shows an exemplary supercapacitor system 620 that can employ a solid-state ion-conducting metal-fibril complex. The supercapacitor system 620 has current collecting electrodes 628, 630, each of which can be electrically coupled to an electrical circuit 634 (e.g., load, voltage source) by corresponding electrical connections 632. Between the electrodes 628, 630 is disposed a pair of solid-electrolyte layers 622, 626, with a separator membrane 624 disposed therebetween.

The separator membrane 624 of supercapacitor system 620 can be formed of or incorporate the disclosed metal-fibril complex, for example, having a construction as shown in any of FIGS. 4A-4D and/or fabricated according to the method of any of FIGS. 3A-3B. Similarly, each of the solid-electrolyte layers 622, 626 include or be formed of solid-state metal-fibril complexes, for example, having a construction as shown in any of FIGS. 4A-4D and/or fabricated according to the method of any of FIGS. 3A-3B.

Any of the features illustrated or described with respect to one of the systems of FIGS. 5A-6B can be combined with any other of the systems of FIGS. 5A-6B to provide other systems and embodiments not otherwise illustrated or specifically described herein.

Aqueous Metal-Fibril Complexes

Figure 7:
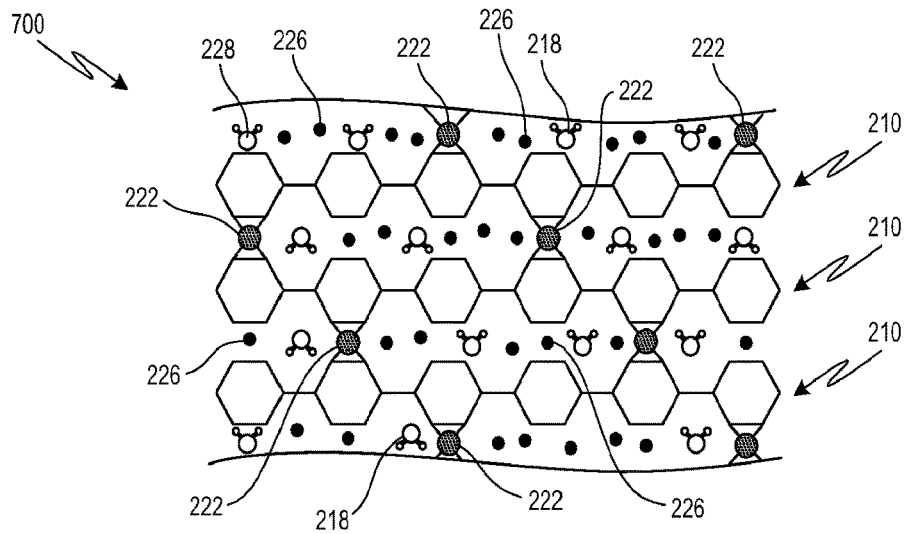
FIG. 7 is a simplified schematic diagram illustrating an aqueous ion-conducting structure formed by a metal-fibril complex with intercalated second ions, according to one or more embodiments of the disclosed subject matter.

In some embodiments, the polymer molecular chains of one or more elementary nanofibrils can be chemically modified to form an aqueous metal-fibril complex. The aqueous metal-fibril complex can be formed in a similar manner as that described above with respect to the solid-state metal-fibril complex, but without the solvent exchange and subsequent. Thus, as shown in FIG. 7, the aqueous metal-fibril complex 700 can have a similar structure and arrangement as the intermediate metal-fibril complex of FIG. 2D.

The aqueous metal-fibril complexes 700 may enjoy similar properties and performance advantages as the solid-state metal-fibril complexes. For example, the aqueous metal-fibril complexes can have high mechanical strength and solution stability. Moreover, the polymer molecular chains 210 of the aqueous metal-fibril complex 700 provide ion transport channels (e.g., ~1 nm in diameter) with a relatively high surface area (e.g., ~2400 m$^2$/g). The aligned confinement and the weak attraction between the partially-hydrated ions and the channel walls (e.g., formed by adjacent polymer molecular chains 210) can lead to a low-friction and rapid flow. For example, the aqueous metal-fibril complex 700 can offer a ~10× enhancement in mobility for a range of ions, including Li+, Na+ and K+. In some embodiments, the capability of the metal-fibril complex to promote fast and selective ion transport can overcome prior trade-offs between permeability and selectivity.

Fabrication of Aqueous Metal-Fibril Complexes

FIG. 8A shows an exemplary method 800 for fabricating an aqueous metal-fibril complex from one or more elementary nanofibrils. The method 800 can begin at process block 802, where a starting material for the elementary nanofibril(s) is prepared. For example, process block 802 can include by obtaining a structure including the naturally-occurring elementary nanofibril(s), modifying the structure in preparation for chemical modification, and/or forming the starting material into a desired structure, in a manner similar to that described in detail above for process block 302 in FIG. 3A.

The method 800 can proceed to process block 804, where a first metal is dissolved in an alkaline solution. For example, the alkaline solution can include NaOH, KOH, and/or LiOH, and the first metal can be any metal capable of forming a coordination bond with the functional groups of the polymer molecular chains, such as Cu, Zn, Al, Ca, and/or Fe. The method 800 can proceed to process block 806, where the elementary nanofibril(s) are immersed in the alkaline solution for a first time period, in order to break the hydrogen bonds between functional groups, thereby allowing the polymer molecular chains of the elementary nanofibril(s) to open up. The method 800 can proceed to process block 808, where the immersion in the alkaline solution is continued for a second time period, thereby forming a metal-fibril complex. For example, the further immersion allows the metal ions previously dissolved in the alkaline solution (or otherwise added to the solution during the first and/or second time periods) to diffuse into the opened space between the polymer molecular chains and to form a coordination bond to the exposed functional groups of adjacent molecular chains. Thus, process blocks 804-808 can proceed in a manner similar to that described above for process blocks 304-308 in FIG. 3A.

The method 800 can proceed to process block 810, where the metal-fibril complex can optionally be immersed in a second solution having second ions therein. As described above, the metal coordination bonds form channels between the adjacent polymer molecular chains of the elementary nanofibril(s), thereby allowing the second ions to diffuse within the elementary nanofibril(s) (e.g., within the channels between the polymer molecular chains), thereby forming the desired aqueous metal-fibril complex with intercalated second ions. For example, the second solution of process block 810 can include PC, EC, DMC, EMC, and/or DEC, and the second ions can be Li+, Na+, K+, Mg+, and/or proton (H+). Alternatively or additionally, the second ions can include a molecule that donates a proton, such as ammonium ion (e.g., NH$_4$+). To provide the desired second ions, an appropriate electrolyte or proton donor can be dissolved in the second solution. For example, a Li-ion electrolyte can include LiClO$_4$, LiPF$_6$, LiBF$_4$, LiTFSI, and/or LiFSI, or a proton-donor can include ammonia, ammonium nitrate, ammonium chloride, ammonium sulfate, polyacrylic acid, and/or citric acid. Beyond those specific examples listed herein, other electrolytes and proton donors known in the art for the desired second ions could also be used. Alternatively, the second ions can be provided in the alkaline solution of process blocks 806-808, in which case process block 810 may be considered an extension of 808 or otherwise omitted.

The method 800 can proceed to 812, where the aqueous metal-fibril complex is adapted for use in a particular device or application. Such applications include electrical energy storage devices (e.g., battery, etc.), electrical power generation systems (e.g., thermoelectric power generation device, osmotic power generation device), ion regulation or separation devices (e.g., cationic separation membrane, transistor), ion conduction components (e.g., nanofluidic ion conductor), and biological applications (e.g., ion regulation). The above list of applications for the aqueous metal-fibril complex is not intended to be exhaustive. Indeed, application of the aqueous metal-fibril complex beyond those specifically listed above are also possible, and one of ordinary skill in the art will readily appreciate that the aqueous metal-fibril complex could be adapted to other applications based on the teachings of the present disclosure. In some embodiments, the aqueous metal-fibril complex can be formed as a substantially planar structure, for example, a membrane or sheet having a thickness of 10 µm to 1000 µm, preferably 100 µm or less. For example, the aqueous metal-fibril complex can have constructions similar to that illustrated in FIGS. 4A-4F for the solid-state metal-fibril complexes.

Figure 8:
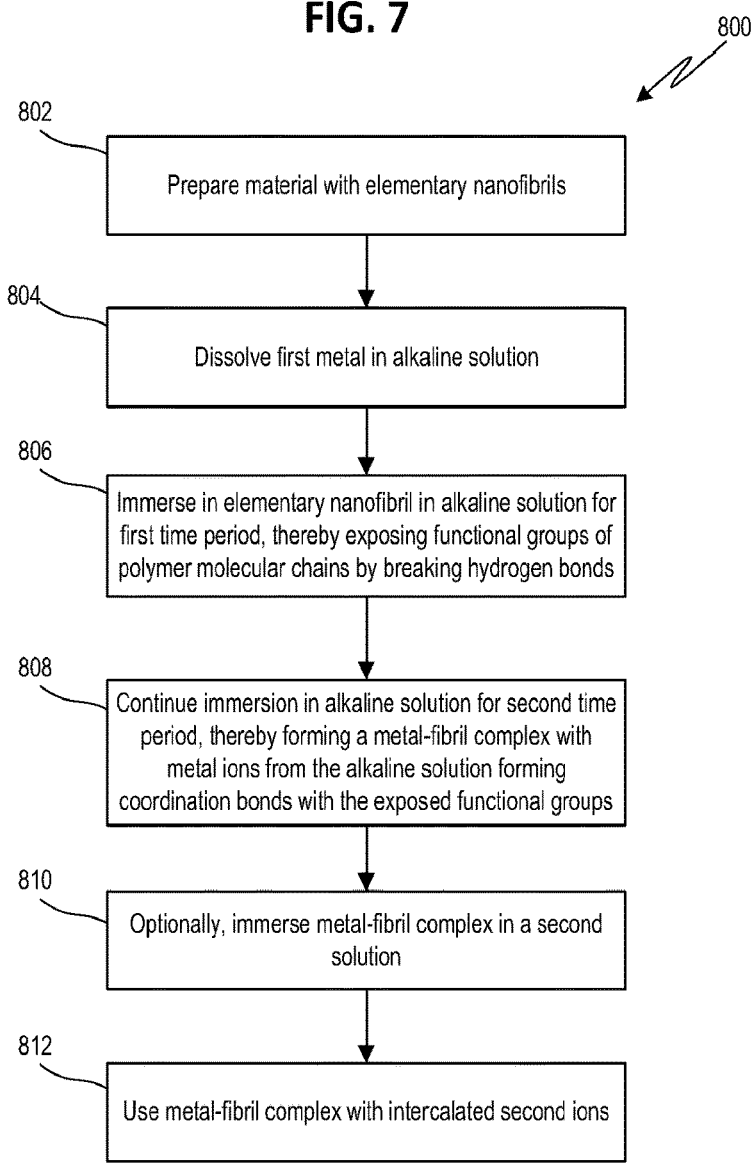
FIG. 8 a simplified process flow diagram for an exemplary method for fabricating an aqueous ion-conducting structure, according to one or more embodiments of the disclosed subject matter.

Although process blocks 802-814 have been separately illustrated and described as occurring once, practical implementation of the disclosed embodiments may employ multiple repetitions of a particular process block before proceeding to the next process block. For example, the second ion immersion 810 may be repeated multiple times to ensure sufficient intercalation of the second ions within the metal-fibril complex. Moreover, although FIG. 8 illustrates a particular order for blocks 802-814, embodiments of the disclosed subject matter are not limited thereto. Indeed, in certain embodiments, the blocks may occur in a different order than illustrated or simultaneously with other blocks. For example, the metal dissolution of process block 804 can occur after the immersion during the first time period of process block 806 and/or at a same time as the immersion during the second time period of process block 808.

Devices Including Ion-Conducting Aqueous Metal-Fibril Complex Structures

Figure 9:
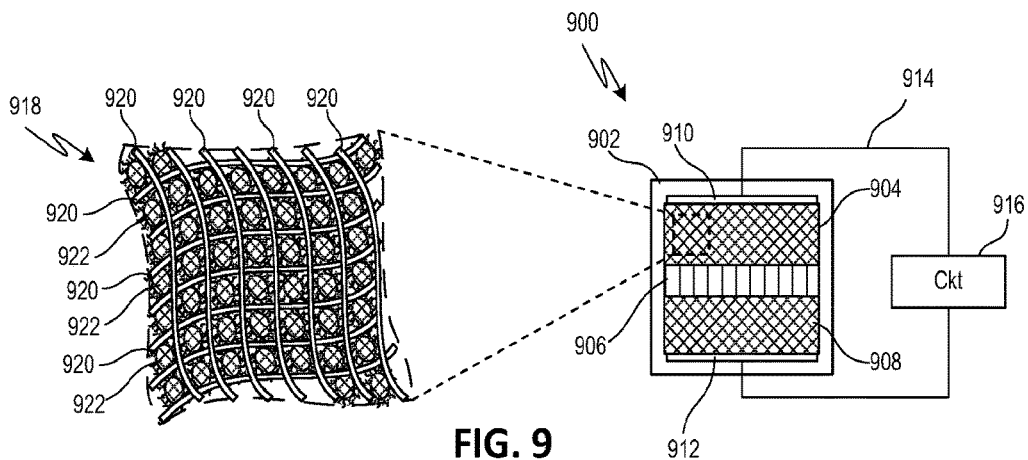
FIG. 9 is a simplified schematic diagram of an exemplary battery system employing an aqueous ion-conducting metal-fibril complex for one or more components, according to one or more embodiments of the disclosed subject matter.

FIG. 9 shows an exemplary battery system 900 that can employ an aqueous ion-conducting metal-fibril complex. The battery system 900 has a cathode 904 and an anode 908, each of which can be electrically coupled to an electrical circuit 916 (e.g., load, voltage source) by respective electrical contacts 910, 912 and corresponding electrical connections 914. Cathode 904 and anode 908 can be on opposite sides of and in contact with a separator membrane 906, all of which can be disposed in a common battery housing 902. The separator membrane 906 can be or incorporate the aqueous metal-fibril complex, for example, having a construction as shown in any of FIGS. 4A-4D and/or fabricated according to the method of FIG. 8. For example, a Cu-cellulose ion conductor, either with an aligned cellulose structure (e.g., as in FIG. 4B or 4C) or isotropic cellulose (e.g., as in FIG. 4A), can be processed into a thin dense layer (e.g., on the order of ~100 µm) so as to serve as the aqueous electrolyte in battery system 900.

One or both of the cathode 904 and/or anode 908 in system 900 can include an aqueous ion-conducting network 918 (also referred to as a matrix) formed by the aqueous metal-fibril complex. For example, the network 918 may have a plurality of woven fibers 920, similar to the construction of FIG. 4D. The network 918 can serve as a support structure upon which the electrode particles 922 are dispersed on or embedded therein (e.g., in the narrow spaces between woven fibers). Similar to the use of the solid-state metal-fibril complex as an additive to the electrodes, the use of ion-conducting network 918 can improve the ion-conductivity of the resulting electrode versus the electrode particles 922 alone. Alternatively, one or both of the cathode 904 and/or anode 908 can include aqueous metal-fibril complex as an additive to the electrode materials, for example, in a manner similar to that described above for solid-state metal-fibril complex additives in the electrodes of FIGS. 5B-5D.

For example, the battery system 900 of FIG. 9 can be constructed as a lithium ion battery. For example, the cathode can be formed of or include LCO, LMO, LFP, NMC, LNMO, NCA, and/or S/C composite. For example, the anode can be formed of or include graphite, silicon, and/or carbon. Alternatively, the anode can include a solid piece of metal Li in contact with the separator membrane or the solid-state electrolyte layer. For example, each of the aqueous metal-fibril complexes (e.g., in separator membrane 906 and/or electrodes 904, 908) can have Li ions intercalated therein.

Any of the features illustrated or described with respect to one of the systems of FIGS. 5A-6B and 9 can be combined with any other of the systems of FIGS. 5A-6B and 9 to provide other systems and embodiments not otherwise illustrated or specifically described herein.

Ion-Conducting Delignified Wood Structures

Figure 10A:
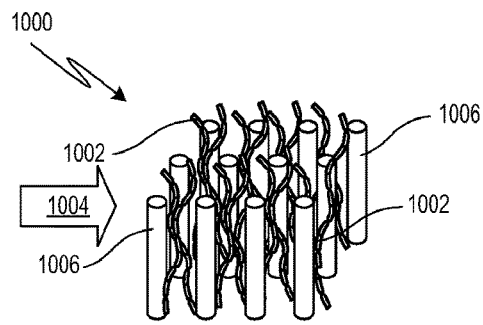
FIGS. 10A-10B are simplified schematic views of cellulose nanofibrils within a wood structure before and after delignification, respectively, in forming an exemplary ion-conducting structure, according to one or more embodiments of the disclosed subject matter.
Figure 10B:
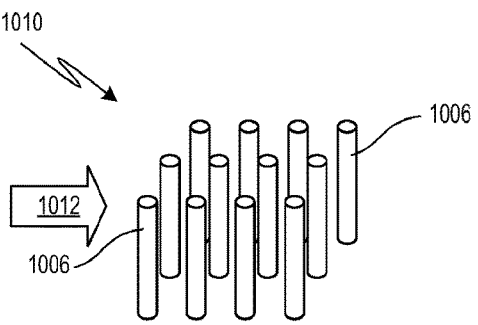

In some embodiments, the polymer molecular chains of one or more elementary nanofibrils can be chemically modified without forming metal coordination bonds between the functional groups of the polymer molecular chains. In some embodiments, aligned nanochannels can be formed between the elementary nanofibril, for example, cellulose nanofibrils produced from a wood structure. As discussed above and illustrated in FIG. 10A, a wood structure 1000 is primarily composed of cellulose nanofibrils 1006, hemicellulose, and lignin 1002, with the three components intertwining with each other to form a strong and rigid wall structure. The cellulose nanofibrils 1006 are substantially aligned along the wood growth direction, and the resulting ion-conducting structure can inherit this aligned microstructure after chemical modification. In some embodiments, a delignification treatment 1004 is performed on the wood structure 1000, thereby partially or fully removing lignin 1002 from the structure in order to expose the cellulose nanofibrils 1006, as shown in FIG. 10B. The delignification treatment 1004 may also simultaneously remove some, most, or all of the hemicellulose in the wood structure 1000, thereby yielding a structure 1010 comprised substantially of cellulose. For example, after delignification, the cellulose structure 1010 can have a hierarchical arrangement, with spacing between cellulose fiber bundles being about 30 nm, spacing between elementary nanofibrils 1006 within the bundles being about 2 nm, and spacing between cellulose molecular chains within the nanofibrils 1006 being about 0.7 nm.

Figure 10C:
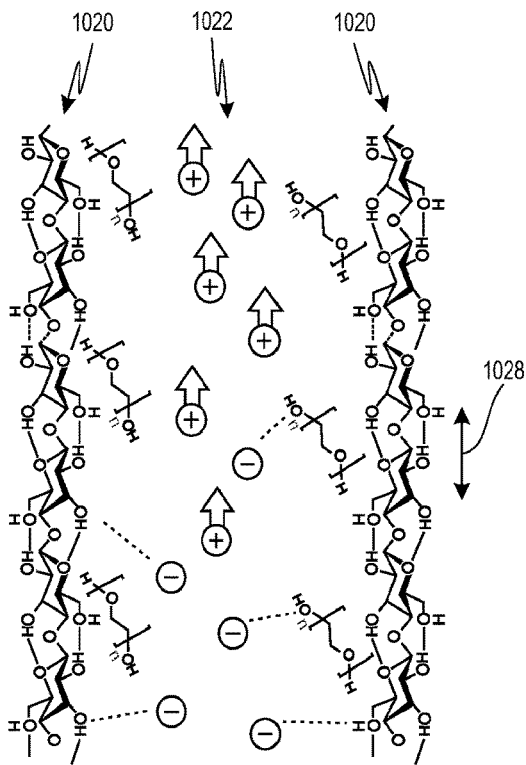
FIG. 10C is a simplified schematic diagram illustrating adjacent cellulose molecular channels in an exemplary cellulose nanofibril after chemical modification to act as an ion transport channel, according to one or more embodiments of the disclosed subject matter.

Due to the dissociation of the surface functional groups, the charged surface of cellulose nanofibrils 1020 can attract layers of counter-ions adjacent to the nanofibrils, with an exponentially decaying ion concentration toward the center of an ion transport channel 1022, as shown in FIG. 10C. The interface-dominated electrostatic field surrounding the cellulose nanofibrils 1020 thus provides regulated ion transport along the fiber direction 1028. In addition, the surface charge, the geometry, and/or the molecular structure of cellulose can be tuned to modify the ion regulation capability of the resulting structure. In some embodiments, the charge density and/or charge type of the functional groups of the polymer molecular chains can be modified by appropriate chemical treatment 1012. For example, in some embodiments, the elementary nanofibrils 1006 can be subjected to a TEMPO treatment to convert hydroxyl functional groups to carboxyl groups. Alternatively, in some embodiments, the elementary nanofibrils 1006 can be subjected to a CHPTAC treatment to convert the surface charge of the functional groups from negative to positive.

Fabrication of Ion-Conducting Delignified Wood Structures

Figure 11:
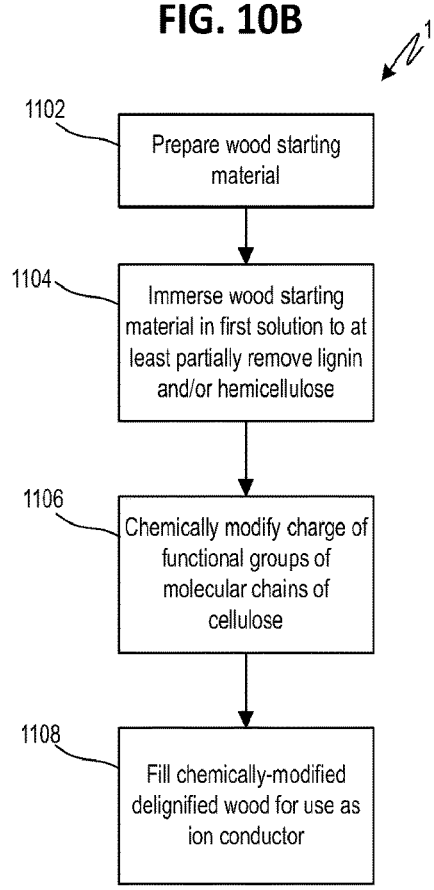
FIG. 11 is a simplified process flow diagram for a method for fabricating an ion-conducting structure from wood, according to one or more embodiments of the disclosed subject matter.

FIG. 11 shows an exemplary method 1100 for fabricating an ion-conducting cellulose structure from partially or fully delignified wood. The method 1100 can begin at process block 1102, where a starting wood material is prepared. For example, the preparing 1102 can include obtaining a pre-cut piece of wood with desired orientation or cutting a piece of wood to have a desired orientation (e.g., horizontal or rotational cutting perpendicular to the wood growth direction, vertical cutting parallel to the wood growth direction, and/or cutting at any angle crossing the wood growth direction).

The method 1100 can proceed to process block 1104, where the initial piece of wood is subject to partial delignification (e.g., 95% or less of lignin removed) or full delignification (e.g., at least 95% of lignin removed) in order to expose the cellulose nanofibrils of the wood. In some embodiments, delignification can be achieved by immersing the wood piece in a solution comprising chemicals used in pulping or pulp bleaching. For example, the chemical solution for delignification can include at least one of NaOH, $NaOH/Na_2S$, $NaHSO_3+SO_2+H_2O$, $NaHSO_3$, $NaHSO_3+Na_2SO_3$, $NaOH+Na_2SO_3$, $Na_2SO_3$, $NaOH+AQ$, $NaOH/Na_2S+AQ$, $NaHSO_3+SO_2+H_2O+AQ$, $NaOH+Na_2SO_3+AQ$, $NaHSO_3+AQ$, $NaHSO_3+Na_2SO_3+AQ$, $Na_2SO_3+AQ$, $NaOH+Na_2S+Na_2S_n$, $Na_2SO_3+NaOH+CH_3OH+AQ$, $CH_3OH$, $C_2H_5OH$, $C_2H_5OH+NaOH$, $C_4H_9OH$, HCOOH, $CH_3COOH$, $CH_3OH+HCOOH$, $C_4H_8O_2$, $NH_3.H_2O$, p-TsOH, $H_2O_2$, NaClO, $NaClO_2$+acetic acid, $ClO_2$, and $Cl_2$, where n in an integer and AQ is Anthraquinone. In some embodiments, the chemical treatment for delignification can be performed under vacuum, so as to encourage the chemical solution to fully penetrate the cell walls and lumina of the wood.

In some embodiments, the delignification of process block 1104 can comprise a single step chemical treatment, e.g., a single exposure to a single chemical or mixture of chemicals (e.g., a bath of $H_2O_2$). Alternatively, the chemical treatment for delignification can be a multi-step chemical treatment, e.g., a first exposure to a first chemical or mixture (e.g., a bath of NaOH and $Na_2SO_3$) followed by a second exposure to a second chemical or mixture (e.g., a bath of $H_2O_2$, 2.5 mol/L), for example, to ensure complete removal of lignin and/or hemicellulose. Further details regarding exemplary processes and materials for delignification are described in, for example, the International Publication Nos. WO 2018/191181, WO 2018/187238, and WO 2019/055789, incorporated by reference above.

The method 1100 can proceed to process block 1106, where the charge density and/or charge type of functional groups of the cellulose molecular chains are modified by chemical treatment. For example, in some embodiments, a TEMPO treatment is used to convert hydroxyl functional groups of the molecular chains in the exposed cellulose nanofibrils to carboxyl groups. Alternatively, in some embodiments, a CHPTAC treatment is used to convert the surface charge of the functional groups of the molecular chains in the exposed cellulose nanofibrils from negative charge to positive charge (e.g., quaternized cellulose). For example, in a mixed solution containing NaOH, urea, and distilled water, the quaternized cellulose was synthesized via a reaction between epoxide and cellulose sodium alkoxide. After chemical treatment with CHPTAC, the natural cellulose is converted into quaternized cellulose, which presents a positive charge in solution. Compared with the molecular structure of native cellulose, the resulting chemically-modified cellulose structure presents cationic functional groups (e.g., —$(CH3)_3N+$) via the extended side chain of cellulose.

The method 1100 can proceed to process block 1108, where the chemically-modified cellulose structure (e.g., membrane or paper) can be filled with an electrolyte for use as an ion conducting or ion selective structure (e.g., an ion separating device). For example, the chemically-modified cellulose structure can be filled with aqueous electrolyte (e.g., KCl, NaCl, etc.) or a polymer electrolyte (e.g., NaOH-based polymer electrolyte). In some embodiments, process block 1108 can further include filling the chemically-modified cellulose structure with a polymer or epoxy, for example, to block micro-sized channels within the cellulose structure while leaving nano-scale channels otherwise open for ion selection.

Although process blocks 1102-1108 have been separately illustrated and described as occurring once, practical implementation of the disclosed embodiments may employ multiple repetitions of a particular process block before proceeding to the next process block. Moreover, although not separately illustrated in FIG. 11 or discussed above, method 1100 may also include rinsing or other intermediate processing steps between illustrated process blocks 1102-1108.

Devices Including Ion-Conducting Delignified Wood Structures

Figure 12:
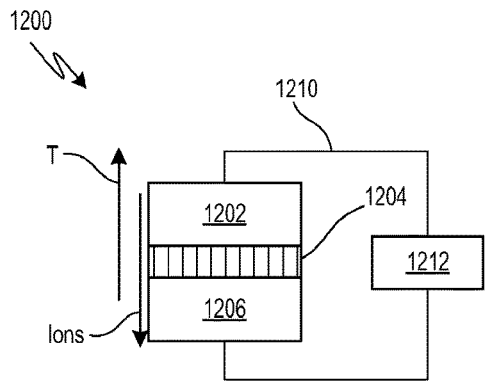
FIG. 12 is a simplified schematic diagram of an exemplary thermoelectric system employing a wood-based ion-conducting structure, according to one or more embodiments of the disclosed subject matter.

FIG. 12 shows an exemplary thermoelectric device 1200 that can employ an ion-conducting structure derived from delignified wood. The thermoelectric device 1200 has a pair of electrodes 1202, 1206 connected to a circuit 1212 (e.g., load, energy storage device) by corresponding electrical connections. An ion-conducting membrane 1204 can be disposed between the electrodes 1202, 1206 and can be infiltrated with electrolyte, for example a polymer electrolyte (e.g., NaOH-based polymer electrolyte). The ion-conducting membrane 1204 can be a chemically-modified cellulose-based ion conducting structure fabricated from wood, for example, using the method described above with respect to FIG. 11. For example, the cellulose-based membrane 1204 can be produced by extracting the lignin and hemicellulose from natural wood that has been vertically cut. After delignification, the naturally-aligned cellulose nanofibrils are retained and feature a negatively-charged surface. This negative charge can be further enhanced by TEMPO oxidation.

The cellulosic membrane 1204 relies on nanoscale confinement of the oxidized, aligned cellulose molecular chains to promote ionic selectivity, which can enhance thermoelectric performance. When a thermal gradient (T) is applied across the membrane 1204 (e.g., in a direction parallel to the ion transport channels therein), a Seebeck coefficient can be generated that exceeds that of the bulk electrolyte. The Seebeck coefficient can originate from the ionic selectivity of the negatively-charged cellulose nanofibers and the resulting development of surface-charge-governed ion transport (e.g., from electrode 1202, through membrane 1204, to electrode 1206), where a natural asymmetry in terms of the number density of positive and negative ions occurs within the nanoscale ion transport channels.

Figure 13:
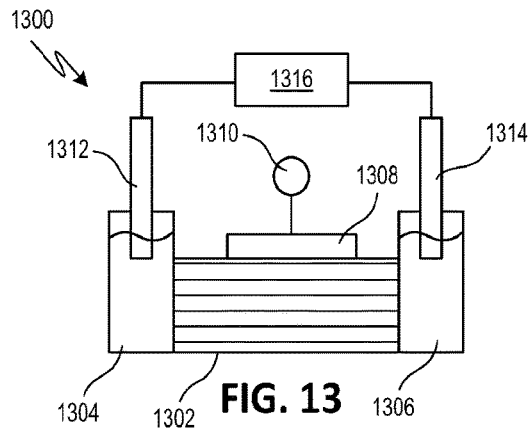
FIG. 13 is a simplified schematic diagram of an exemplary transistor employing a wood-based ion-conducting structure, according to one or more embodiments of the disclosed subject matter.

FIG. 13 shows an exemplary transistor 1300 that can employ an ion-conducting structure derived from delignified wood. The transistor 1300 can have a pair of electrolyte reservoirs 1304, 1306 (e.g., KCl) connected by an intervening ion-conducting membrane 1302. The ion-conducting membrane 1302 can also be filled with electrolyte (e.g., liquid electrolyte, such as KCl). The electrolyte reservoirs 1304, 1306 can have respective electrodes 1312, 1314 (e.g., Ag/AgCl electrodes) disposed therein to connect the reservoirs to a circuit 1316 (e.g., load, voltage source). A metal contact 1308 (e.g., silver film or paste) can be disposed on a surface of the ion-conducting membrane 1302 and can act as a gate for the transistor 1300. A voltage source 1310 can be electrically connected to the gate contact 1308 to modulate operation of the transistor 1300. The ion-conducting membrane 1302 can be a chemically-modified cellulose-based ion conducting structure fabricated from wood, for example, using the method described above with respect to FIG. 11.

Figure 14:
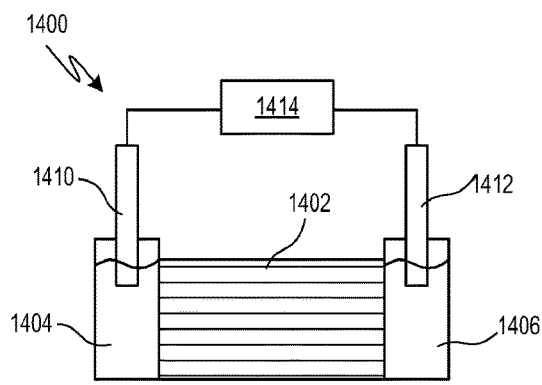
FIG. 14 is a simplified schematic diagram of an exemplary osmotic power generation system employing a wood-based ion selective structure, according to one or more embodiments of the disclosed subject matter.

FIG. 14 shows an exemplary osmotic power generation system 1400 that can employ an ion-conducting structure derived from delignified wood. The power generation system 1400 can have a pair of electrolyte reservoirs 1404, 1406 (e.g., NaCl) connected by an intervening ion-conducting membrane 1402. The electrolyte reservoirs 1404, 1406 can have respective electrodes 1410, 1412 (e.g., Ag/AgCl electrodes) disposed therein to connect the reservoirs to a circuit 1414 (e.g., load, power storage). An electrolyte concentration of one of the reservoirs 1404, 1406 can be substantially greater (e.g., at least 10×, 100×, or 1000×) than the electrolyte concentration in the other of the reservoirs 1404, 1406. For example, reservoir 1404 can contain seawater having a concentration of 100 mmol/L of NaCl, while reservoir 1406 can contain fresh water having a concentration of 0.001 mmol/L of NaCl.

The ion-conducting membrane 1402 can be a chemically-modified cellulose-based ion conducting structure fabricated from wood, for example, using the method described above with respect to FIG. 11. For example, the cellulose-based membrane 1402 can be produced by extracting the lignin and hemicellulose from natural wood that has been vertically cut. After delignification, the naturally-aligned cellulose nanofibrils are retained and feature a negatively-charged surface. In some embodiments, the ion-conducting membrane 1402 can be infiltrated with epoxy, for example, to block micro-sized lumens inherited from the original wood structure. The resulting polymer-filled membrane 1402 has aligned nanoscale channels along the wood growth direction that can remain open and that provide cation-selective fluidic pathways with negative surface charge due to the dissociation of the hydroxyl groups of the cellulose molecular chains. When exposed to the electrolyte concentration difference between the reservoirs 1404, 1406, an electrical double layer formed along the nanocellulose of the membrane 1402 allows the cations to efficiently pass through the open nanochannels while impeding the transport of anions, thereby establishing an electrical potential in an opposite direction as the cation movement direction.

Any of the features illustrated or described with respect to one of the systems of FIGS. 5A-6B, 9, and 12-14 can be combined with any other of the systems of FIGS. 5A-6B, 9, and 12-14 to provide other systems and embodiments not otherwise illustrated or specifically described herein.

Ion-Conducting Densified Wood Structures

Figure 15A:
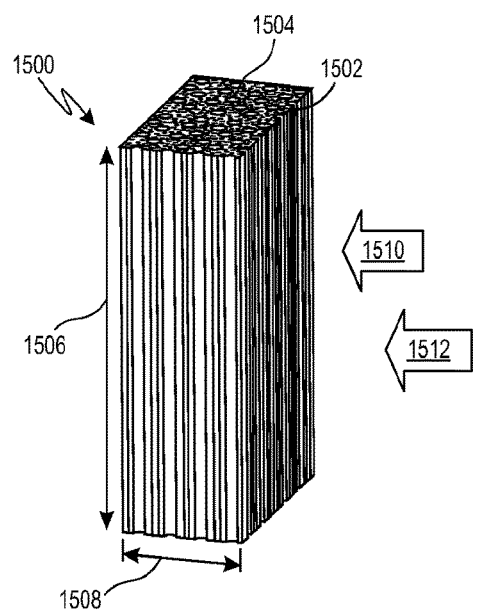
FIG. 15A is a simplified perspective view of a natural wood microstructure used in forming an exemplary ion-conducting structure, according to one or more embodiments of the disclosed subject matter.
Figure 15B:
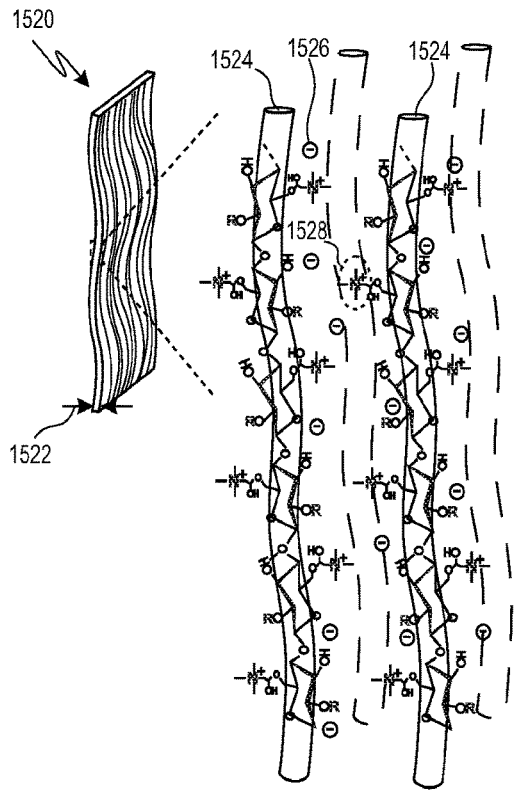
FIG. 15B shows a simplified perspective view (left) of an exemplary wood microstructure after chemical treatment and densification, and a simplified schematic diagram (right) illustrating adjacent cellulose molecular chains of the exemplary wood microstructure, according to one or more embodiments of the disclosed subject matter.

In some embodiments, cellulose structures formed from wood can be densified before or after chemical modification to form ion-conducting structures. As discussed above and illustrated in FIG. 15A, a wood structure 1500 has an aligned microstructure that would be retained after the chemical modification. In particular, the microstructure includes large size pores 1502 and smaller size wood cell lumen 1504 that extend along the wood growth direction 1506. Densification can thus be used to remove the micro-size pores 1502 and lumen 1504, as shown in FIG. 15B, thereby ensuring the nanoscale ion transport channels produced by the chemical modification are the preferred transport path for ions.

For example, a chemical treatment 1510 (e.g., TEMPO or CHPTAC) can be used to modify functional groups of the cellulose molecular chains. The chemically modified wood can then be subjected to densification 1512, for example, by pressing in a direction crossing the wood growth direction 1506, such that a thickness 1508 of the wood is reduced. For example, the densification may be such that a final thickness 1522 has been reduced by at least 75% (e.g., by at least 90%) as compared to the original thickness 1508. The densification 1512 can reduce the amount of space between the wood cellulose fiber channels (e.g., pores 1502, lumen 1504), thereby removing larger diameter pathways that exceed the Debye length and ensuring the membrane's dense structure, high strength, and high ionic conductivity.

In some embodiments, the chemical treatment 1510 can directly modify the cellulose and hemicellulose of wood using CHPTAC via etherification, thereby introducing cationic ions $(CH_3)_3N^+$ (e.g., at 1528) onto the surface of the nanofluidic channels between cellulose molecular chains 1524 for transport of ions 1526 therein. The resulting chemically-modified wood structure can thus act a cationic wood membrane.

Fabrication of Ion-Conducting Densified Wood Structures

Figure 16:
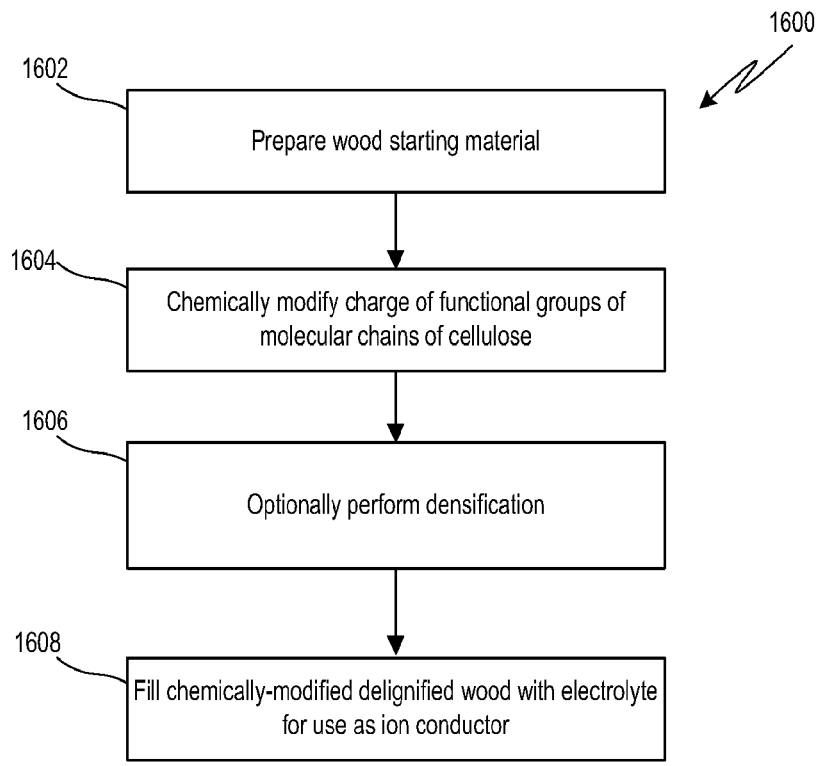
FIG. 16 is a simplified process flow diagram for another exemplary method for fabricating an ion-conducting structure from wood, according to one or more embodiments of the disclosed subject matter.

FIG. 16 shows an exemplary method 1600 for fabricating an ion-conducting cellulose structure from densified wood. The method 1600 can begin at process block 1602, where a starting wood material is prepared. For example, the preparing 1602 can include obtaining a pre-cut piece of wood with desired orientation or cutting a piece of wood to have a desired orientation (e.g., horizontal or rotational cutting perpendicular to the wood growth direction, vertical cutting parallel to the wood growth direction, and/or cutting at any angle crossing the wood growth direction).

The method 1600 can proceed to process block 1604, where the charge density and/or charge type of functional groups of the cellulose molecular chains in the initial wood are modified by chemical treatment. For example, in some embodiments, a TEMPO treatment is used to convert hydroxyl functional groups of the molecular chains in the exposed cellulose nanofibrils to carboxyl groups. Alternatively, in some embodiments, a CHPTAC treatment is used to convert the surface charge of the functional groups of the molecular chains in the exposed cellulose nanofibrils from negative charge to positive charge (e.g., quaternized cellulose). For example, in a mixed solution containing NaOH, urea, and distilled water, the quaternized cellulose was synthesized via a reaction between epoxide and cellulose sodium alkoxide. After chemical treatment with CHPTAC, the natural cellulose is converted into quaternized cellulose, which presents a positive charge in solution. Compared with the molecular structure of native cellulose, the resulting chemically-modified cellulose structure presents cationic functional groups (e.g., —$(CH3)_3N+$) via the extended side chain of cellulose.

The method 1600 can proceed to process block 1606, where the chemically-modified wood can optionally be subject to densification. For example, the wood can be densified by pressing in a direction crossing the wood growth direction, such that a thickness of the wood is reduced. The densification may eliminate, or at least reduce, micro-scale or larger spaces within the chemically-modified wood, while retaining flow paths that are less the Debye length. In some embodiments, the densification of process block 1606 can be performed without delignification of the wood structure. In other embodiments, delignification may be performed prior to or after densification. Further details regarding exemplary densification processes are described in, for example, International Publication Nos. WO 2018/191181 and WO 2019/055789, which were incorporated by reference above.

The method 1600 can proceed to process block 1608, where the chemically-modified, densified cellulose structure (e.g., membrane or paper) can be filled with an electrolyte for use as an ion conducting or ion selective structure. For example, the chemically-modified, densified cellulose structure can be filled with aqueous electrolyte (e.g., KCl, NaCl, etc.) or a polymer electrolyte (e.g., NaOH-based polymer electrolyte).

Although process blocks 1602-1608 have been separately illustrated and described as occurring once, practical implementation of the disclosed embodiments may employ multiple repetitions of a particular process block before proceeding to the next process block. Moreover, although not separately illustrated in FIG. 16 or discussed above, method 1600 may also include rinsing or other intermediate processing steps between illustrated process blocks 1602-1608.

Devices Including Ion-Conducting Densified Wood Structures

In some embodiments, a chemically-modified, densified wood structure can be employed as an ion selective membrane, for example, a cationic membrane. The cationic membrane can be fabricated from wood, for example, using the method described above with respect to FIG. 16. For example, the cellulose and hemicellulose of wood can be chemically modified using CHPTAC via etherification, which introduces cationic ion —$(CH_3)_3N^+$ onto the surface of the nanofluidic wood channels for ionic transport for the first time. Subsequent densification eliminate larger channels in the wood structure in favor of a large number of nanofluidic channels. When situated between electrolyte reservoirs (for example, in a configuration similar to that illustrated in FIG. 14), the cationic membrane can facilitate the transport of negatively charged ions therethrough while preventing, or at least inhibiting, the passage of positively charged ions. The cationic wood membrane can thus provide efficient ion conductance via the large number of nanofluidic channels.

Any of the features illustrated or described with respect to one of the systems of FIGS. 5A-6B, 9, 12-14, and the above-described cationic membrane can be combined with any other of the systems of FIGS. 5A-6B, 9, 12-14 and above-described cationic membrane to provide other systems and embodiments not otherwise illustrated or specifically described herein.

REPRESENTATIVE EMBODIMENTS

Certain representative embodiments are exemplified in the following numbered clauses:

1. An ion-conducting structure, comprising a metal-fibril complex formed by one or more elementary nanofibrils, each elementary nanofibril being composed of a plurality of cellulose molecular chains with functional groups, each elementary nanofibril having a plurality of metal ions, each metal ion acting as a coordination center between the functional groups of adjacent cellulose molecular chains so as to form a respective ion transport channel between the cellulose molecular chains, wherein the metal-fibril complex comprises a plurality of second ions, each second ion being disposed within one of the ion transport channels so as to be intercalated between the corresponding cellulose molecular chains, and wherein the metal-fibril complex is a solid-state structure.

2. The ion-conducting structure of clause 1, wherein the metal-fibril complex further comprises polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

3. The ion-conducting structure of any of clauses 1-2, wherein the plurality of metal ions comprises copper (Cu), zinc (Zn), aluminum (Al), calcium (Ca), iron (Fe), or combinations thereof.

4. The ion-conducting structure of any of clauses 1-3, wherein the plurality of second ions comprises lithium (Li+), sodium (Na+), potassium (K+), magnesium (Mg+), protons (H+), or combinations thereof.

5. The ion-conducting structure of any of clauses 1-4, wherein a width of each ion transport channel is about 1 nm, and a spacing between adjacent ion transport channels within each elementary nanofibril is less than 2 nm.

6. The ion-conducting structure of any of clauses 1-5, wherein each elementary nanofibril comprises at least ten cellulose molecular chains, preferably, 12-36 cellulose molecular chains, inclusive.

7. The ion-conducting structure of any of clauses 1-6, wherein the metal-fibril complex has a plurality of the elementary nanofibrils and is formed as a sheet, film, or membrane.

8. The ion-conducting structure of any of clauses 1-7, wherein the sheet, film, or membrane has a thickness between 10 μm and 1000 μm, inclusive.

9. The ion-conducting structure of any of clauses 1-8, wherein the metal-fibril complex has a conductivity of at least $10^{-4}$ S/cm.

10. The ion-conducting structure of any of clauses 1-9, wherein a total content of water within the metal-fibril complex is less than or equal to 10 wt %.

11. The ion-conducting structure of any of clauses 1-10, wherein a content of bound water within the metal-fibril complex is less than or equal to 8 wt %.

12. A device comprising an electrode or ion-conducting member, the electrode or ion-conducting member having the ion-conducting structure of any of clauses 1-11 dispersed therein as a conductive additive.

13. The device of clause 12, wherein the device is constructed as a battery, a fuel cell, a supercapacitor, a transistor, a thermal power harvesting device, an electricity generating device, or an ion separating device.

14. A device comprising a membrane, the membrane comprising the ion-conducting structure of any of clauses 1-11.

15. The device of clause 14, wherein the device is constructed as a battery, a fuel cell, a supercapacitor, a transistor, a thermal power harvesting device, an electricity generating device, or an ion separating device.

16. A battery comprising: first and second electrodes; and a separator membrane between the first and second electrodes, the separator membrane comprising a solid-state metal-fibril complex, wherein one of the first and second electrodes operates as a cathode and the other of the first and second electrodes operates as an anode, the solid-state metal-fibril complex is formed by a plurality of first nanofibrils, each first nanofibril being composed of a plurality of cellulose molecular chains with first functional groups, each first nanofibril having a plurality of first metal ions, each first metal ion acting as a first coordination center between the first functional groups of adjacent cellulose molecular chains so as to form a respective first ion transport channel through the separator membrane, and the solid-state metal-fibril complex comprises a plurality of second ions, each second ion being disposed within one of the first ion transport channels so as to be intercalated between the corresponding cellulose molecular chains.

17. The battery of clause 16, wherein: the first electrode, the second electrode, or both the first and second electrodes comprise a base material and an additive interspersed within the base material, the additive comprises one or more second nanofibrils, each second nanofibril being composed of a plurality of second cellulose molecular chains with second functional groups, each second nanofibril having a plurality of second metal ions, each second metal ion acting as a second coordination center between the second functional groups of adjacent second cellulose molecular chains so as to form a respective second ion transport channel between the second cellulose molecular chains, each second nanofibril comprising a plurality of third ions, each third ion being disposed within a respective one of the second ion transport channels so as to be intercalated between the corresponding second cellulose molecular chains.

18. A battery comprising: first and second electrodes, one of the first and second electrodes operating as a cathode and the other of the first and second electrodes operating as an anode; and a separator between the first and second electrodes, the separator comprising a solid-state electrolyte, the first electrode, the second electrode, or both the first and second electrodes comprise a solid-state metal-fibril complex, the solid-state metal-fibril complex is formed by a plurality of nanofibrils, each nanofibril being composed of a plurality of cellulose molecular chains with functional groups, each nanofibril having a plurality of metal ions, each metal ion acting as a coordination center between the functional groups of adjacent cellulose molecular chains so as to form a respective ion transport channel between the cellulose molecular chains, and the solid-state metal-fibril complex comprises a plurality of second ions, each second ion being disposed within one of the ion transport channels so as to be intercalated between the corresponding cellulose molecular chains.

19. The battery of clause 18, wherein the solid-state electrolyte comprises an oxide-based electrolyte, a sulfide-based electrolytes, a polymer electrolyte, or combinations thereof.

20. The battery of one of clauses 16-19, wherein the solid-state metal-fibril complex, the additive, or both the solid-state metal-fibril complex and the additive further comprise polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

21. The battery of one of clauses 16-20, wherein: each metal ion comprises copper (Cu), zinc (Zn), aluminum (Al), calcium (Ca), iron (Fe), or combinations thereof; and/or the second ions, the third ions, or both the second ions and the third ions comprise lithium (Li), sodium (Na), potassium (K), magnesium (Mg), or combinations thereof.

22. The battery of one of clauses 16-21, wherein: the first electrode operates as the anode and comprises graphite, silicon, carbon, or combinations thereof; and/or the second electrode operates as the cathode and comprises lithium cobalt oxide (LCO) (LiCoO$_2$), lithium manganese oxide (LMO) (LiMn$_2$O$_4$), lithium iron phosphate (LFP) (LiFePO$_4$/C), lithium nickel cobalt manganese oxide (NMC) (LiNiCoMnO$_2$), lithium nickel manganese spinel (LNMO) (LiNi$_{0.5}$Mn$_{1.5}$O$_4$), lithium nickel cobalt aluminum oxide (NCA) (LiNiCoAlO$_2$), sulfur-carbon (S/C) composite, or combinations thereof.

23. The battery of one of clauses 16-22, wherein: each of the first and second electrodes is in contact with the separator membrane; and the separator membrane is constructed to operate as a solid-state electrolyte between the first and second electrodes.

24. The battery of one of clauses 16-23, wherein the separator membrane or the solid-state electrolyte has a thickness between 10 μm and 1000 μm, inclusive.

25. A method, comprising: (a) forming a metal-fibril complex by immersing a plurality of elementary nanofibrils within an alkaline solution having a concentration of at least 5% (w/v) and a plurality of metal ions dissolved therein, each elementary nanofibril being composed of a plurality of cellulose molecular chains with functional groups, the immersing being such that hydrogen bonds between adjacent functional groups of the cellulose molecular chains are broken so as to expose the functional groups and such that the dissolved metal ions from the alkaline solution form coordination bonds with the exposed functional groups; (b) after (a), intercalating second ions between adjacent cellulose molecular chains of the metal-fibril complex by immersing the metal-fibril complex in a first solution having a plurality of the second ions dissolved therein; (c) after (a), replacing free water in the metal-fibril complex by immersing the metal-fibril complex in an organic solvent; and (d) after (c), drying the metal-fibril complex such that a total content of water within the metal-fibril complex is less than or equal to 10 wt %, thereby forming the metal-fibril complex with intercalated second ions as a solid-state ion conducting structure, wherein: (i) the first solution is the organic solvent, and the intercalating of (b) and the replacing free water of (c) are performed simultaneously, or (ii) the first solution is separate from the organic solvent, and the intercalating of (b) is performed before or after the replacing free water of (c).

26. The method of clause 25, wherein the elementary nanofibrils further comprise polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

27. The method of any of clauses 25-26, wherein the plurality of metal ions comprises copper (Cu), zinc (Zn), aluminum (Al), calcium (Ca), iron (Fe), or combinations thereof.

28. The method of any of clauses 25-27, wherein the plurality of second ions comprises lithium (Li), sodium (Na), potassium (K), magnesium (Mg), protons (H+), or combinations thereof.

29. The method of any of clauses 25-28, wherein the alkaline solution comprises sodium hydroxide (NaOH), potassium hydroxide (KOH), lithium hydroxide (LiOH), or combinations thereof.

30. The method of any of clauses 25-29, wherein the first solution comprises propylene carbonate (PC), ethylene carbonate (EC), dimethyl carbonate (DMC), ethylmethyl carbonate (EMC), diethyl carbonate (DEC), or combinations thereof.

31. The method of any of clauses 25-30, wherein the organic solvent comprises dimethylformamide (DMF), dimethyl sulfoxide (DMSO), propylene carbonate (PC), acetone, ethylene glycol diglycidyl ether (EGDGE), or combinations thereof.

32. The method of any of clauses 25-31, wherein the organic solvent comprises DMSO, EGDGE, or combinations thereof, and, after (c), the cellulose molecular chains have a crystalline morphology.

33. The method of any of clauses 25-32, wherein the organic solvent comprises DMF, PC, acetone, or combinations thereof, and, after (c), the cellulose molecular chains have an amorphous morphology.

34. The method of any of clauses 25-33, wherein, prior to (a), each elementary nanofibril has a diameter less than 5 nm and comprises at least ten cellulose molecular chains, preferably 12-36 cellulose molecular chains.

35. The method of any of clauses 25-34, wherein, after (a), ion transport channels are formed between adjacent cellulose molecular chains by the metal ions acting as coordination centers between the functional groups, a width of each ion transport channel is about 1 nm, and a spacing between adjacent ion transport channels is less than 2 nm.

36. The method of any of clauses 25-35, further comprising, prior to (a), subjecting a parent structure containing the elementary nanofibrils to a mechanical fibrillation process, a chemical fibrillation process, an enzymatic fibrillation process, or combinations thereof, so as to expose the nanofibrils from the parent structure.

37. The method of any of clauses 25-36, wherein the parent structure comprises a block of natural wood or a piece of paper formed of cellulose fibers.

38. The method of any of clauses 25-37, further comprising, prior to (a), forming the elementary nanofibrils into a sheet, membrane, or paper.

39. The method of any of clauses 25-38, further comprising, after (d), disposing the solid-state ion conducting structure between a pair of electrodes to form a battery, the metal-fibril complex with intercalated second ions acting as a solid-state separator for the battery.

40. The method of any of clauses 25-39, further comprising, after (d), interspersing the metal-fibril complex with intercalated second ions within an electrode of a battery to act as an ion-conductive additive for the electrode.

41. The method of any of clauses 25-40, further comprising, after (d), using the metal-fibril complex with intercalated second ions as a solid-state ion-conducting component in a device.

42. The method of any of clauses 25-41, wherein the device is a battery, a fuel cell, a supercapacitor, a transistor, a thermal power harvesting device, an electricity generating device, or an ion separating device.

43. An ion-conducting structure, comprising: a metal-fibril complex formed by one or more elementary nanofibrils, each elementary nanofibril being composed of a plurality of polymer molecular chains with functional groups, each elementary nanofibril having a plurality of metal ions, each metal ion acting as a coordination center between the functional groups of adjacent molecular chains so as to form a respective ion transport channel between the molecular chains.

44. The ion-conducting structure of clause 43, wherein the metal-fibril complex comprises a plurality of second ions, each second ion being disposed within a respective one of the ion transport channels so as to be intercalated between the corresponding molecular chains.

45. The ion-conducting structure of any of clauses 43-44, wherein the metal-fibril complex is a solid-state structure.

46. The ion-conducting structure of any of clauses 43-45, wherein the metal-fibril complex comprises polysaccharide, poly(vinyl chloride) (PVC), poly(vinyl alcohol) (PVA), poly (acrylic acid) (PAA), poly(ethylene oxide) (PEO), poly (acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

47. The ion-conducting structure of any of clauses 43-46, wherein each polymer molecular chain comprises a naturally-occurring polysaccharide.

48. The ion-conducting structure of any of clauses 43-47, wherein the naturally-occurring polysaccharide comprises cellulose, chitosan, chitin, or combinations thereof.

49. The ion-conducting structure of any of clauses 43-48, wherein the plurality of metal ions comprises copper (Cu), zinc (Zn), aluminum (Al), calcium (Ca), iron (Fe), or combinations thereof.

50. The ion-conducting structure of any of clauses 43-49, wherein the plurality of second ions comprises lithium (Li+), sodium (Na+), potassium (K+), magnesium (Mg+), protons (H+), or combinations thereof.

51. The ion-conducting structure of any of clauses 43-50, wherein a width of each ion transport channel is less than 2 nm.

52. The ion-conducting structure of any of clauses 43-51, wherein the metal-fibril complex has a plurality of the elementary nanofibrils and is formed as a sheet, film, or membrane.

53. The ion-conducting structure of any of clauses 43-52, wherein the metal-fibril complex has a conductivity of at least $10^{-4}$ S/cm.

54. The ion-conducting structure of any of clauses 43-53, wherein a content of total liquid within the metal-fibril complex is less than or equal to 10 wt %.

55. The ion-conducting structure of any of clauses 43-54, wherein a content of bound liquid within the metal-fibril complex is less than or equal to 8 wt %.

56. A battery comprising: first and second electrodes, one of the first and second electrodes operating as a cathode and the other of the first and second electrodes operating as an anode; and a solid electrolyte membrane between the first and second electrodes, wherein the first electrode, the second electrode, the solid electrolyte membrane, or any combination thereof comprises the ion-conducting structure of any of clauses 43-55.

57. The battery of clause 56, wherein the anode comprises graphite, silicon, carbon, or combinations thereof.

58. The battery of any of clauses 56-57, wherein the cathode comprises lithium cobalt oxide (LCO) (LiCoO$_2$), lithium manganese oxide (LMO) (LiMn$_2$O$_4$), lithium iron phosphate (LFP) (LiFePO$_4$/C), lithium nickel cobalt manganese oxide (NMC) (LiNiCoMnO$_2$), lithium nickel manganese spinel (LNMO) (LiNi$_{0.5}$Mn$_{1.5}$O$_4$), lithium nickel cobalt aluminum oxide (NCA) (LiNiCoAlO$_2$), sulfur-carbon (S/C) composite, or combinations thereof.

59. A fuel cell comprising: first and second electrodes, one of the first and second electrodes operating as a cathode and the other of the first and second electrodes operating as an anode; and a proton exchange membrane between the first and second electrodes, wherein the first electrode, the second electrode, the proton exchange membrane, or any combination thereof comprises the ion-conducting structure of any of clauses 43-55.

60. The fuel cell of clause 59, wherein the anode, the cathode, or both the anode and cathode comprise a metal, graphite, carbon composite, carbon polymer composite, or combinations thereof.

61. A method, comprising: (a) forming a metal-fibril complex by immersing a plurality of elementary nanofibrils within an alkaline solution and a plurality of metal ions dissolved therein, each elementary nanofibril being composed of a plurality of polymer molecular chains with functional groups, the immersing being such that hydrogen bonds between adjacent functional groups of the polymer molecular chains are broken so as to expose the functional groups and such that the dissolved metal ions from the alkaline solution form coordination bonds with the exposed functional groups.

62. The method of clause 61, further comprising: (b) intercalating second ions between adjacent molecular chains of the metal-fibril complex by immersing the metal-fibril complex in a first solution having a plurality of the second ions dissolved therein.

63. The method of any of clauses 61-62, wherein the alkaline solution has a concentration of at least 5% (w/v).

64. The method of any of clauses 61-63, wherein the alkaline solution has a concentration of at least 20% (w/v).

65. The method of any of clauses 61-64, further comprising: (c) replacing free liquid in the metal-fibril complex by immersing the metal-fibril complex in an organic solvent.

66. The method of any of clauses 61-65, further comprising: (d) drying the metal-fibril complex such that a total content of liquid within the metal-fibril complex is less than 10 wt %, thereby forming the metal-fibril complex with intercalated second ions as a solid-state ion conducting structure.

67. The method of any of clauses 61-66, wherein the first solution is the organic solvent, and the intercalating of (b) and the replacing free liquid of (c) are performed simultaneously.

68. The method of any of clauses 61-67, wherein the first solution is separate from the organic solvent, and the intercalating of (b) is performed before or after the replacing free liquid of (c).

69. The method of any of clauses 61-68, wherein the drying in (d) is such that a content of bound liquid within the metal-fibril complex is less than or equal to 8 wt %.

70. The method of any of clauses 61-69, wherein the metal-fibril complex comprises polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

71. The method of any of clauses 61-70, wherein the plurality of metal ions comprises copper (Cu), zinc (Zn), aluminum (Al), calcium (Ca), iron (Fe), or combinations thereof.

72. The method of any of clauses 61-71, wherein the plurality of second ions comprises lithium (Li), sodium (Na), potassium (K), magnesium (Mg), or combinations thereof.

73. The method of any of clauses 61-72, wherein the alkaline solution comprises sodium hydroxide (NaOH), potassium hydroxide (KOH), lithium hydroxide (LiOH), or combinations thereof.

74. The method of any of clauses 61-73, wherein the first solution comprises propylene carbonate (PC), ethylene carbonate (EC), dimethyl carbonate (DMC), ethylmethyl carbonate (EMC), diethyl carbonate (DEC), or combinations thereof.

75. The method of any of clauses 61-74, wherein the organic solvent comprises dimethylformamide (DMF), dimethyl sulfoxide (DMSO), propylene carbonate (PC), acetone, ethylene glycol diglycidyl ether (EGDGE), or combinations thereof.

76. The method of any of clauses 61-74, wherein the organic solvent comprises DMSO, EGDGE, or combinations thereof, and after (c) the polymer molecular chains have a crystalline morphology.

77. The method of any of clauses 61-74, wherein the organic solvent comprises DMF, PC, acetone, or combinations thereof, and after (c) the polymer molecular chains have an amorphous morphology.

78. The method of any of clauses 61-77, further comprising, prior to (a), subjecting a parent structure containing the elementary nanofibrils to a mechanical fibrillation process, a chemical fibrillation process, an enzymatic fibrillation process, or combinations thereof, so as to expose the nanofibrils from the parent structure.

79. The method of any of clauses 61-78, further comprising, prior to (a), forming the elementary nanofibrils into a sheet, membrane, or paper.

80. The method of any of clauses 66-79, further comprising, after (d), using the metal-fibril complex as an ion-conducting component.

81. The method of any of clauses 61-80, wherein the ion-conducting component is part of a battery, a fuel cell, a supercapacitor, an ion selective membrane, or a power generation device.

82. A method comprising conducting ions using one or more elementary nanofibrils, each elementary nanofibril being composed of a plurality of polymer molecular chains with functional groups that have been chemically-modified.

83. The method of clause 82, wherein the elementary nanofibrils comprise polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

84. The method of any of clauses 82-83, wherein each polymer molecular chain comprises a naturally-occurring polysaccharide.

85. The method of any of clauses 82-84, wherein the naturally-occurring polysaccharide comprises cellulose, chitosan, chitin, or combinations thereof.

86. The method of any of clauses 82-85, wherein each elementary nanofibril comprises a plurality of metal ions, each metal ion acting as a coordination center between the functional groups of adjacent polymer molecular chains so as to form a respective ion transport channel between the molecular chains.

87. The method of any of clauses 82-86, wherein the plurality of metal ions comprises copper (Cu), zinc (Zn), aluminum (Al), calcium (Ca), iron (Fe), or combinations thereof.

88. The method of any of clauses 82-87, wherein each elementary nanofibril further comprises a plurality of second ions, each second ion being disposed within a respective one of the ion transport channels so as to be intercalated between the corresponding polymer molecular chains.

89. The method of any of clauses 82-88, wherein the plurality of second ions comprises lithium (Li+), sodium (Na+), potassium (K+), magnesium (Mg+), protons (H+), or combinations thereof.

90. The method of any of clauses 82-89, wherein the functional groups have been chemically modified by converting hydroxyl groups thereof to carboxyl groups using a (2,2,6,6-tetramethylpiperidin-1-yl)oxyl (TEMPO) treatment.

91. The method of any of clauses 82-89, wherein the functional groups have been chemically modified by etherification using a 3-chloro-2-hydroxypropyl trimethyl ammonium chloride (CHPTAC) treatment.

92. The method of any of clauses 82-91, wherein the conducting ions by the one or more elementary nanofibrils is part of: a discharging or charging process of a battery or a supercapacitor; or an electricity generation process of a thermal power harvesting device, an osmotic power generation device, or a fuel cell; or an electricity transmission or modulation process of a transistor; or an ion transport process of an ion-selective membrane.

EXAMPLES

Example 1—Cu-Paper Solid-State Ion Conductor

Nanofibril cellulose dispersed in water was vacuum filtered forming a nanocellulose membrane, which was further hot pressed to a nanocellulose paper. The nanofibril cellulose paper was immersed in LiOH solution (saturated) with Cu wires for over one week until the paper turned blue. The blue nanocellulose paper was further immersed in DMF solution followed by vacuum drying, repeated three times, to ensure dehydration. The DMF solvent was finally evaporated, obtaining dry nanocellulose paper. The dry nanocellulose was soaked in Li-ion electrolyte (1 M $LiPF_6$ dissolved in EC/DMC) in an argon-filled glove box. After drying to remove the EC/DMC solvent, the nanocellulose became a solid-state Li-ion conductor.

Commercial copy paper with randomly distributed cellulose was immersed in NaOH solution (20%) with Cu wires for over one week until the paper turned blue. The blue Cu-paper was further immersed in DMF solution followed by vacuum drying, repeated three times, to ensure dehydration. The DMF solvent was finally evaporated, obtaining dry Cu-paper paper, which was ~400 μm thick. The Cu-paper was further treated in Li-ion electrolyte, 1 M $LiPF_6$ dissolved in EC/DMC (1/1, v/v), to obtain Cu-paper solid-state ion conductor. The Cu-paper solid-state ion conductor had a structure similar to sheet 400 in FIG. 4A.

Figure 17:
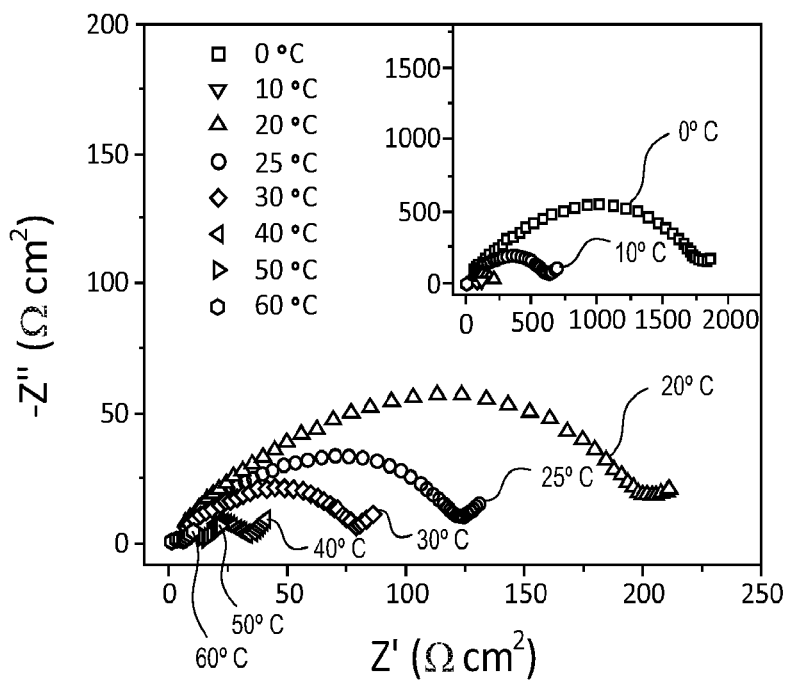
FIG. 17 is a graph of electrochemical impedance spectra (EIS) for a fabricated example of a solid-state metal-fibril complex (e.g., Cu-paper with intercalated Li ions) at different temperatures.

The ionic conductivity and other electrochemical properties can be measured by using the Cu-paper ion conductor with two Li electrodes on opposite sides of the Cu-paper. The resistance response against temperature of the Cu-paper electrolyte was measured by EIS at different temperature, as shown in FIG. 17. The ionic conductivity at room temperature (25° C.) was 0.34 mS/cm.

Example 2—Cu-Wood Solid-State Ion Conductor

Delignified, densified wood (e.g., white wood) was first treated by Cu and NaOH solution (aqueous) to form Cu-cellulose complexes. The surface water of the Cu-cellulose was gently wiped before immersing the Cu-cellulose into DMF solution. The Cu-wood was soaked in DMF for 12 hours and then dried in vacuum at room temperature. This process was repeated three times to ensure free water extraction from the Cu-cellulose. After evaporating any free water and DMF solvent, a dry blue Cu-cellulose complex was obtained. The dry blue Cu-cellulose complex was transferred into an argon-filled glovebox and immersed in a Li-ion electrolyte, 1 M $LiPF_6$ dissolved in EC/DMC (1/1, v/v). After immersion, the previously blue Cu-cellulose had turned green. The Cu-cellulose complex was then removed from solution and the solvents (EC/DMC) therein were evaporated in a glovebox and in vacuum to yield a solid-state Cu-cellulose ion conductor. The Cu-cellulose ion conductor had a structure similar to membrane 410 in FIG. 4B.

Figure 18A:
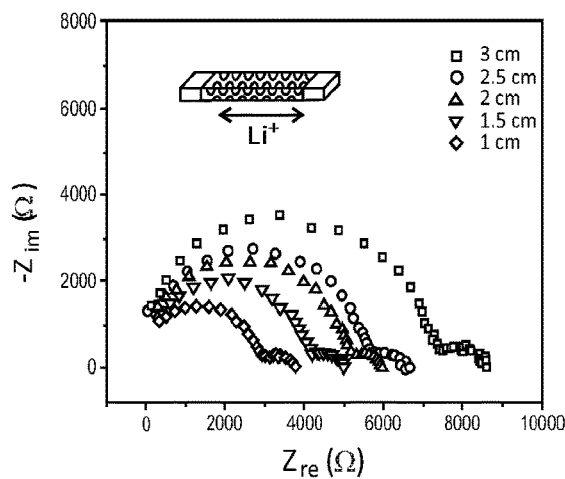
FIGS. 18A-18B are graphs of EIS at different conductor lengths and resistance versus conductor length, respectively, for a fabricated example of a solid-state metal-fibril complex (e.g., Cu-wood with intercalated Li ions).
Figure 18B:
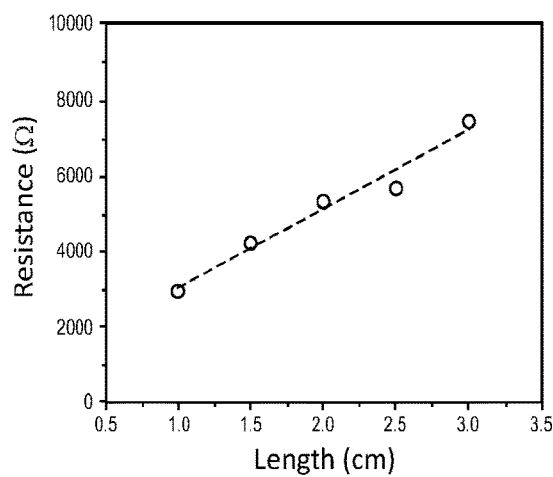

The high ionic conductivity of the Cu-cellulose ion conductor was measured by placing Li metal foils on opposite ends of the Cu-cellulose strip, which measured 1.26 cm wide (W) and 0.665 mm thick (D). Resistances of the Cu-cellulose solid-state ion conductor were measured with different lengths (L) by EIS. The results are shown in FIGS. 18A-18B. The resistances (R) shows a linear relation with the length L, in accordance with the Law of Resistance R=ρL/S. Hence, the Li-ion conductivity σ is calculated by $$\sigma = \frac{1}{\rho} = \frac{L}{R \cdot WD} = 5.3 \text{ mS/cm.}$$

The ionic conductivity was orders of magnitudes higher that most solid polymer electrolytes. For example, PEO-based polymer electrolytes have ionic conductivity of $10^{-6}$-$10^{-8}$ S/cm.

Figure 18C:
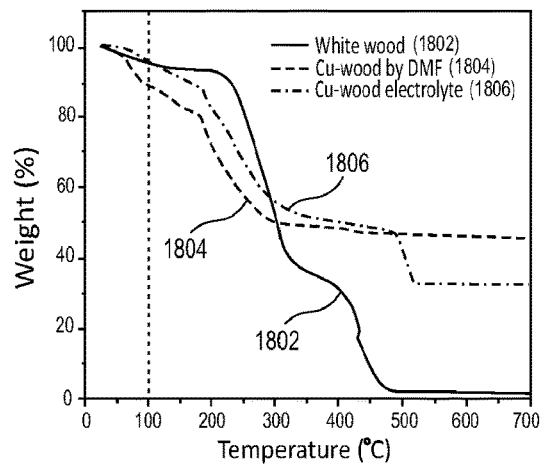
FIG. 18C is a graph comparing thermal gravimetric analysis (TGA) curves for delignified wood without any metal (e.g., white wood example), an example of Cu-wood treated with dimethylformamide (DMF) replacement, and an example of Cu-wood treated with electrolyte.
Figure 18D:
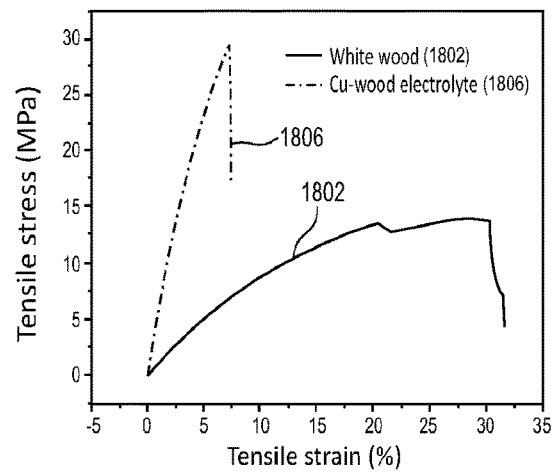
FIG. 18D is a graph comparing tensile stress-strain curves for the white wood example treated with DMF and electrolyte, and for the example of Cu-wood treated with electrolyte.

The solid-state nature of the Cu-cellulose ion conductor was demonstrated by TGA (FIG. 18C) and tensile strength (FIG. 18D). The Cu-cellulose solid-state ion conductor (curve 1804) showed approximately the same weight loss as the white wood (curve 1802) below 100° C., indicating minimal amount of liquid (e.g., free water, DMF, EC, DMC, etc.) in the solid-state Cu-cellulose ion conductor. Due to the coordination of $Cu^{2+}$ in the cellulose molecules, the Cu-cellulose solid ion conductor (curve 1806) showed much enhanced tensile strength, ~30 MPa, much higher than the white wood (curve 1802) with the same treatment process but without Cu and much higher than most solid polymer electrolytes and gel polymer electrolytes. The robust mechanical strength demonstrates the merit of the solid electrolyte.

Figure 18E:
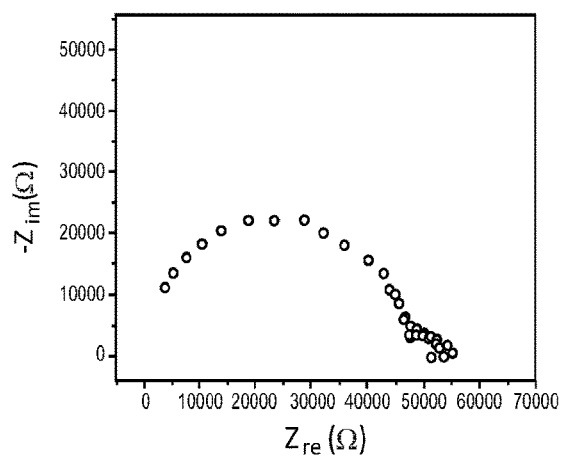
FIG. 18E is a graph of EIS for another fabricated example of a solid-state metal-fibril complex (e.g., Cu-wood with intercalated Na ions).

Dry Cu-cellulose was fabricated via the same aqueous intercalation and DMF replacement procedure as described above. The dry Cu-cellulose was then soaked in a Na-ion electrolyte, 1 M $NaPF_6$ dissolved in EC/DEC/DMC (1/1/1, v/v/v), followed by solvent evaporating in the glovebox to form a structure similar to membrane 410 of FIG. 4B. The Na-ion conductivity was measured by the same method as described above, except that two Na metal foils were used in place of Li metal. The results are shown in FIG. 18E. The Na-ion conductivity of the Cu-cellulose solid ion conductor was $3.3 \times 10^{-4}$ S/cm.

Example 3—Aqueous Batteries Employing Cu-Cellulose Aqueous Ion Conductors

Figure 19:
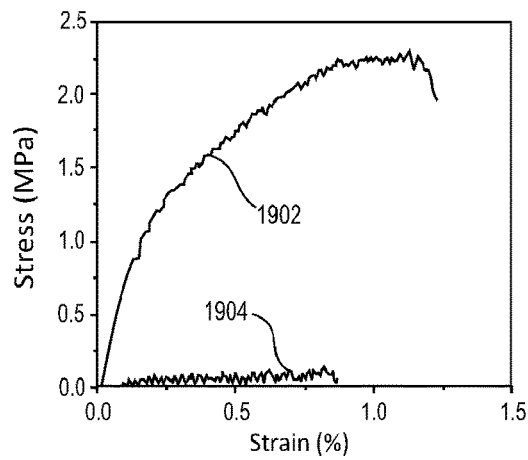
FIG. 19 is a graph comparing stress-stain curves for crystalline cellulose (e.g., cellulose II) and a fabricated example of a metal-fibril complex (e.g., Cu-cellulose II).

Intercalation of ions, including $Na^+$, $K^+$, was observed within a Cu-cellulose framework. The electrostatic field adjacent to the charged nanochannel walls typically redistributes ions while the mobility stays constant. The electrical-double-layer-regulated ion movement is thus intrinsically limited to low electrolyte concentrations and cannot exceed the value for the bulk electrolyte under higher concentrations. However, as a molecular level building block with a hierarchical stacking, the cellulose can be tuned at the molecular scale. Sub-nanometer channels were observed among the cellulose molecular chains where the confinement of solvated ions has been reduced to less than 1 nm. New transport phenomenon occurs within the sub-nm channels, where mobile ions are regulated by the charged walls and the confined spacing. Moreover, improved mechanical properties can be obtained by the metal coordination between the cellulose molecular chains. For example, FIG. 19 compares the stress-strain curves for Cu-cellulose II metal ion complex (curve 1902) with aqueous cellulose II (curve 1904).

Figure 20A:
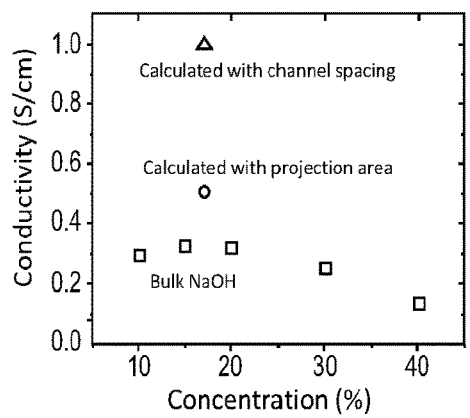
FIG. 20A is a graph of conductivities versus NaOH solution concentration for bulk solution and a fabricated example of a metal-fibril complex (e.g., Cu-cellulose) within the solution.
Figure 20B:
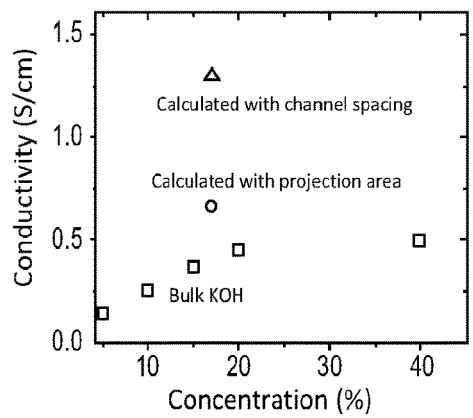
FIG. 20B is a graph of conductivities versus KOH solution concentration for bulk solution and the fabricated example of a metal-fibril complex (e.g., Cu-cellulose) within the solution.
Figure 20C:
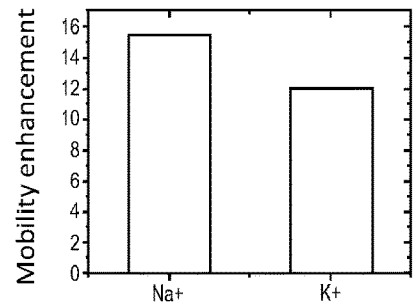
FIG. 20C is a graph of mobility enhancement offered by the fabricated example of a metal-fibril complex (e.g., Cu-cellulose) with respect to Na+ and K+ ions.

Molecular level interactions between ions and water molecules within the angstrom spacing were evaluated by a combination of conductivity measurement (FIGS. 20A-20B), transfer number and activation energy measurements. The negatively charged molecular chains draw cations to the channels while the $Cu(OH)_6^{2-}$ groups within the channel further impede the transport of anions via repulsive coulomb force. The conductivity of bulk NaOH solution with concentrations from 10% up to 40% w/w starts to show saturation around 20% and then decreases due to the much-reduced ion mobility upon higher chance of ion collision. For each concentration, a Cu-cellulose film was immersed, and the conductivity was measured. An enhancement was observed at all concentration levels. FIG. 20C shows the mobility enhancement due to the reduced hydration number of sodium and potassium.

The energy output of aqueous batteries is largely limited by the narrow voltage window of their electrolytes. Aqueous Li-ion batteries offer advantages in terms of safety, toxicity and cost over their non-aqueous counterparts. However, the electrochemical stability window of aqueous electrolytes is much narrower than that of the non-aqueous ones. This stability window is determined by the reductive and oxidative reactions of salts, solvents or additive components in the electrolyte. The stable operating voltage window of water is only 1.23 V, beyond which undesired water hydrolysis occurs. Expanding the operating voltage window therefore represents the core challenge in the development of practical aqueous batteries.

Figure 21:
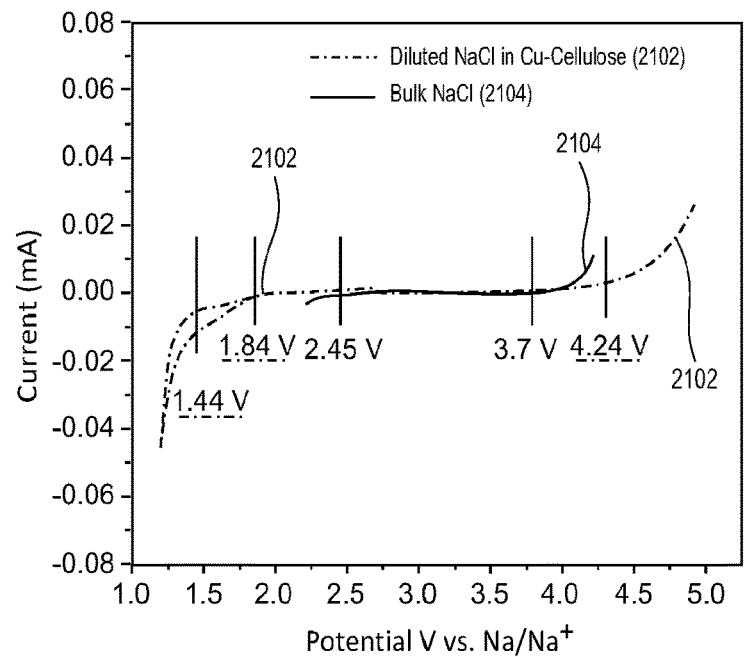
FIG. 21 is a graph of measured current-voltage characteristics of NaCl in bulk solution and a fabricated example of a battery employing an aqueous metal-fibril complex (e.g., Cu-cellulose filled with diluted NaCl in solution).

A Na aqueous battery and Li aqueous battery were demonstrated with much widened electrochemical window with the aid of cellulose framework. Each battery had a structure similar to that of battery 500 in FIG. 5A (but using an aqueous separator membrane) or that of battery 900 in FIG. 9 (but without metal-fibril complex in the electrodes 904, 908). As shown in FIG. 21, the measured electrochemical window of aqueous NaCl in Cu-cellulose framework (compare curve 2102 versus curve 2104) provides a much-widened window of ~2.4V. The loosely bond water molecule shows a much-reduced activity in hydrolysis. With salt including but not limited to LiCl, LiOH, NaCl, NaOH, et al, the window can expand to >2 V. The concentration of the salt can be largely tunable. The molecular scale ion channels provided by the cellulose effectively reduces the hydration number of the ions, including, but not limited to Li+, Na+ and K+, which increases the cathodic limit and at the same time provide passivation of the negative electrode surface through the formation of the ions with smaller hydration shell at the interphase. The absence of the free water molecule suppressed the water hydrolysis including hydrogen and oxygen evolution at the electrodes. In addition, the ions with fewer hydration number exhibits a higher conductivity which is beneficial for efficient ion transport in battery components including separation membranes, cathode and anode.

Example 4—Thermoelectric Device Employing Ion-Conducting Cellulose Membrane

A membrane for selective ion diffusion (that is, the ability of the cellulose membrane to selectivity impregnate Na+ ions and repel OH– ions of the NaOH solution that is in equilibrium with the cellulose membrane) was composed of well-aligned cellulose nanofibrils and is fabricated by a scalable method that involves cutting natural wood perpendicular to the fiber growth direction followed by a delignification process that involves using high concentration NaOH. The formation of cellulose II in the resulting membrane leads to Na-cellulose complex formation after electrolyte infiltration. Oxidation of 2,2,6,6-tetramethylpiperidine-1-oxyl (TEMPO) enhances the negative charge density of the cellulose nanofibrils, which leads to additional enhancement in the thermally generated voltage (up to 24 mV K−1).

Figure 22A:
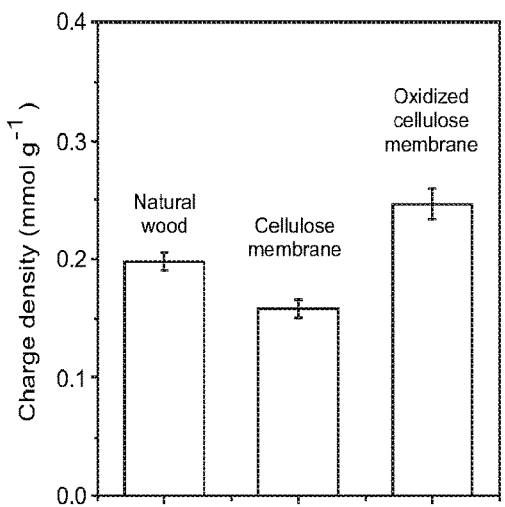
FIG. 22A is a graph comparing charge densities for natural wood, a cellulosic membrane (e.g., delignified wood) without chemical modification, and a fabricated example of a cellulosic membrane that has been chemical modified (e.g., TEMPO-oxidized).
Figure 22B:
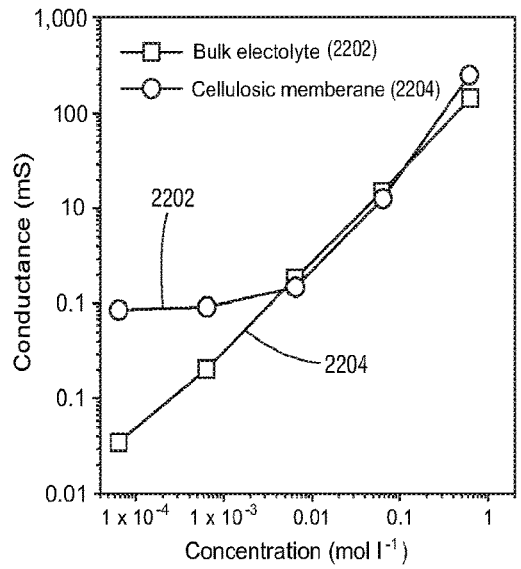
FIG. 22B is a graph of conductance of the cellulosic membrane without chemical modification as a function of electrolyte (e.g., NaOH) concentration.
Figure 22C:
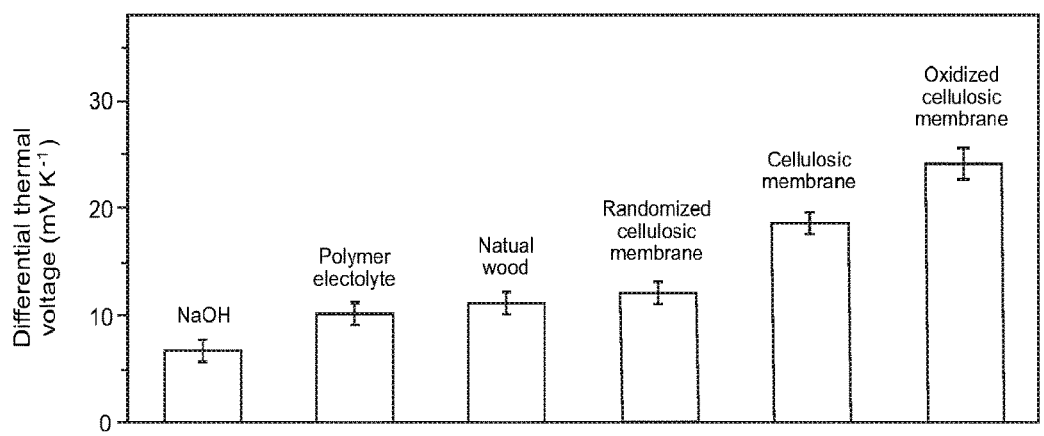
FIG. 22C is a graph comparing measured differential thermal voltages for bulk electrolyte (e.g., NaOH), a polymer electrolyte (e.g., NaOH+poly(ethylene oxide) (PEO)+deionized water), and various cellulose-based structures.

FIG. 22A shows the charge density of the natural wood, cellulosic membrane and TEMPO-oxidized cellulosic membrane. FIG. 22B shows the conductance of the cellulosic membrane measured at different NaOH concentrations. FIG. 22C shows measured differential thermal voltage of various solutions and wood-based structures, in particular: aqueous NaOH solution, polymer electrolyte (NaOH+PEO+deionized water), polymer electrolyte infiltrated into the natural wood, the randomized cellulosic fibers, the cellulosic membrane and the oxidized cellulosic membrane (poly(ethylene oxide), PEO). The differential thermal voltage increases from 6.5 to 10 mV K$^{-1}$ after adding PEO to the bulk NaOH solution. The value increases further from 18 to 24 mV K$^{-1}$ for the devices composed of aligned and oxidized delignified wood, respectively.

To produce a cellulose-based membrane, a chemical process was used to extract the lignin and the hemicellulose from the natural wood. After this treatment, the naturally aligned cellulose nanofibers were the remaining component of the wood structure, which feature a negatively charged surface that can be enhanced by TEMPO oxidation. An ionic thermoelectric device was constructed by infiltrating this cellulosic membrane with NaOH-based polymer electrolyte and applying a temperature difference across the membrane. In this manner, a Seebeck coefficient was achieved that exceeded that of the bulk electrolyte. The enhanced Seebeck coefficient originates from the ionic selectivity of the negatively-charged cellulose nanofibers and the resulting development of surface-charge-governed ion transport, where a natural asymmetry in terms of the number density of positive and negative ions occurs within the nanochannels. This is a unique ionic thermoelectric device that uses chemically-delignified wood (i.e., cellulosic membrane). The proposed cellulosic membrane relies on nanoscale confinement of the oxidized, aligned cellulose molecular chains to promote ionic selectivity, which enhances the overall thermoelectric performance Based on a combination of microscopy, neutron scattering, and synchrotron X-ray diffraction techniques, a multiscale aligned structure was determined with hierarchical spacing of 30 nm, 2 nm, and 0.7 nm between cellulose fiber bundles, elementary fibers, and molecular chains, respectively. After infiltrating electrolyte into the cellulosic membrane and subjecting the membrane to an axial temperature gradient, the ionic thermoelectric device exhibited a Seebeck coefficient of 24 mV/K, which is more than a two-fold improvement over the highest value reported to date. Consequently, a high power factor of 1150 µW/m·K$^2$ was demonstrated at room temperature. The enhanced ionic selectivity can be attributed to effective sodium ion insertion into the charged molecular chains of the type II cellulosic membrane, which does not occur in natural wood or type I cellulose.

With this material a flexible and biocompatible ionic thermoelectric device can be manufactured at large-scale with potential in a range of applications, such as low-grade waste heat recovery (e.g., thermal power harvesting device) and skin electronics. This approach demonstrates the use of nanoscale engineering to improve ionic thermoelectric performance while utilizing sustainable materials. A significant enhancement in the thermally-generated voltage was demonstrated after infiltrating electrolyte into a cellulosic membrane due to enhanced ionic selectivity within the charged molecular chains in conjunction with the synergistic Soret effect. The ion selective membrane was composed of well-aligned cellulose nanofibers and was fabricated by a scalable method that involves cutting natural wood perpendicular to the fiber growth direction followed by a delignification process using 10% wt NaOH solution. The resulting membrane was composed of type II cellulose, which enables Na-cellulose complex formation. TEMPO oxidation further enhanced the negative surface charge density of the cellulose nanofibers, which leads to additional enhancement in the Seebeck coefficient (up to 24 mV/K) and can be used for a wide range of applications, including temperature sensing and low-grade thermal energy harvesting.

The fabricated structures inherit the vertically aligned nature of the wood channels (e.g., lumen), which are themselves composed of vertically aligned cellulose nanofibers. After delignification, the wood sample was composed of ~85% cellulose fibers with a negligible amount of hemicellulose and lignin. Using SANS, the diameter of the elementary fibrils of the membrane was found to be ~4 nm. When immersed in electrolyte, a Na-cellulose complex was observed and a spacing of ~0.6 nm among the molecular chains was determined from the synchrotron XRD spectra. Thermogravimetric analysis at a heating rate of 10° C./min indicated that the cellulosic membrane was thermally stable up to 315° C.

In the fabricated thermoelectric device, selective ion transport occurs in the cellulosic membrane when the two electrode contacts are exposed to different temperatures. The thermoelectric device had a structure similar to that of device 1200 in FIG. 12. The charge density is a key factor in determining the nanofluidic conductivity. The charge densities of the natural wood, cellulosic membrane and oxidized cellulosic membrane were determined from conductometric titration as 0.196±0.008, 0.157±0.007 and 0.246±0.013 mmol g$^{-1}$, respectively (FIG. 22A). The charge density of the cellulosic membrane was lower than that of the natural wood as hemicellulose is partially removed by the alkaline sulfite treatment, leading to reduced glucuronic acid content. After oxidation, the charge density increased to 0.246 mmol/g as the primary hydroxyl groups on cellulose are oxidized to carboxylic groups, which can dissociate into negatively charged carboxylate groups more easily, thereby enabling a higher charge density. This electrostatic field surrounding the cellulose nanofibrils enables surface-charge-governed ion transport along the fiber direction by providing a desirable disparity between the concentrations of Na+ and OH− ions inside this nanospace. This disparity facilitates the transport of Na+ ions and impedes the directed movement of OH− ions.

The ionic conductivity of the NaOH solution after infiltration into the cellulosic membrane is shown in FIG. 22B. The minimum concentration of mobile ions was determined by the fixed charge on the cellulose, providing a lower limit of conductivity. Hence, at such small NaOH concentrations, the conductivity is virtually constant (and entirely dictated by the fixed charge on the cellulose), as shown in the plateau of the conductivity versus salt concentration dependence in curve 2202. On the other hand, at larger NaOH concentrations, that is, at concentrations that exceed the concentration of the fixed charges of the cellulose, the conductivity increases with increasing bulk NaOH concentration (that is, the concentration of the NaOH solution that is in equilibrium with the cellulose membrane with Na+ ions impregnating into the cellulose membrane). Hence in this conductivity versus concentration plot, the plateau region is distinguished from the linear regime by the ratio of the fixed charges of the cellulose to the bulk NaOH concentration (curve 2204). The conductance of the cellulosic membrane thus becomes slightly lower than that of the NaOH bulk solution, which may be due to the reduction of the equivalent area for the ion transport when infiltrated into the cellulosic membrane. However, when the NaOH concentration increased to 2.5 wt % (0.625 mol l-1), the infiltrated cellulosic membrane showed an even higher ionic conductivity. This is due to the type of cellulose that exists in the membrane (that is, Cellulose II), where Na ion insertion occurs and allows the previously unused 0.6 nm channels to contribute to the ion transport.

The cellulosic devices were heated uniformly to study the temperature dependence of ionic conductivity. An ionic conductivity of ~20 mS cm-1 was measured with the polymer electrolyte consisting of PEO, deionized water and NaOH infiltrating cellulose membrane under room temperature. An increasing trend can be observed between 20° and 60° C. The ionic differential thermal voltage of various cellulosic membranes infiltrated with different solutions were then compared, as shown in FIG. 22C.

Thus, a binary ionic system without intermolecular reactions has an ionic differential thermal voltage that is proportional to the difference between the thermophoretic mobilities for the positive and negative ions ($\mu^+$-$\mu^-$). To measure the ionic differential thermal voltage, the same polymer electrolyte consisting of PEO, deionized water and 0.625 mol l$^{-1}$ NaOH was prepared and infiltrated into various cellulosic membranes between two platinum electrodes, in which the temperature of the hot and cold sides were simultaneously monitored. The absence of the interface reaction causes the ions to accumulate at the platinum electrodes, which allowed us to evaluate the differential thermal voltage generated by ion redistribution in the electrolyte. The bulk electrolyte exhibits a value of 10 mV K$^{-1}$, which is in good agreement with a similar bulk electrolyte.

To understand the structure-property relationships, evaluation of the thermally generated voltage was performed, and comprehensive structural analysis was conducted of different types of membrane, including natural wood, the delignified membrane featuring pure cellulose I polymorph and the delignified membrane that consisted of cellulose II polymorph. Cellulose I, as found in natural wood and $H_2O_2$-delignified cellulosic material, cannot facilitate Na+ ion insertion after infiltration with the alkaline electrolyte. A differential thermal voltage of 11 mV K$^{-1}$ and 12 mV K$^{-1}$ was obtained for the natural wood and type I cellulosic membranes, respectively. The voltage generated with the formation of the Na-cellulose complex (with the membrane delignified by NaOH/$Na_2SO_3$/$H_2O_2$) exhibits a largely enhanced signal: 19±1 mV K$^{-1}$, as shown in FIG. 22C.

The aligned structure of the cellulosic membrane is also beneficial to the ionic differential thermal voltage. The membranes featuring randomly distributed and orthogonally oriented cellulose fibers exhibit comparable yet lower values than the proposed cellulosic device. Moreover, the large pores (that is, lumens) in the membrane do not contribute to the overall thermally generated voltage since both densified and epoxy-filled membranes showed negligible performance change. In addition, cellulosic membranes made from different parts of wood (that is, heartwood and sapwood) exhibit similar performances.

To further identify the effect of charge density on ion transport and selectivity, the aligned cellulosic membrane was oxidized to increase the amount of surface charge. Subsequently, after infiltration with electrolyte, an ionic differential thermal voltage of 24 mV K$^{-1}$ was obtained as shown in FIG. 22C. The high performance arises from the enhanced interaction between the negatively charged nanofibrils and the mobile ions in the electrolyte. The experimentally obtained power factor (1,150 µW m K$^{-2}$) represents an order of magnitude enhancement compared to previously reported data. The thermal conductivity of the electrolyte-infiltrated cellulosic membrane was found to be as low as 0.48±0.03 W m K$^{-1}$, which is beneficial for thermal energy conversion. The observed thermally generated voltage is due to selective ion diffusion driven by temperature-dependent electrophoretic ion movement, which is typically not considered a conventional thermoelectric example involving band structural engineering.

Figure 23A:
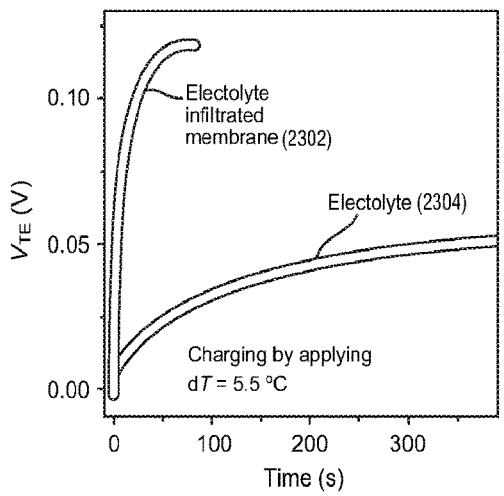
FIG. 23A is a graph comparing thermal charging behavior of the polymer electrolyte to the chemically-modified cellulosic membrane infiltrated with the polymer electrolyte.
Figure 23B:
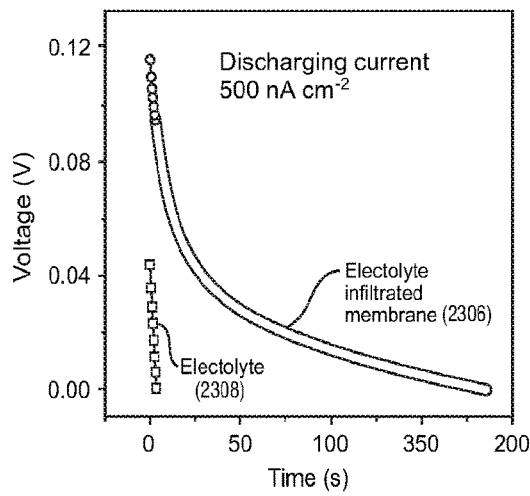
FIG. 23B is a graph comparing discharging behavior of the polymer electrolyte to the chemically-modified cellulosic membrane infiltrated with the polymer electrolyte.

The thermal charging behavior of the ionic conductor was evaluated. A cellulosic membrane was infiltrated with electrolyte and sandwiched between two platinum electrodes for testing purposes. The sealed device was exposed to an external temperature difference of 5.5° C. The charging and discharging behaviors of the membrane are shown in FIGS. 23A-23B, respectively. The behavior of the membrane (curves 2302, 2306) is compared against bulk electrolyte (curves 2304, 2308). The electrolyte-infiltrated membrane (2302) was charged to 0.118 V while its bulk counterpart (2304) was charged to 0.050 V. The electrolyte-infiltrated cellulosic membrane (2302) was charged to 0.118 V with a response time of ~70 s while its bulk counterpart (2304) was charged to 0.050 V with a much longer response time of ~380 s. Note that the electrolyte-infiltrated membrane with the oxidized cellulose can be charged to more than twice that of the pure bulk polymer electrolyte due to the presence of the nanofluidic channels. Furthermore, the much shorter response time of the electrolyte-infiltrated membrane is attributed to the enhanced ionic conductivity in the aligned nanofluidic channels.

FIG. 23B displays the discharging behavior of both the electrolyte-infiltrated membrane (2306) and bulk electrolyte (2308), where the amount of charge generated under the applied temperature difference can be obtained by integrating the amount of current flow during the discharging process. The times to completely discharge the nanofluidic system and bulk electrolyte device at 500 nA cm$^{-2}$ were 170 s and 4 s, respectively. The longer discharging duration for the cellulosic membrane is due to a larger amount of charge stored in the nanofluidic membrane under the same external thermal bias. For a continuous operation, an oxidation-reduction can react on the electrode surfaces or a mechanical system can be incorporated that provides an oscillating heat source.

Example 5—Ion Conducting Membrane Formed from Delignified Wood

A highly efficient and tunable ion regulation using a cellulose membrane was composed of aligned nanochannels. Cellulose nanofibers were exposed after extraction of intertwined lignin and hemicellulose from the natural wood. Due to the dissociation of the surface functional groups, the charged cellulose nanofiber surface can attract layers of counter-ions adjacent to the fibers, with an exponentially decaying ion concentration toward the center of the channel. The interface-dominated electrostatic field surrounding the cellulose nanofibers provides surface-charge-governed ion transport along the fiber direction, enabling desirable ionic separation.

The surface charge and geometry of the nanochannels can be easily tuned to modify the ionic conductivity of the membrane. Owing to the abundance of the functional groups on the cellulose nanofibers, the surface charge density can be tuned via chemical stimuli. A high surface charge density of −5.7 mC·m$^{-2}$ was demonstrated after converting the hydroxyl groups to carboxyl groups. Additionally, large tunability of the channel size was attained, up to an order of magnitude. In this manner, a high surface-charge-governed ionic conductivity of ~2 mS·cm$^{-2}$ was observed at a KCl concentration of less than 10$^{-2}$ mol·L$^{-1}$.

Figure 24A:
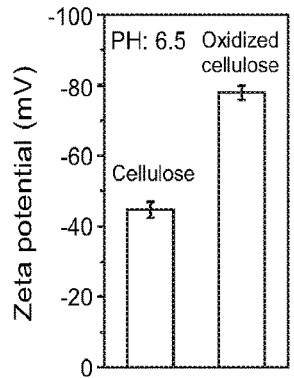
FIG. 24A is a graph of the zeta-potential of cellulose fibers and oxidized/surface-charged cellulose under neutral pH for a cellulose concentration of ~0.1%.
Figure 24B:
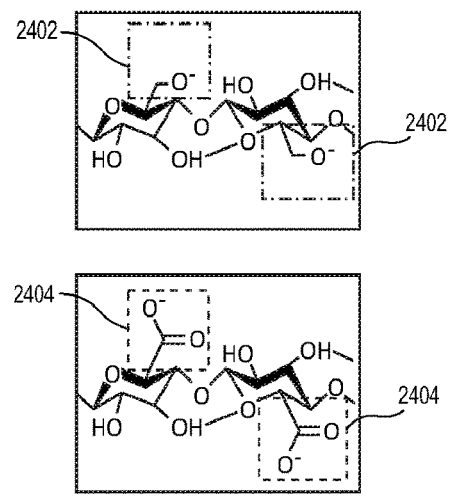
FIG. 24B are simplified schematic diagrams illustrating cellulose molecular chains before (top) and after (bottom) TEMPO modification.
Figure 24C:
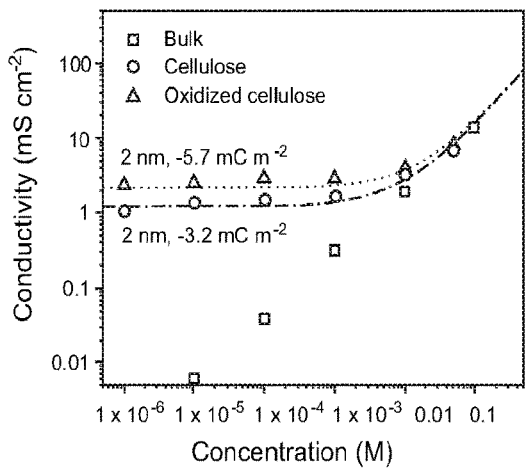
FIG. 24C is a graph of conductivity versus KCl concentration for a fabricated example of a cellulose membrane in KCl solution before and after chemical modification.

The nanofluidic performance of the cellulose membrane was evaluated using an ionic conductivity setup. Carboxyl groups have a greater tendency to dissociate into negatively charged carboxylates compared to hydroxyl groups, leading to a higher charge density and therefore a higher negative zeta potential in deionized water. Therefore, TEMPO oxidation was applied to the cellulose to convert the primary hydroxyl groups 2402 on the surface chains of the cellulose crystallites into carboxyl groups 2404, as shown in FIG. 24B. The resulting oxidized cellulose membrane exhibited a higher Zeta potential of −78 mV, compared with −45 mV for just delignified cellulose, as shown in FIG. 24A. The respective ionic conductivity of these materials in KCl solutions are shown in FIG. 24C. The ion transport behavior in both cellulose membranes exhibited a conductivity plateau orders of magnitude higher than bulk solution for concentrations below ~10$^{-2}$ mol·L$^{-1}$. Within the surface-governed ion transport region, a conductivity as high as ~2 mS·cm$^{-1}$ was obtained for the oxidized membrane, compared with 1.1 mS·cm$^{-1}$ for the unmodified counterpart, indicating the effectiveness of modifying the surface functional groups to tune the ion transport behavior.

Using eq. (1), the surface charge of the membranes was estimated based on the zeta potential:

$$\sigma = \varepsilon \varepsilon_0 \zeta / \lambda_d, \quad (1)$$

in which σ is the surface charge, ε is the dielectric constant, ε$_0$ is the permittivity of vacuum, ζ is the Debye length, and λ$_d$ is the zeta potential, which was −3.2 mC·m$^{-2}$ and −5.7 mC·m$^{-2}$ for the as made cellulose and oxidized cellulose, respectively. With the estimate of the surface charge for these samples, the overall conductivity trend can be fitted using the following equation:

$$\kappa = Ze(\mu_+ + \mu_-)CN_A + 2\sigma\mu_+/h, \quad (2)$$

in which Z is the cation valence, µ$_+$ is the cation mobility, µ$_-$ is the anion mobility, C is the ion concentration, N$_A$ is Avogadro's number, and h is the channel diameter of the nanofluidic cellulose system. As shown in FIG. 24C, the fit of eq. (2) agrees well with the experimental data of the ionic conductivity versus KCl concentration and allows calculation of a channel diameter of ~2 nm for both cellulose membranes. The difference in the value of the ionic conductivity plateaus for each membrane may be attributed to the difference of the surface charge densities between the materials.

Figure 24D:
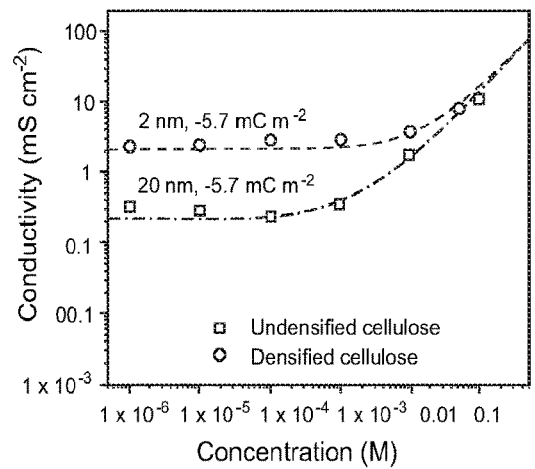
FIG. 24D is a graph of conductivity versus KCl concentration for a fabricated example of a cellulose membrane in KCl solution before and after densification.

The effect of channel geometry on the ionic conductivity was investigated by preparing an un-densified cellulose membrane and comparing its performance with the densified sample, as shown in FIG. 24D. The un-densified samples exhibited an ionic conductivity plateau of 0.2 mS·cm$^{-1}$, one order lower than that of the densified sample. The fit of the un-densified cellulose membrane conductivity results indicated a channel diameter of around 20 nm, which is about 10 times larger than that of the densified cellulose membrane (channel diameter ~2 nm).

Example 6—Ionic Transistor Employing Ion-Conducting Cellulose Membrane

To explore the use of this cellulose nanofiber membrane as an ion regulation device, the ionic rectification effect was demonstrated in the material acting as a flexible transistor with electrical gating, in which the cellulose membrane can preferentially accumulate ions that have the opposite charge as the channel walls. Silver paste was painted on the membrane to act as the gating metal, and a $10^{-6}$ mol·L$^{-1}$ KCl solution was used as the liquid electrolyte. The ionic transistor device had a structure similar to transistor 1300 in FIG. 13.

Figure 25A:
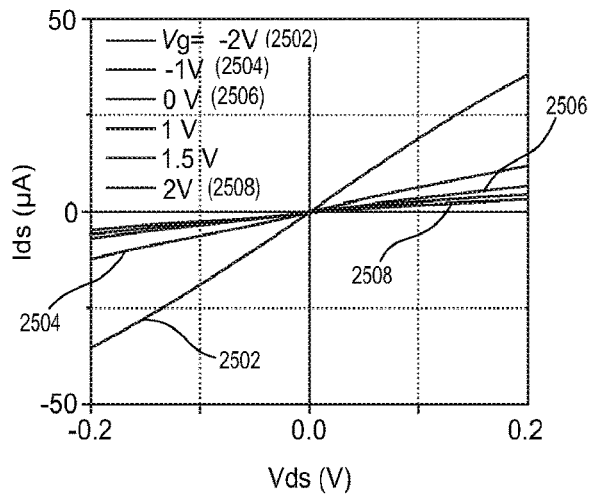
FIG. 25A is a graph of current versus voltage of a fabricated example of a cellulose-based ionic transistor for different applied gate voltages.
Figure 25B:
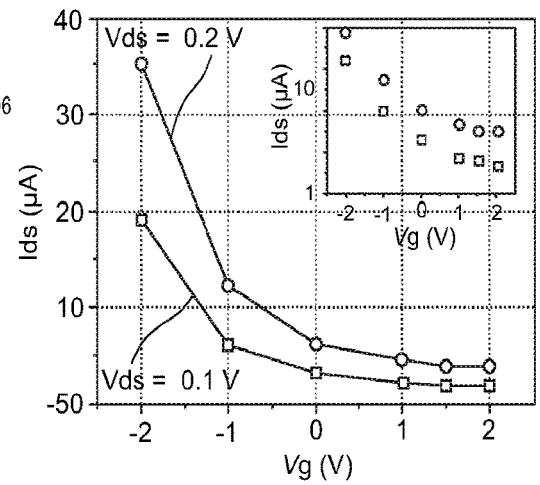
FIG. 25B is a graph of current versus gate voltage of the fabricated example of the cellulose-based ionic transistor, with the inset showing the same results on a semi-log scale.

The gating voltage was controlled by a Keithley 2400 power source while the ionic current-voltage characteristics were recorded. When the gating voltage was negative, the local concentration of K$^+$ should further increase under the gate, which will contribute a large cationic current density. Meanwhile, positive gating will repel K$^+$ and lead to an even lower current density than the neutral gating condition. FIGS. 25A-25B show the ionic currents measured under different gating potentials from –2 V to 2 V (curves 2502-2508). The ion conductivity under Vg=–2 V was about one order of magnitude higher than the value under Vg=2 V, and equivalent to that of 10-2 mol·L$^{-1}$ KCl, indicating an efficient accumulation of positive ions with negative gating. The device exhibits a negligible electrical gate leakage current, which was measured to be below the noise floor of the Keithley 2400.

The cellulose membrane was flexible and even foldable. A ribbon of the membrane that can be twisted and wrapped around a finger. To observe how folding affects the ionic conductivity performance, a membrane 2 cm×2 mm×1 mm in size was used, and the current under an applied voltage of 0.5 V was recorded as the membrane was folded. The ionic conductivity under a concentration of $10^{-6}$ mol·L$^{-1}$ KCl exhibited minimal changes upon folding, with no notable performance degradation for a folding angle of up to 150°.

Example 7—Osmotic Power Generation Device Employing Ion-Conducting Cellulose

Wood-based materials were utilized as functional nanofluidic structures. Epoxy was used to infiltrate into the large pores while leaving the ion-selective nanopores open. When exposed to salinity difference, the electrical double layer formed along the nanocellulose allows the cations to efficiently pass through while impeding the transport of anions, establishing an electrical potential in an opposite direction as the cation movement direction. Notably, the structure was robust not only in axial direction but also in transverse direction. The numerous nanofluidic channels are well-integrated within the polymer infiltrated wood with enhanced stability in seawater.

Figure 26A:
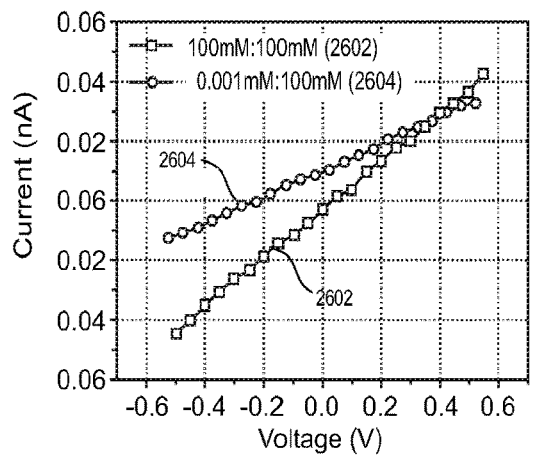
FIG. 26A is a graph of current versus voltage of a fabricated example of a polymer-filled, delignified, chemically-modified wood membrane in an osmotic power generation setup.
Figure 26B:
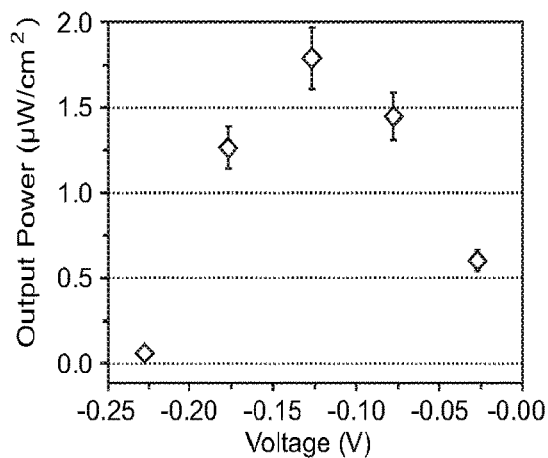
FIG. 26B is a graph of resulting output power resulting from ion transport through the fabricated example of the polymer-filled, delignified, chemically-modified wood membrane in the osmotic power generation setup.

A wood membrane was disposed between waters with different salinity level (e.g., seawater and freshwater) for energy generation. The setup was similar to power generation system 1400 in FIG. 14. Nanocellulose fibers comprising wood channels exhibit a negative surface charge (–3 mC/cm$^2$, 0.16 mmol/g) that can preferentially induce a net flow of cations along the channels. Further chemical treatment can be undertaken to further increase the charge density of the cellulose fibers, for example, by conversion of hydroxyl group to carboxyl groups that dissociate more easily in solution. Salinity difference provide the streaming energy required to promote a continuous net ion flow. The net ion flow through the wood channels then induces a measurable output electrical signal (voltage and current density). In this way, an electric field is established across the wood membrane. FIGS. 26A-26B show the measured current-voltage characteristics and power output, respectively. A short circuit current density of 0.025 mA/cm$^2$ and an open circuit voltage of 0.2 V was obtained between 100 m mol/L and 0.001 m mol/L NaCl (e.g., curve 2604).

Example 8—Ion Conducting Membrane Formed from Densified Wood

A high surface charge density of –5.7 mC·m$^{-2}$ was demonstrated after converting hydroxyl groups to carboxyl groups. Additionally, a high surface-charge-governed ionic conductivity of ~2 mS·cm$^{-2}$ was observed at a KCl concentration of less than $10^{-2}$ mol·L$^{-1}$. In the present example, CHPTAC was used as etherifying agent to modulate the surface charge of natural wood. In a mixed solution containing sodium hydroxide, urea, and distilled water (7.5:11:81.5), epoxide was provided in situ from CHPTAC, and quaternized cellulose could be synthesized via the reaction between the epoxide and cellulose sodium alkoxide. After chemical treatment with CHPTAC for ten hours, the natural wood was converted into quaternized wood, which presents a positive charge in electrolyte solution. The main reaction is the cationization reaction of cellulose, as well as the quaternized hemicelluloses due to the similar functional groups as cellulose.

Compared with the molecular structure of cellulose in natural wood, cationic functional groups, for example, —(CH$_3$)$_3$N$^+$, in cationic wood membrane bond via the extended side chain of cellulose. The molecular structure of the resulting cationic wood nanocellulose is grafted by the quaternary ammonium groups —(CH$_3$)$_3$N$^+$ in the main chain, rendering the wood nanochannels positively charged. In addition, significant hydrogen bonding occurs between the quaternary ammonium ions and the cellulose chains during a subsequent densification process, which contributes to the high stability and mechanical strength of the resulting cationic wood membrane.

Main surface properties of the natural wood and cationic wood membrane were evaluated using ζ-potential measurements in high purity water at 25° C. The ζ-potential measurement confirmed the charge reversal of the natural wood after the chemical treatment, from –27.9±0.95 mV (for natural wood) to +37.7±1.65 mV after the cationic modification, due to the bonding of the quaternary ammonium salt group to the cellulose in the cell walls. Cationic wood membrane from densification of quaternized wood, they have the same zeta potential and there is no new chemical group formed. To the best of our knowledge, this is the first report of a positively charged wood by directly chemically modifying the cellulose of wood.

Figure 27A:
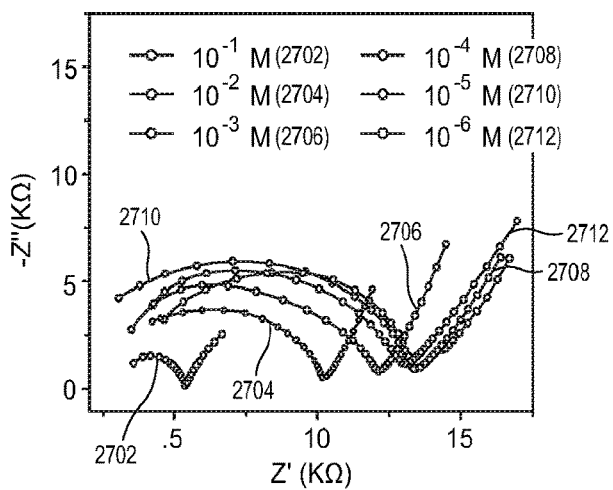
FIG. 27A is a graph of electrochemical impedance spectra (EIS) at different KCl concentrations for a fabricated example of a chemically-modified, densified wood membrane.
Figure 27B:
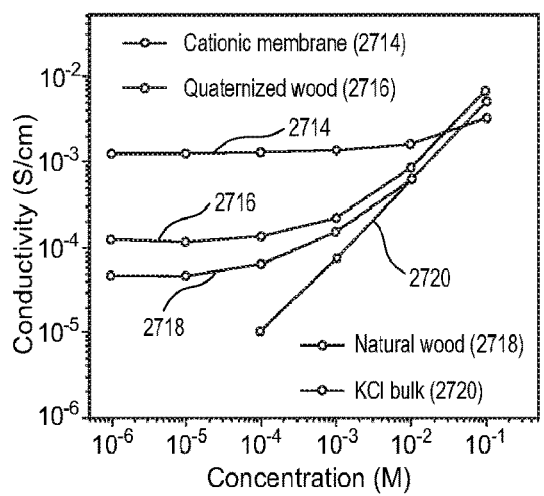
FIG. 27B is a graph comparing ionic conductivity versus KCl concentration for KCl bulk solution and various fabricated examples of wood-based structures.

The nanofluidic performance of the cationic wood membrane was investigate by an ionic conductivity setup. FIG. 27A shows a series of Nyquist plots that were measured for the cationic wood membrane at various KCl concentrations ($10^{-6}$-$10^{-1}$ M, e.g., curves 2712-2702, respectively). Ionic conductivity of the bulk KCl solution 2720, natural wood 2718, quaternized wood 2716, and cationic wood membrane 2714 were calculated in FIG. 27B based on the following equation:

$$\lambda = l/SR$$

in which l, S, and R are the length, cross-sectional area, and the measured resistance, respectively. The ionic conductance of natural wood, quaternized wood, and cationic wood membrane deviated from the bulk behavior, which can be explained by the nanofluidic surface charge-governed transport mechanism. At low concentrations, the conductivity values of the natural wood and quaternized wood are constant and independent of the bulk KCl concentration below $10^{-4}$ M (FIG. 27B).

The natural wood exhibited a conductivity of $4.5 \times 10^{-5} \pm 2.1 \times 10^{-6}$ S/cm in $10^{-6}$ M KCl solution. The conductance of quaternized wood was $1.2 \times 10^{-4} \pm 9.5 \times 10^{-6}$ S/cm in $10^{-6}$ M KCl solution, which is 2 times higher than that of natural wood. Furthermore, a remarkable enhancement of the conductance to about $1.3 \times 10^{-3} \pm 9.9 \times 10^{-6}$ S/cm was observed in the cationic wood membrane, which is 25-times higher than the natural wood. In terms of the cationic wood-based nanofluidic device, the conductivity deviated from the bulk behavior for KCl concentration below 0.1 M (FIG. 27B), and the conductance exhibited a plateau with a small increase, confirming that the surface-governed ion transport in the smaller nanochannels of this material resulted in a lower limit of ionic conductivity.

Figure 27C:
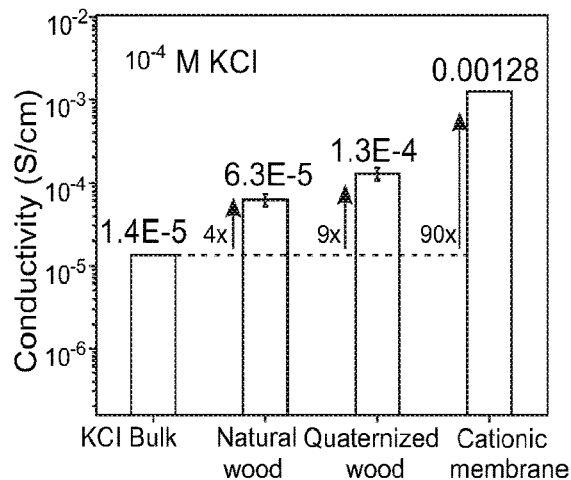
FIG. 27C is a graph comparing the ion conductivity values of FIG. 27B at a concentration of $10^{-4}$ M KCl.

At high ionic concentration, the conductance of the natural wood and quaternized wood were similar to the bulk KCl solution. Note that the ionic conductivity calculated for the cationic wood membrane was relatively smaller than that of the bulk solution due to the smaller equivalent area of the ion transport after the structural densification of the wood. As shown in FIG. 27C, the conductance of natural wood, quaternized wood, and cationic wood membrane in the concentration of $10^{-4}$ M KCl is about 2 times, 9 times, and 90 times higher than bulk solution, respectively. Note that the ion conductance of the cationic wood membrane is higher than those fabricated by other layered materials in KCl electrolyte solution, such as graphene oxide based nanofluidics, aligned mesoporous silica films, boron nitride layers, potentially due to the high surface charge density and smaller channel diameters.

Example 9—Cationic Wood Membrane

A strong densified wood membrane with nanofluidic channels was directly made from natural balsa wood via chemical modification and densification. Etherification bonds the cationic functional group (—$(CH_3)_3N^+Cl^-$) to the cellulose backbone, converting negatively charged ($\xi$-potential of −27.9 mV) wood into positively charged wood (+37.7 mV). Densification eliminates the large pores of the natural wood, leading to a highly laminated structure with the oriented cellulose nanofiber and a high mechanical tensile strength of ~350 MPa in dry condition (20 times higher than the untreated counterpart) and ~98 MPa in wet condition (×5.5 increase compared to the untreated counterpart). The nanoscale gaps between the cellulose nanofibers act as narrow nanochannels with diameters smaller than the Debye length, which facilitates rapid ion transport that is 25-times higher than the ion conductance of the natural wood at a low KCl concentration of 10 mM. The fabricated cationic wood membrane exhibits an enhanced mechanical strength and excellent nanofluidic ion-transport properties, representing a promising direction for developing high performance nanofluidic material from renewable, and abundant nature-based materials.

To further investigate the ion selectivity behavior of the natural wood and cationic wood membrane, current-voltage curves were measured for ion transport through natural wood and cationic wood membrane under transmembrane concentration difference of salt concentration gradients ($C_{high}/C_{low}$=100 and 1000-fold). The electrolyte concentration at one side of wood membrane (or natural wood) was fixed at 10 mM (1000-fold) or 1 mM (100-fold) KCl, while the concentration at the other side was 0.01 mM KCl. The setup was similar to the power generation system 1400 in FIG. 14. The direction of the short-circuit current is in accordance with the net flow of the charged ions from high concentration to low concentration, which can serve as an indication of the selective ions diffusion of the channels.

Figure 28A:
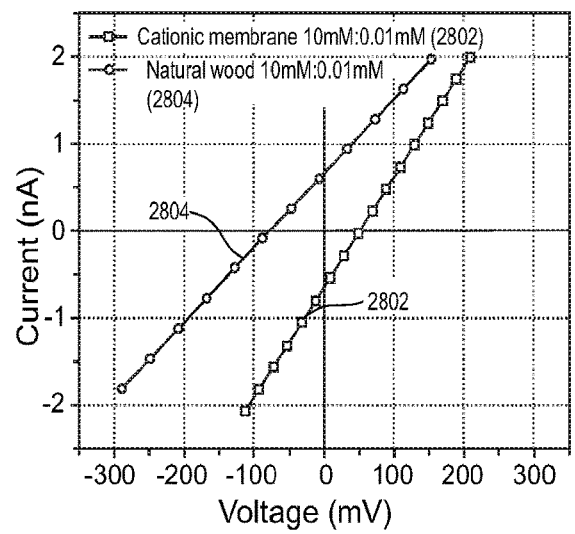
FIG. 28A is a graph comparing current versus voltage characteristics of natural wood and a fabricated example of a cationic wood membrane.

In order to test the selectivity of the natural balsa wood, polydimethylsiloxane (PDMS) was used to seal the large channels in wood mesoporous structure. The short-circuit current ($I_{SC}$) and membrane potential can be read from the intercepts on the current and voltage axes. As is shown in FIG. 28A, both $K^+$ and $Cl^-$ ions diffuse from high concentration (10 mM) to low concentration (0.01 mM KCl) without an external voltage (V=0), and a net current ($I_{SC}$) could be observed upon the selective ion diffusion of $Cl^-$ over $K^+$ in cationic wood membrane. The same result was obtained from a high concentration of 1 mM KCl to a low concentration of 0.01 mM KCl ($C_{high}/C_{low}$=100). Due to the opposite charge selectivity, the short-circuit current and membrane potential of the natural wood is of opposite polarity to the cationic wood membrane. FIG. 28A further indicates that the natural wood is cation selective and the cationic wood membrane is anion selective.

Figure 28B:
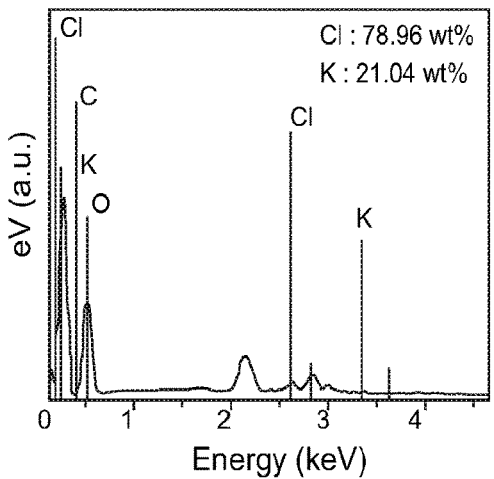
FIG. 28B is a graph of energy dispersive x-ray spectroscopy (EDS) elemental spectrum of chemically-modified wood used in the fabricated example of the cationic wood membrane.

The cationic wood membrane shows the same selectivity for negative ions as the quaternized wood due to their similarity of surface charge type. The charge selectivity of the natural wood and quaternized wood was confirmed by energy-dispersive spectroscopy (EDS). The natural wood and quaternized wood were immersed in $10^{-1}$ M KCl for 24 h, followed by washing with high purity water to remove unbound ions. As shown in FIG. 28B, the EDS spectrum shows the distribution of $Cl^-$ and $K^+$ in the crossing section of quaternized wood, suggesting that there were more $Cl^-$ ions than $K^+$ ions. In comparison, similar distribution of $Cl^-$ and $K^+$ in the crossing section of natural wood without infiltration of PDMS suggests a low ion selectivity. Based on these results, calculated the molar ratio of $Cl^-$ ions and $K^+$ ions in quaternized wood was calculated to be approximately 4.1:1, which further supports the anionic selectivity of the quaternized wood. The overwhelming content of $Cl^-$ over $K^+$ in quaternized wood also verifies the negative charged ion selectivity.

Example 10—Fuel Cell Device Employing Ion-Conducting Chitosan

Figure 29A:
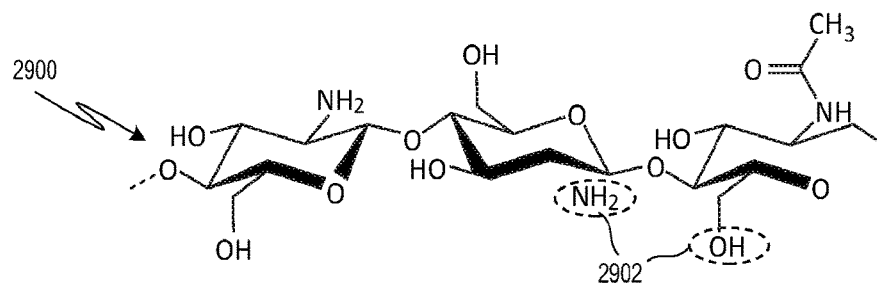
FIGS. 29A-29B are simplified schematic diagrams illustrating a chitosan molecular chain prior to metal coordination and adjacent chitosan molecular chains after metal coordination, according to one or more embodiments of the disclosed subject matter.
Figure 29B:
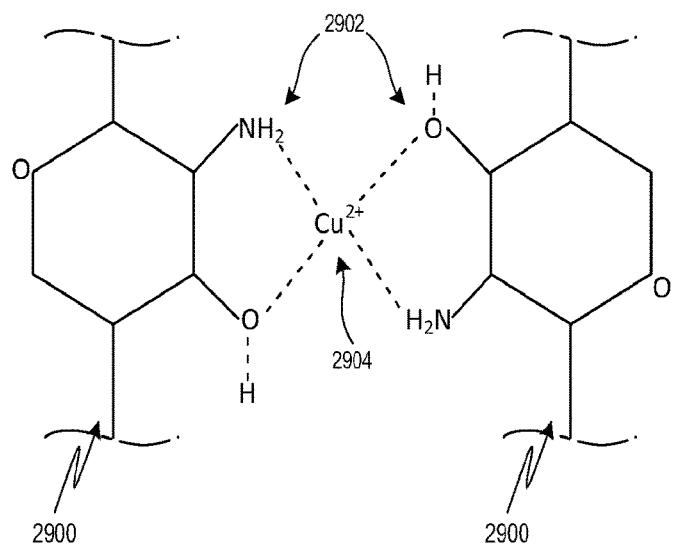

As shown in FIG. 29A, chitosan 290 has a molecular chain formed by 1,4 linked-2-deoxy-2-aminoglucose, which is generated from the deacetylation reaction of chitin. It shows many interesting properties, such as being non-toxic, biodegradable, and biocompatible. Chitosan has several polar functional groups, such as hydroxyl and amino groups 2902, which can act as donors and form complexes with inorganic materials. In a fabricated example, a chitosan film was obtained from cast-drying of chitosan/acetic acid solution. The film was then immersed in Cu and NaOH solution (aqueous) to form chitosan-Cu nanostructures, for example, as shown in FIG. 29B. The Cu metal 2904 acts a coordination center in the coordination bond to the surrounding functional groups 2902.

Proton donors were introduced into the chitosan-Cu film by immersion in appropriate solution, for example, by one or more of ammonia, ammonium nitrate, ammonium chloride, ammonium sulfate, polyacrylic acid, citric acid, or the like. Finally, a chitosan-Cu as a proton conductor was fabricated after drying in oven. In embodiments, such drying can include vacuum drying, freeze drying, and/or critical point drying. The Cu-chitosan film can be used as solid electrolyte in a fuel cell, for example, as PEM 604 in the fuel cell system 600 of FIG. 6A.

The high proton conductivity of the chitosan-Cu was measured by placing two steel metal foils on the two ends of a chitosan-Cu stripe in a temperature and humidity-controlled box. Resistances of the chitosan-Cu proton conductor were measured by EIS. The proton conductivity σ is calculated by $$\sigma = \frac{1}{\rho} = \frac{L}{R \cdot WD} = 55 \text{ mS/cm}.$$

Figure 29C:
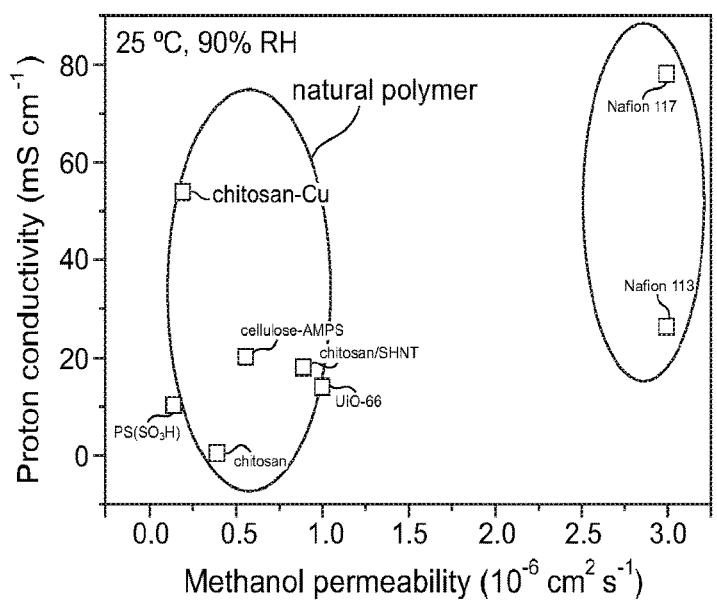
FIG. 29C is a graph of proton conductivities as a function of methanol permeability for various fuel cell separator membranes, including a fabricated example of a metal-fibril complex (e.g., Cu-chitosan).

As shown in FIG. 29C, the proton conductivity of chitosan-Cu is significantly higher than other polymers (PS), natural polymers (cellulose or pure chitosan) and MOF (UIO-66). For example, the proton conductivity of the chitosan-Cu conductor is almost the same as commercially-available electrolytes for fuel cells (such as Nafion). However, chitosan-Cu has remarkably low methanol permeability of $10^{-7} \sim 10^{-8}$ cm$^2$ s$^{-1}$, which is much lower than Nafion ($3 \times 10^{-6}$ cm$^2$ s$^{-1}$). The low methanol permeability of chitosan-Cu displays extremely lower diffusion of methanol from anode to cathode in fuel cell and can improve the performance of fuel cell.

Example 11—Ion-Conducting Cellulose Hydrogel

After filling residual wood channels with polyacrylamide (PAM) hydrogel precursor by a solution-based method, wood hydrogels were synthesized by free-radical polymerization. Specifically, acrylamide (AM) monomer, ammonium persulfate (APS) initiator, and N,N'-methylenebisacrylamide (MBA) cross-linker reacted at 60° C. in the delignified wood channels and formed strong hydrogen bonds with cellulose nanofibers, which enables outstanding mechanical strength and flexibility. Therefore, the strengthened skeletons of aligned cellulose nanofibrils, energy dissipation of the PAM hydrogel, and strong interfacial bonding of the hydrogel can provide an anisotropic, strong wood-hydrogel composite. The tensile strength of the wood hydrogel synthesized by this method as 36 MPa with an elastic modulus of 310 MPa along the growth direction (L) and 0.54 MPa with an elastic modulus of 0.135 MPa normal to the growth direction (R). These values are significantly higher than the unmodified PAM hydrogel (0.072 MPa tensile strength and 0.01 MPa elastic modulus). This facile method exploits the advantages of the high-tensile strength of aligned cellulose nanofibril bundles and can be universally applied to multiple types of hydrogels without losing their intrinsic flexibility, high water content, etc. The as-prepared wood hydrogel also demonstrates unique optical and ion transport properties, including high transparency, optical anisotropy, and nanofluidic ionic behavior.

CONCLUSION

Any of the features illustrated or described with respect to FIGS. 5A-6B, 9, 12-14, the above-described cationic membrane, and Examples 1-12 can be combined with any other of FIGS. 5A-6B, 9, 12-14, the above-described cationic membrane, and Examples 1-11 to provide other systems and embodiments not otherwise illustrated or specifically described herein.

Any of the features illustrated or described with respect to the methods of FIGS. 3A-3B, 8, 11, and 16, and Examples 1-11 can be combined with the methods of any other of FIGS. 3A-3B, 8, 11, and 16, and Examples 1-11 to provide other methods and embodiments not otherwise illustrated or specifically described herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A battery comprising:
   first and second electrodes; and
   a separator membrane between the first and second electrodes, the separator membrane comprising a solid-state metal-fibril complex,
   wherein one of the first and second electrodes operates as a cathode and the other of the first and second electrodes operates as an anode,
   the solid-state metal-fibril complex is formed by a plurality of first nanofibrils, each first nanofibril being composed of a plurality of cellulose molecular chains with first functional groups, each first nanofibril having a plurality of first metal ions, each first metal ion acting as a first coordination center between the first functional groups of adjacent cellulose molecular chains so as to form a respective first ion transport channel through the separator membrane, and
   the solid-state metal-fibril complex comprises a plurality of second ions, each second ion being disposed within one of the first ion transport channels so as to be intercalated between the corresponding cellulose molecular chains.

2. The battery of claim 1, wherein:
   the first electrode, the second electrode, or both the first and second electrodes comprise a base material and an additive interspersed within the base material,
   the additive comprises one or more second nanofibrils, each second nanofibril being composed of a plurality of second cellulose molecular chains with second functional groups, each second nanofibril having a plurality of second metal ions, each second metal ion acting as a second coordination center between the second functional groups of adjacent second cellulose molecular chains so as to form a respective second ion transport channel between the second cellulose molecular chains, and
   each second nanofibril comprising a plurality of third ions, each third ion being disposed within a respective one of the second ion transport channels so as to be intercalated between the corresponding second cellulose molecular chains.

3. The battery of claim 2, wherein the solid-state metal-fibril complex, the additive, or both the solid-state metal-fibril complex and the additive further comprise polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

4. The battery of claim 2, wherein:
each metal ion comprises copper (Cu), zinc (Zn), aluminum (Al), calcium (Ca), iron (Fe), or combinations thereof; and/or
the second ions, the third ions, or both the second ions and the third ions comprise lithium (Li), sodium (Na), potassium (K), magnesium (Mg), or combinations thereof.

5. The battery of claim 1, wherein:
the first electrode operates as the anode and comprises graphite, silicon, carbon, or combinations thereof and/or
the second electrode operates as the cathode and comprises lithium cobalt oxide (LCO) (LiCoO$_2$), lithium manganese oxide (LMO) (LiMn$_2$O$_4$), lithium iron phosphate (LFP) (LiFePO$_4$/C), lithium nickel cobalt manganese oxide (NMC) (LiNiCoMnO$_2$), lithium nickel manganese spinel (LNMO) (LiNi$_{0.5}$Mn$_{1.5}$O$_4$), lithium nickel cobalt aluminum oxide (NCA) (LiNiCoAlO$_2$), sulfur-carbon (S/C) composite, or combinations thereof.

6. The battery of claim 1, wherein:
each of the first and second electrodes is in contact with the separator membrane; and
the separator membrane is constructed to operate as a solid-state electrolyte between the first and second electrodes.

7. The battery of claim 1, wherein the solid-state metal-fibril complex further comprises polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

8. The battery of claim 1, wherein:
each metal ion comprises copper (Cu), zinc (Zn), aluminum (Al), calcium (Ca), iron (Fe), or combinations thereof; and/or
the second ions comprise lithium (Li), sodium (Na), potassium (K), magnesium (Mg), or combinations thereof.

9. A battery comprising:
first and second electrodes, one of the first and second electrodes operating as a cathode and the other of the first and second electrodes operating as an anode; and
a separator between the first and second electrodes, the separator comprising a solid-state electrolyte,
the first electrode, the second electrode, or both the first and second electrodes comprise a solid-state metal-fibril complex, the solid-state metal-fibril complex is formed by a plurality of nanofibrils, each nanofibril being composed of a plurality of cellulose molecular chains with functional groups, each nanofibril having a plurality of metal ions, each metal ion acting as a coordination center between the functional groups of adjacent cellulose molecular chains so as to form a respective ion transport channel between the cellulose molecular chains, and
the solid-state metal-fibril complex comprises a plurality of second ions, each second ion being disposed within one of the ion transport channels so as to be intercalated between the corresponding cellulose molecular chains.

10. The battery of claim 9, wherein the solid-state electrolyte comprises an oxide-based electrolyte, a sulfide-based electrolytes, a polymer electrolyte, or combinations thereof.

11. The battery of claim 9, wherein the solid-state metal-fibril complex further comprises polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

12. The battery of claim 9, wherein:
each metal ion comprises copper (Cu), zinc (Zn), aluminum (Al), calcium (Ca), iron (Fe), or combinations thereof; and/or
the second ions comprise lithium (Li), sodium (Na), potassium (K), magnesium (Mg), or combinations thereof.

13. The battery of claim 9, wherein:
the first electrode operates as the anode and comprises graphite, silicon, carbon, or combinations thereof and/or
the second electrode operates as the cathode and comprises lithium cobalt oxide (LCO) (LiCoO$_2$), lithium manganese oxide (LMO) (LiMn$_2$O$_4$), lithium iron phosphate (LFP) (LiFePO$_4$/C), lithium nickel cobalt manganese oxide (NMC) (LiNiCoMnO$_2$), lithium nickel manganese spinel (LNMO) (LiNi$_{0.5}$Mn$_{1.5}$O$_4$), lithium nickel cobalt aluminum oxide (NCA) (LiNiCoAlO$_2$), sulfur-carbon (S/C) composite, or combinations thereof.

14. A method, comprising:
(a) forming a metal-fibril complex by immersing a plurality of elementary nanofibrils within an alkaline solution having a concentration of at least 5% (w/v) and a plurality of metal ions dissolved therein, each elementary nanofibril being composed of a plurality of cellulose molecular chains with functional groups, the immersing being such that hydrogen bonds between adjacent functional groups of the cellulose molecular chains are broken so as to expose the functional groups and such that the dissolved metal ions from the alkaline solution form coordination bonds with the exposed functional groups;
(b) after (a), intercalating second ions between adjacent cellulose molecular chains of the metal-fibril complex by immersing the metal-fibril complex in a first solution having a plurality of the second ions dissolved therein;
(c) after (a), replacing free water in the metal-fibril complex by immersing the metal-fibril complex in an organic solvent; and
(d) after (c), drying the metal-fibril complex such that a total content of water within the metal-fibril complex is less than or equal to 10 wt %, thereby forming the metal-fibril complex with intercalated second ions as a solid-state ion conducting structure, wherein:
the first solution is the organic solvent, and the intercalating of (b) and the replacing free water of (c) are performed simultaneously, or the first solution is separate from the organic solvent, and the intercalating of (b) is performed before or after the replacing free water of (c).

15. The method of claim 14, wherein the elementary nanofibrils further comprise polysaccharide, poly(vinyl chloride) (PVC), poly(vinyl alcohol) (PVA), poly(acrylic acid) (PAA), poly(ethylene oxide) (PEO), poly(acrylonitrile) (PAN), poly(ethyl methacrylate) (PEMA), poly(methyl methacrylate) (PMMA), poly(ethylene terephthalate) (PET), polyethylene (PE), poly(ethylene naphthalate) (PEN), polyamide (PA), poly(vinylidene chloride) (PVDC), polylactic acid (PLA), or combinations thereof.

16. The method of claim 14, wherein the plurality of metal ions comprises copper (Cu), zinc (Zn), aluminum (Al), calcium (Ca), iron (Fe), or combinations thereof.

17. The method of claim 14, wherein the plurality of second ions comprises lithium (Li), sodium (Na), potassium (K), magnesium (Mg), protons (H+), or combinations thereof.

18. The method of claim 14, wherein the alkaline solution comprises sodium hydroxide (NaOH), potassium hydroxide (KOH), lithium hydroxide (LiOH), or combinations thereof.

19. The method of claim 14, wherein the first solution comprises propylene carbonate (PC), ethylene carbonate (EC), dimethyl carbonate (DMC), ethylmethyl carbonate (EMC), diethyl carbonate (DEC), or combinations thereof.

20. The method of claim 14, wherein the organic solvent comprises dimethylformamide (DMF), dimethyl sulfoxide (DMSO), propylene carbonate (PC), acetone, ethylene glycol diglycidyl ether (EGDGE), or combinations thereof.

21. The method of claim 14, wherein, after (a), ion transport channels are formed between adjacent cellulose molecular chains by the metal ions acting as coordination centers between the functional groups, a width of each ion transport channel is about 1 nm, and a spacing between adjacent ion transport channels is less than 2 nm.

22. The method of claim 14, further comprising, prior to (a), subjecting a parent structure containing the elementary nanofibrils to a mechanical fibrillation process, a chemical fibrillation process, an enzymatic fibrillation process, or combinations thereof, so as to expose the nanofibrils from the parent structure, wherein the parent structure comprises a block of natural wood or a piece of paper formed of cellulose fibers.

* * * * *